US007707268B2

(12) United States Patent
Saito et al.

(10) Patent No.: US 7,707,268 B2
(45) Date of Patent: Apr. 27, 2010

(54) INFORMATION-PROCESSING APPARATUS, INFORMATION-PROCESSING METHODS AND PROGRAMS

(75) Inventors: Mari Saito, Kanagawa (JP); Noriyuki Yamamoto, Kanagawa (JP); Kei Tateno, Kanagawa (JP); Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 903 days.

(21) Appl. No.: 11/100,993

(22) Filed: Apr. 7, 2005

(65) Prior Publication Data
US 2006/0031402 A1 Feb. 9, 2006

(30) Foreign Application Priority Data
Apr. 7, 2004 (JP) ............... P2004-112905

(51) Int. Cl.
G06F 15/16 (2006.01)
G06F 7/00 (2006.01)
(52) U.S. Cl. ......................... 709/217; 707/5
(58) Field of Classification Search ............ 707/5; 709/206, 217; 715/727–729, 752, 753–759, 715/865, 866, 978
See application file for complete search history.

(56) References Cited
U.S. PATENT DOCUMENTS

| 6,587,127 | B1* | 7/2003 | Leeke et al. ............... 715/765 |
| 7,003,515 | B1* | 2/2006 | Glaser et al. .................. 707/5 |
| 7,105,736 | B2* | 9/2006 | Laakso ...................... 84/615 |
| 7,228,305 | B1* | 6/2007 | Eyal et al. ................. 707/100 |
| 7,243,129 | B1* | 7/2007 | Thomas ................... 709/207 |
| 7,355,112 | B2* | 4/2008 | Laakso ...................... 84/615 |
| 7,363,314 | B2* | 4/2008 | Picker et al. ............... 707/102 |
| 7,396,990 | B2* | 7/2008 | Lu et al. .................... 84/611 |
| 2001/0013123 | A1* | 8/2001 | Freeman et al. .............. 725/34 |

(Continued)

FOREIGN PATENT DOCUMENTS

JP 2001-167011 6/2001

(Continued)

OTHER PUBLICATIONS
Japanese Office Action (JP2004-112905) issued Jan. 7, 2010.

Primary Examiner—J Bret Dennison
(74) Attorney, Agent, or Firm—K&L Gates LLP

(57) ABSTRACT

An information-processing apparatus which can easily output an accessory content suitable for a user situation at a point of time in course of an operation to output a main content or before or after the operation is provided. The present invention includes a history-information generation section generates one or more pieces of correlation information each including at least one piece of information on the user utilizing the apparatus at a point of time the apparatus outputs an already used main content and in a time band including the point of time. A user-utilization accessory-content determination section determines an accessory content regarded as a content whose output operation in course of an operation to output a new main content or before or after the operation is considered to be suitable for the user on the basis of one or more pieces of correlation information stored in the correlation-information storage section and characteristics of one or more accessory contents stored in the accessory-content storage section, and outputs the determined accessory content. The present invention can be applied to an information-processing apparatus which can output a piece of music or a picture in course of operations to read and write a mail text.

6 Claims, 28 Drawing Sheets

U.S. PATENT DOCUMENTS

| | | | |
|---|---|---|---|
| 2002/0174199 A1* | 11/2002 | Horvitz | 709/220 |
| 2002/0184209 A1* | 12/2002 | Sato et al. | 707/5 |
| 2003/0046399 A1* | 3/2003 | Boulter et al. | 709/228 |
| 2004/0003096 A1* | 1/2004 | Willis | 709/228 |
| 2004/0003097 A1* | 1/2004 | Willis et al. | 709/228 |
| 2004/0111467 A1* | 6/2004 | Willis | 709/203 |
| 2004/0148638 A1* | 7/2004 | Weisman et al. | 725/115 |
| 2006/0031880 A1* | 2/2006 | Stark et al. | 725/45 |
| 2006/0212444 A1* | 9/2006 | Handman et al. | 707/5 |
| 2006/0230415 A1* | 10/2006 | Roeding | 725/34 |
| 2007/0006708 A1* | 1/2007 | Laakso | 84/1 |
| 2007/0060206 A1* | 3/2007 | Dam Nielsen et al. | 455/566 |

FOREIGN PATENT DOCUMENTS

| | | |
|---|---|---|
| JP | 2002-149689 | 5/2002 |
| JP | 2002-288187 | 10/2002 |
| JP | 2003150507 | 5/2003 |
| JP | 2003-209778 | 7/2003 |
| JP | 2003345727 | 12/2003 |
| JP | 2002-318965 | 10/2005 |
| WO | WO 01/77875 | 10/2001 |

* cited by examiner

FIG. 5

|  | CCV1 | CCV2 | CCV3 |
|---|---|---|---|
|  | Doc 1 | Doc 2 | Doc 3 |
| TRAVEL | 2 | 0 | 0 |
| SCHEDULE | 1 | 1 | 0 |
| DESTINATION | 0 | 0 | 0 |
| MAP | 1 | 0 | 0 |
| CONTACT | 0 | 1 | 0 |
| HOT SPRING | 1 | 0 | 0 |
| CONFERENCE | 0 | 2 | 0 |
| MEMO | 0 | 1 | 0 |
| PARTICIPATION | 0 | 1 | 0 |
| SOUVENIR | 1 | 0 | 0 |
| MUSIC | 0 | 0 | 1 |
| SAMBA | 0 | 0 | 1 |
| BRAZIL | 0 | 0 | 1 |
|  | ↕ CI1 | ↕ CI2 | ↕ CI3 |
| BGM | SongA (Folk) | None | SongC (Samba) |

FIG. 7

| | | TargetDoc |
|---|---|---|
| B | TRAVEL | 1 |
| | SCHEDULE | 0 |
| | DESTINATION | 0 |
| | MAP | 1 |
| | CONTACT | 1 |
| | HOT SPRING | 1 |
| | CONFERENCE | 0 |
| | MEMO | 0 |
| | PARTICIPATION | 0 |
| | SOUVENIR | 2 |
| | MUSIC | 0 |
| | SAMBA | 0 |
| | BRAZIL | 0 |

CCVn

FIG.8

|   | | CCV1<br>Doc 1 | CCV2<br>Doc 2 | CCV3<br>Doc 3 |
|---|---|---|---|---|
| A | TRAVEL | 2 | 0 | 0 |
|   | SCHEDULE | 1 | 1 | 0 |
|   | DESTINATION | 0 | 0 | 0 |
|   | MAP | 1 | 0 | 0 |
|   | CONTACT | 0 | 1 | 0 |
|   | HOT SPRING | 1 | 0 | 0 |
|   | CONFERENCE | 0 | 2 | 0 |
|   | MEMO | 0 | 1 | 0 |
|   | PARTICIPATION | 0 | 1 | 0 |
|   | SOUVENIR | 1 | 0 | 0 |
|   | MUSIC | 0 | 0 | 1 |
|   | SAMBA | 0 | 0 | 1 |
|   | BRAZIL | 0 | 0 | 1 |

FIG.9

| | SIMILARITY TO Doc 1 | SIMILARITY TO Doc 2 | SIMILARITY TO Doc 3 |
|---|---|---|---|
| $A^T \times B$ | 6 | 1 | 0 |

FIG. 10

| | | Doc 4 ~CCV4 | Doc 5 ~CCV5 | Doc 6 ~CCV6 | ... |
|---|---|---|---|---|---|
| APPLICATION (CONTEXT INFORMATION) | MAILER | 1 | 0 | 1 | |
| | EDITOR | 0 | 1 | 0 | |
| | BROWSER | 1 | 0 | 0 | |
| OPERATION (CONTEXT INFORMATION) | INSPECT | 0 | 1 | 1 | |
| | EDIT | 0 | 1 | 0 | |
| | CREATE | 1 | 0 | 0 | |
| WORD (META INFORMATION) | TRAVEL | 2 | 1 | 0 | |
| | DESTINATION | 1 | 0 | 0 | |
| | HOT SPRING | 0 | 1 | 0 | |
| | CONFERENCE | 2 | 2 | 0 | |
| | SCHEDULE | 0 | 0 | 0 | |
| | CONTACT | 2 | 1 | 1 | |
| | MAP | 0 | 0 | 1 | |
| | MUSIC | 0 | 0 | 0 | |
| | TANGO | 0 | 1 | 1 | |
| | NATION | 1 | 0 | 0 | |
| PLACE (CONTEXT INFORMATION) | COMPANY | 1 | 0 | 1 | |
| | HOME | 0 | 0 | 0 | |
| | OUTDOORS | 0 | 0 | 0 | |
| BGM | | SongD ↔ CI4 | None ↔ CI5 | SongE ↔ CI6 | |

FIG.11

| D | APPLICATION (CONTEXT INFORMATION) | MAILER | TargetDoc' 0 |
|---|---|---|---|
| | | EDITOR | 1 |
| | | BROWSER | 0 |
| | OPERATION (CONTEXT INFORMATION) | INSPECT | 0 |
| | | EDIT | 1 |
| | | CREATE | 1 |
| | WORD (META INFORMATION) | TRAVEL | 1 |
| | | DESTINATION | 1 |
| | | HOT SPRING | 0 |
| | | CONFERENCE | 0 |
| | | SCHEDULE | 1 |
| | | CONTACT | 0 |
| | | MAP | 1 |
| | | MUSIC | 0 |
| | | TANGO | 0 |
| | | NATION | 0 |
| | PLACE (CONTEXT INFORMATION) | COMPANY | 1 |
| | | HOME | 0 |
| | | OUTDOORS | 0 |

CCVn'

| $C^T \times D$ (INCLUDING CONTEXT INFORMATION) | SIMILARITY TO Doc 4 | SIMILARITY TO Doc 5 | SIMILARITY TO Doc 6 |
|---|---|---|---|
| | 7 | 8 | 1 |

| $C'^T \times D'$<br>·C' IS A MATRIX OBTAINED BY SETTING ALL CONTEXT-INFORMATION ELEMENTS OF MATRIX C AT 0<br>·D' IS A MATRIX OBTAINED BY SETTING ALL CONTEXT-INFORMATION ELEMENTS OF MATRIX D AT 0 | SIMILARITY TO Doc 4 | SIMILARITY TO Doc 5 | SIMILARITY TO Doc 6 |
|---|---|---|---|
| | 7 | 5 | 0 |

FIG.25

|  | MAIL 1 (CCV1a) | MAIL 2 (CCV2a) | MAIL 3 (CCV3a) |
|---|---|---|---|
| TRAVEL | 2 | 0 | 0 |
| SCHEDULE | 1 | 1 | 0 |
| DESTINATION | 1 | 0 | 1 |
| MAP | 1 | 0 | 1 |
| CONTACT | 1 | 1 | 0 |
| HOT SPRING | 2 | 0 | 0 |
| CONFERENCE | 0 | 2 | 0 |
| MEMO | 0 | 2 | 0 |
| PARTICIPATION | 0 | 1 | 1 |
| SOUVENIR | 2 | 0 | 0 |
| MUSIC | 0 | 0 | 2 |
| FOLK | 0 | 0 | 2 |
| USER CONTEXT | HAPPY | STRAINED | NOSTALGIC |

FIG.26

| CI1a: HAPPY | CI2a: STRAINED | CI3a: NOSTALGIC |
|---|---|---|
| TRAVEL | CONFERENCE | MUSIC |
| HOT SPRING | MEMO | FOLK |
| SOUVENIR |  |  |

CCI1a, CCI2a, CCI3a

FIG.31

```
NEWLY ARRIVING MAIL
_____

To: All@ddd.co.jp
From: tom@ddd.co.jp
LAST WEEK, I WENT TO HOKKAIDO. THERE, I BOUGHT
A SOUVENIR GOOD FOR TEA TIME. I HOPE YOU
WILL JOIN ME IN ENJOYING THE SOUVENIR.
```

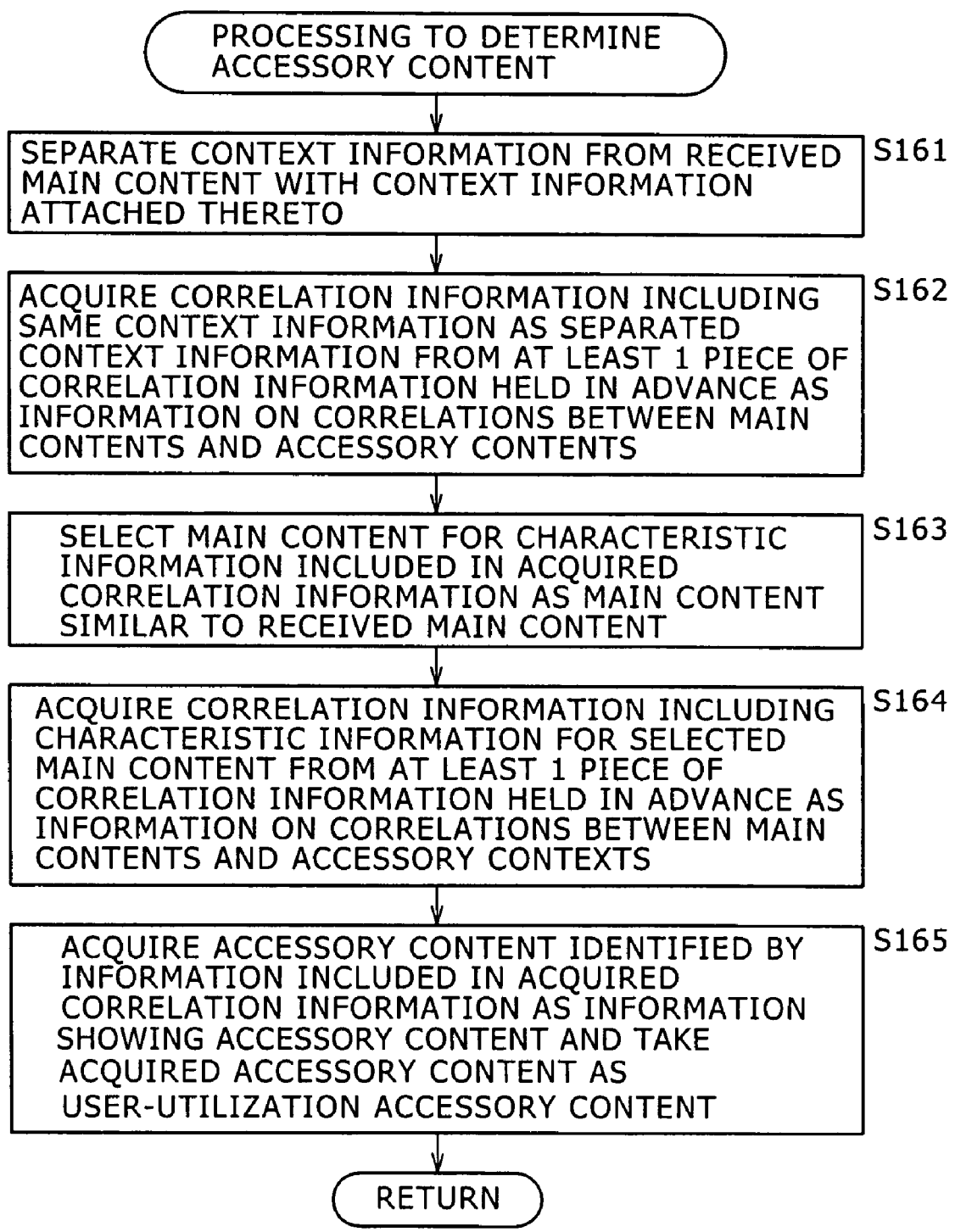

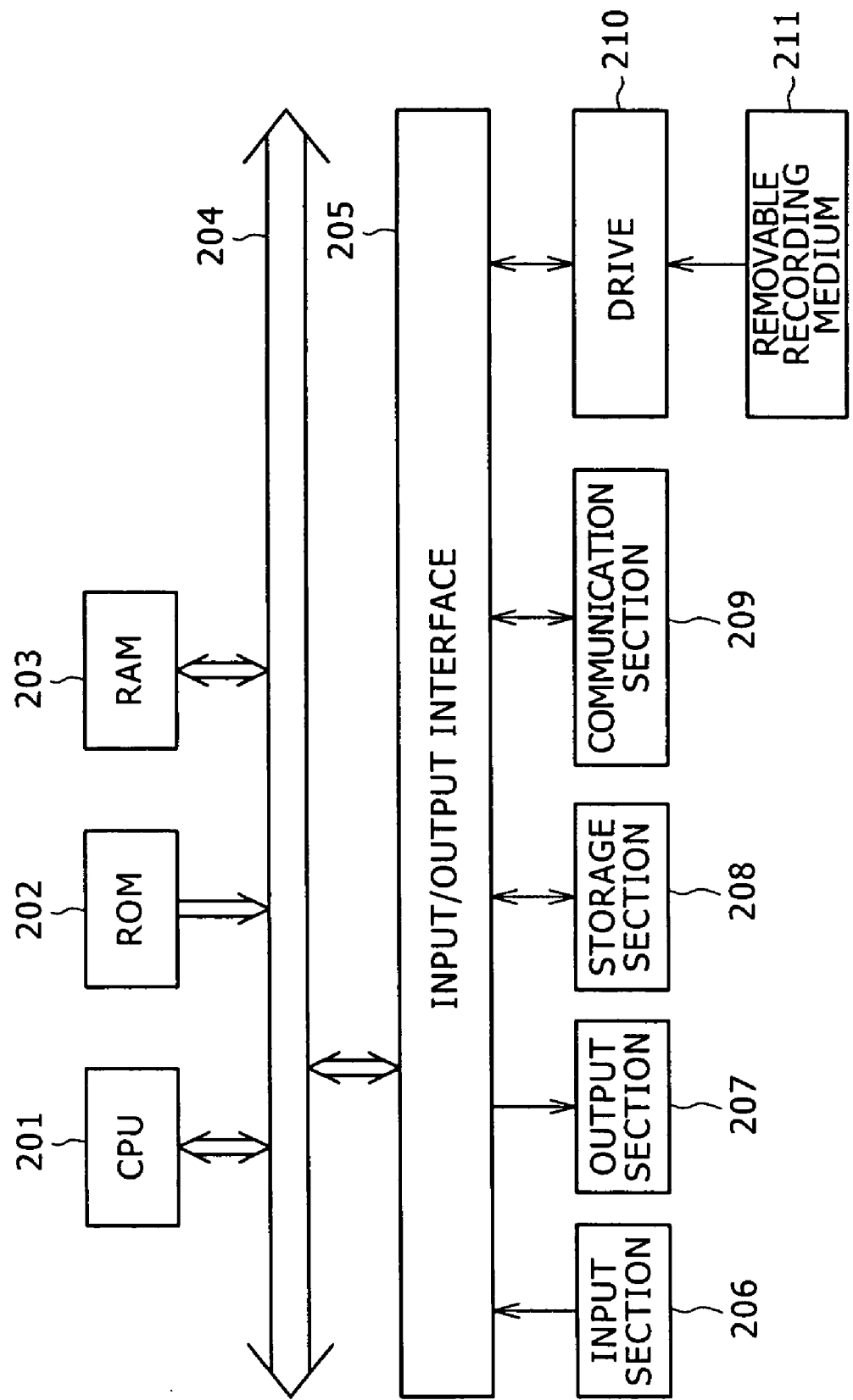

INFORMATION-PROCESSING APPARATUS, INFORMATION-PROCESSING METHODS AND PROGRAMS

CROSS REFERENCE TO RELATED APPLICATIONS

The present application claims priority to Japanese Patent Application No. P2004-112905 filed on Apr. 7, 2004, the disclosure of which is herein incorporated by reference.

BACKGROUND OF THE INVENTION

The present invention relates to an information-processing apparatus, an information-processing method and a program. More particularly, the present invention relates to an information-processing apparatus capable of outputting a second content suitable for a situation faced by the user in course of an operation to output a first content or a situation existing before or after the operation and relates to an information-processing method adopted by the apparatus as well as a program implementing the method.

In recent years, the user is allowed to operate an information-processing apparatus in order to enjoy music or pictures output by the apparatus as BGM (Background Music) or BGV (Background Visual) respectively while the user is utilizing a predetermined content. To put it concretely, the user is allowed to enjoy the BGM or the BGV while, for example, the user is operating the information-processing apparatus to write a text of a mail and send the email to other users or receive a mail from another user and browse the text of the mail. Examples of the information-processing apparatus discussed above include Japanese Patent Laid-open No. 2003-345727; and Japanese Patent Laid-open No. 2003-150507.

However, the conventional information-processing apparatus has a problem that, in order to enjoy the BGM or the BGV by using the conventional apparatus, the user itself generally needs to carry out complicated operations on the apparatus. For example, the user generally needs to operate the information-processing apparatus, specify a desired piece of music and/or a desired picture by specifying their titles and enter a command to start an operation to reproduce the specified music and/or picture.

It is to be noted that, in the case of an operation to write a text of a mail and send the mail to other users, by utilizing the technology disclosed in patent document 1, the user can send the mail with an affection added to the mail. In addition, by utilizing the technology disclosed in patent document 2, a sound for a emoticon included in a mail text can be added to the mail and sent along with the mail.

To a user utilizing an information-processing apparatus receiving such a mail text, however, a sound and/or affection attached to the mail is a sound and/or affection selected by the sender to the bitter end. That is to say, a sound and/or affection attached to the mail is no more than a sound and/or affection selected by the user utilizing an information-processing apparatus transmitting the mail and is not a sound and/or affection selected by the user utilizing an information-processing apparatus receiving the mail. Thus, the conventional information-processing apparatus has a problem that, when a sound attached to the mail is reproduced in another information-processing apparatus, the reproduced sound is not necessarily a sound satisfying the user of the other information-processing apparatus. In other words, it is difficult to output a sound suitable for the situation existing at a time the user browses the mail. In addition, the conventional information-processing apparatus has another problem that it is difficult to express an affection attached to a mail text in terms of music and pictures suitable for the situation on the mail-receiver side.

The example described above raises a problem of using music and/or pictures as a second content while using a first content such as a mail text. It is to be noted, however, that a similar problem is raised with other contents used as the first and second contents.

SUMMARY OF THE INVENTION

The present invention provides in an embodiment an information-processing apparatus capable of outputting a second content suitable for a situation faced by the user in course of an operation to output a first content or a situation existing before or after the operation, an information-processing method adopted by the apparatus as well as a program implementing the method.

In accordance with an embodiment of the present invention, there is provided an information-processing apparatus for outputting a content of a first type and a content of a second type. The information-processing apparatus includes: a history-information generation section for generating history information including one or more pieces of information on the user, which utilized the information-processing apparatus at a point of time the information-processing apparatus output an already used content of the first type and in a time band including the point of time; a history-information storage section for storing one or more pieces of history information generated by the history-information generation section; a second-type-content storage section for storing one or more contents of the second type; and a second-type-content determination section for determining a second-type content regarded as a content whose output operation in course of an operation to output a new content of the first type or before or after the operation to output a new content of the first type is considered to be suitable for the user on the basis of characteristics of one or more second-type contents stored in the second-type-content storage section and one or more pieces of history information stored in the history-information storage section.

The history-information generation section generates history information including at least first characteristic information showing characteristics of an already used content of the first type and second characteristic information showing characteristics of an already used second-type content, which was output from the information-processing apparatus while the already used content of the first type was being output or before or after the already used content of the first type was output; and the second-type-content determination section selects one or more pieces of history information each including first characteristic information identical with or similar to characteristic information showing characteristics of a new content of the first type among one or more pieces of history information stored in the history-information storage section, and determines a second-type content identified by second characteristic information included in each of the selected pieces of history information as a second-type content whose output operation in course of an operation to output a new content of the first type or before or after the operation to output a new content of the first type is considered to be suitable for the user.

The history-information generation section generates first history information including at least first characteristic information showing characteristics of an already used content of the first type and first context information showing a user context at an output time of the already used content of the first type and generates second history information including at least second characteristic information showing characteristics of an already used content of the second type and second context information showing a user context at an output time of the already used content of the second type; the history-information storage section is used for storing the first history information and the second history information; the second-type-content determination section selects one or more pieces of first history information each including first characteristic information identical with or similar to characteristic information showing characteristics of a new content of the first type among one or more pieces of first history information stored in the history-information storage section, acquires first context information included in each of the selected pieces of first history information, selects one or more pieces of second history information each including second context information identical with or similar to the acquired first context information among one or more pieces of second history information stored in the history-information storage section and determines a second-type content identified by second characteristic information included in each of the selected pieces of second history information as a second-type content whose output operation in course of an operation to output a new content of the first type or before or after the operation to output a new content of the first type is considered to be suitable for the user.

The information-processing apparatus further includes a data reception section for receiving a content of the first type and first context information added to the content of the first type as information showing a context of another user from another apparatus used by the other user, the history-information generation section generates first history information including at least first characteristic information showing characteristics of an already used content of the first type and second context information showing a user context at an output time of the already used content of the first type and generates second history information including at least first characteristic information showing characteristics of an already used content of the first type and second characteristic information showing characteristics of an already used second-type content, which was output from the information-processing apparatus while the already used content of the first type was being output or before or after the already used content of the first type was output; the history-information storage section is used for storing the first history information and the second history information; and the second-type-content determination section selects one or more pieces of first history information each including second context information identical with or similar to first context information added to a new first-type content received by the data reception section the among one or more pieces of first history information stored in the history-information storage section, acquires first characteristic information included in each of the selected pieces of first history information, selects one or more pieces of second history information each including second characteristic information identical with or similar to the acquired first characteristic information among one or more pieces of second history information stored in the history-information storage section and determines a second-type content identified by second characteristic information included in each of the selected pieces of second history information as a second-type content whose output operation in course of an operation to output a new content of the first type or before or after the operation to output a new content of the first type is considered to be suitable for the user.

In the information-processing apparatus described above, one or more pieces of history information each including one or more pieces of information on the user, which utilized the information-processing apparatus at a point of time the information-processing apparatus output an already used content of the first type or in a time band including the point of the time, are stored in a storage section. Then, the information-processing apparatus determines a second-type content whose output operation in course of an operation to output a new content of the first type or before or after the operation to output a new content of the first type is considered to be suitable for the user on the basis of characteristics of one or more stored contents of the second type and one or more stored pieces of history information.

In accordance with another embodiment of the present invention, there is provided an information-processing method adopted by an information-processing apparatus including: a content-outputting section for individually outputting a content of a first type and a content of a second type; a first storage section for storing one or more contents of the second type; and a second storage section for storing other information different from the contents of the second type. The information-processing method includes the steps of: generating history information including one or more pieces of information on the user, which utilized the information-processing apparatus at a point of time the content-outputting section output an already used content of the first type and in a time band including the point of time; controlling an operation to store history information in the second storage section each time history information is generated in a process carried out at the step of generating history information; and determining a second-type content regarded as a content whose output operation in course of an operation to output a new content of the first type or before or after the operation to output a new content of the first type is considered to be suitable for the user on the basis of characteristics of one or more second-type contents stored in the first storage section and one or more pieces of history information stored in a process carried out at the step of controlling an operation to store history information in the second storage section.

In accordance with a further embodiment of the present invention, there is provided a program to be executed by a computer for controlling a content-outputting apparatus including: a content-outputting section for individually outputting a content of a first In accordance with the information-processing method and program according to embodiments of the present invention, the target apparatus are an information-processing apparatus and a content-outputting apparatus each including: a content-outputting section for individually outputting a content of a first type and a content of a second type; a first storage section for storing one or more contents of the second type; and a second storage section for storing other information different from the contents of the second type. The information-processing method and the program each include the steps of: generating history information including one or more pieces of information on the user, which utilized the information-outputting apparatus at a point of time the content-outputting section output an already used content of the first type and in a time band including the point of time; controlling an operation to store history information in the second storage section each time history information is generated in a process carried out at the step of generating history information; and determining a second-type content regarded as a content whose output operation in course of an operation to output a new content of the first type or before or after the operation to output a new content of the first type is considered to be suitable for the user on the basis of characteristics of one or more second-type contents stored in the first storage section and one or more pieces of history information stored in a process carried out at the step of controlling an operation to store history information in the second storage section.

As described above, in accordance with the present invention, a content of the second type can be output in course of an operation to output a new content of the first type or before or after the operation to output a new content of the first type. In particular, a second-type content suitable for the present situation of the user can be output in course of an operation to output a new content of the first type or before or after the operation to output a new content of the first type.

BRIEF DESCRIPTION OF THE DRAWINGS

FIG. 5 is a diagram showing typical correlation information generated in the correlation-information generation processing represented by the flowchart shown in FIG. 4.

FIG. 7 is a diagram showing a typical characteristic vector of a main content being utilized or to be utilized by the user.

FIG. 8 is a diagram showing a vector A generated for computing degrees of similarity to the characteristic vector shown in FIG. 7.

FIG. 9 is a diagram showing degrees of similarity resulting from computation as degrees of similarity between the characteristic vector shown in FIG. 7 and characteristic vectors each serving as a column element of the matrix A shown in FIG. 8.

FIG. 10 is a diagram showing typical correlation information generated in the correlation-information generation processing represented by the flowchart shown in FIG. 4.

FIG. 11 is a diagram showing a typical characteristic vector of a main content being utilized or to be utilized by the user.

FIG. 25 is a diagram showing typical characteristics of main contents used in the correlation-information generation processing represented by the flowchart shown in FIG. 24.

FIG. 26 is a diagram showing typical correlation information generated as a result of execution of the correlation-information generation processing represented by the flowchart of FIG. 24 on the main contents shown in FIG. 25.

FIG. 31 is a diagram showing a typical received main content used in the accessory-content determination processing represented by the flowchart shown in FIG. 30.

FIG. 33 shows a flowchart representing typical details of accessory-content determination processing of the reception processing represented by the flowchart shown in FIG. 29.

FIG. 34 is a block diagram showing a typical configuration of hardware employed in an information-processing apparatus according to an embodiment of the present invention.

DETAILED DESCRIPTION OF THE INVENTION

Figure 1:
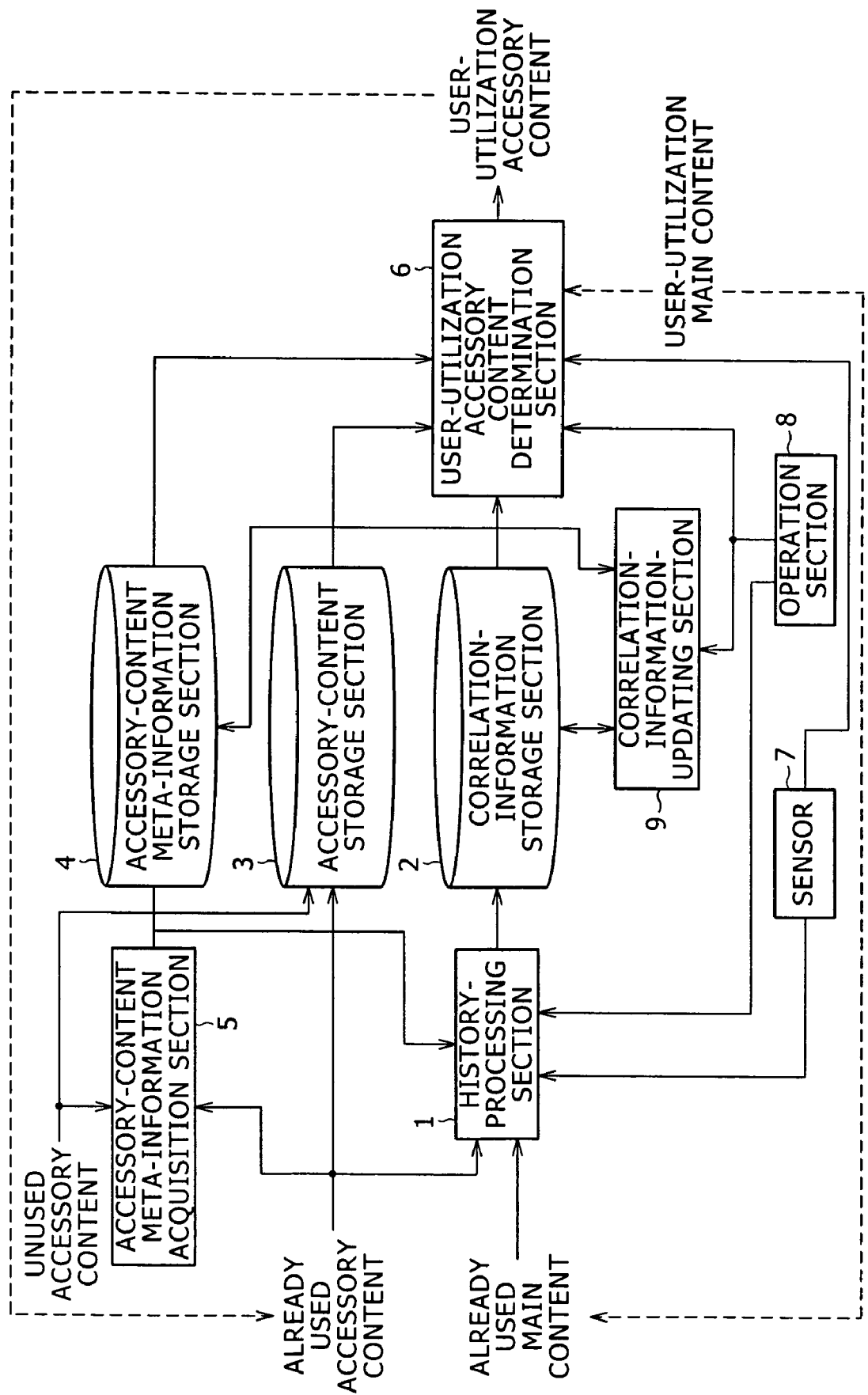
FIG. 1 is a block diagram showing a typical functional configuration of an information-processing apparatus according to an embodiment of the present invention.

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

In accordance with an embodiment of the present invention, there is provided an information-processing apparatus (such as an information-processing apparatus shown in FIG. 1 or a content transmission/reception apparatus 101 shown in FIG. 20) for outputting a content of a first type (the content of the first type is referred to as a main content to be described later and an example of the main content is a mail text also to be explained later) and a content of a second type (the content of the second type is referred to as an accessory content to be described later and examples of the accessory content are a piece of music and image also to be explained later). The information-processing apparatus includes: a history-information generation section (such as a history-processing section 1 shown in FIG. 1 or a history-processing section 116 shown in FIG. 20) for generating history information including one or more pieces of information on the user, which utilized the information-processing apparatus at a point of time the information-processing apparatus output an already used content of the first type (an example of the already used content of the first type is a main content shown in FIG. 1 as a content already used by the user) and in a time band including the point of time; a history-information storage section (such as a correlation-information storage section 2 shown in FIG. 1 or a correlation-information storage section 117 shown in FIG. 20) for storing one or more pieces of history information generated by the history-information generation section; a second-type-content storage section (such as a accessory-content storage section 3 shown in FIG. 1 or a accessory-content storage section 120 shown in FIG. 20) for storing one or more contents of the second type; and a second-type-content determination section (such as a user-utilization accessory-content determination section 6 shown in FIG. 1 or a user-utilization accessory-content determination section 119 shown in FIG. 20) for determining a second-type content (such as an accessory content shown in FIG. 1 as a content to be utilized by the user) regarded as a content whose output operation in course of an operation to output a new content of the first type (an example of the new content of the first type is a main content shown in FIG. 1 as a content to be utilized by the user) or before or after the operation to output a new content of the first type is considered to be suitable for the user on the basis of characteristics of one or more second-type contents stored in the second-type-content storage section and one or more pieces of history information stored in the history-information storage section.

Figure 6:
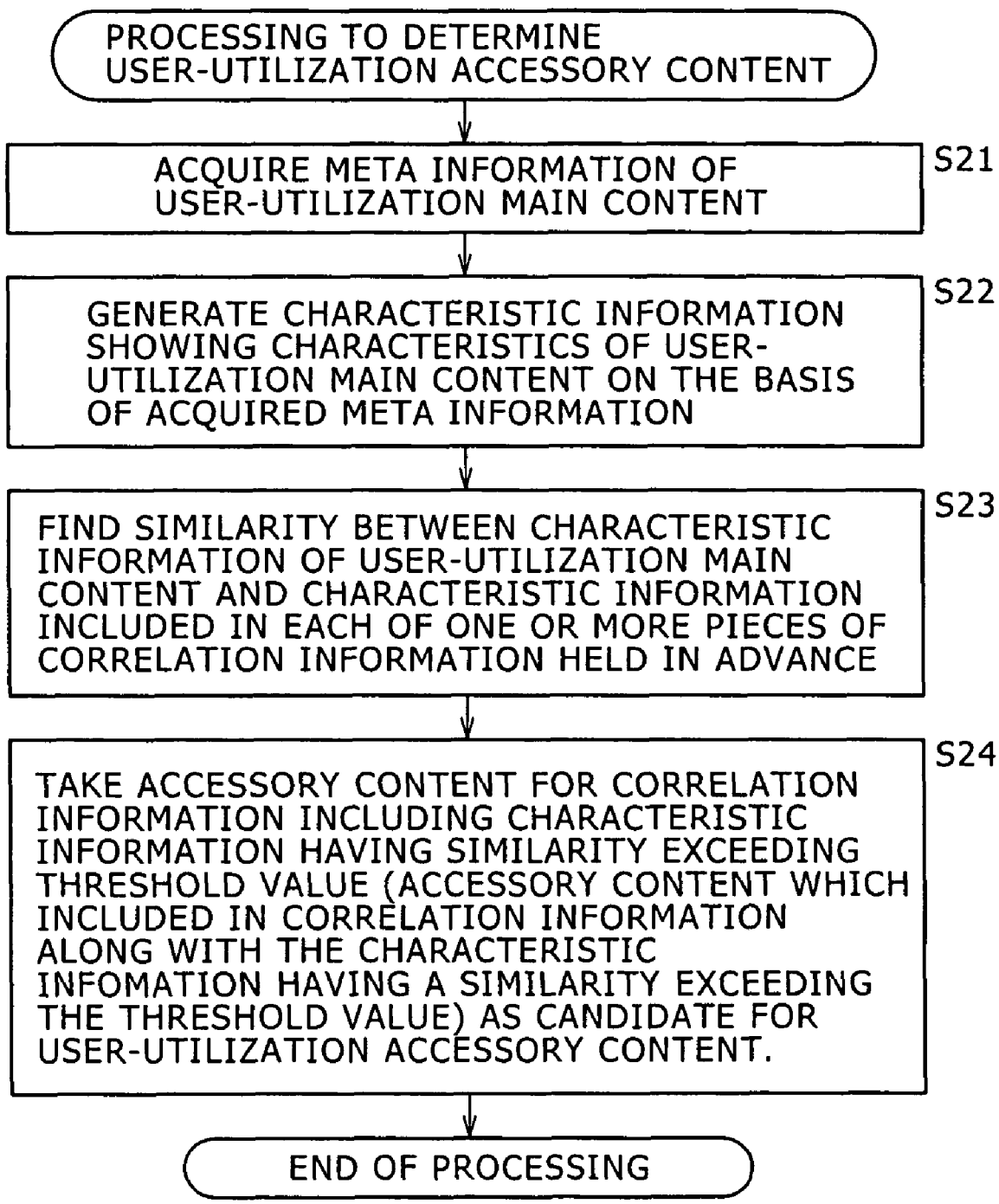
FIG. 6 shows a flowchart representing processing carried out by the information-processing apparatus of FIG. 1 to determine an accessory content to be utilized by the user.

In the above information-processing apparatus (such as the information-processing apparatus shown in FIG. 1): the history-information generation section generates history information (such as pieces of correlation information CI1, CI2 and CI3 shown in FIG. 5) including at least first characteristic information showing characteristics of an already used content of the first type and second characteristic information showing characteristics of an already used second-type content, which was output from the information-processing apparatus while the already used content of the first type was being output or before or after the already used content of the first type was output; and the second-type-content determination section: selects one or more pieces of history information each including first characteristic information identical with or similar to characteristic information showing characteristics of a new content of the first type among one or more pieces of history information stored in the history-information storage section; and determines (for example, by carrying out processing represented by a flowchart shown in FIG. 6 as processing to determine an accessory content to be utilized by the user) a second-type content identified by second characteristic information included in each of the selected pieces of history information as a second-type content whose output operation in course of an operation to output a new content of the first type or before or after the operation to output a new content of the first type is considered to be suitable for the user.

Figure 20:
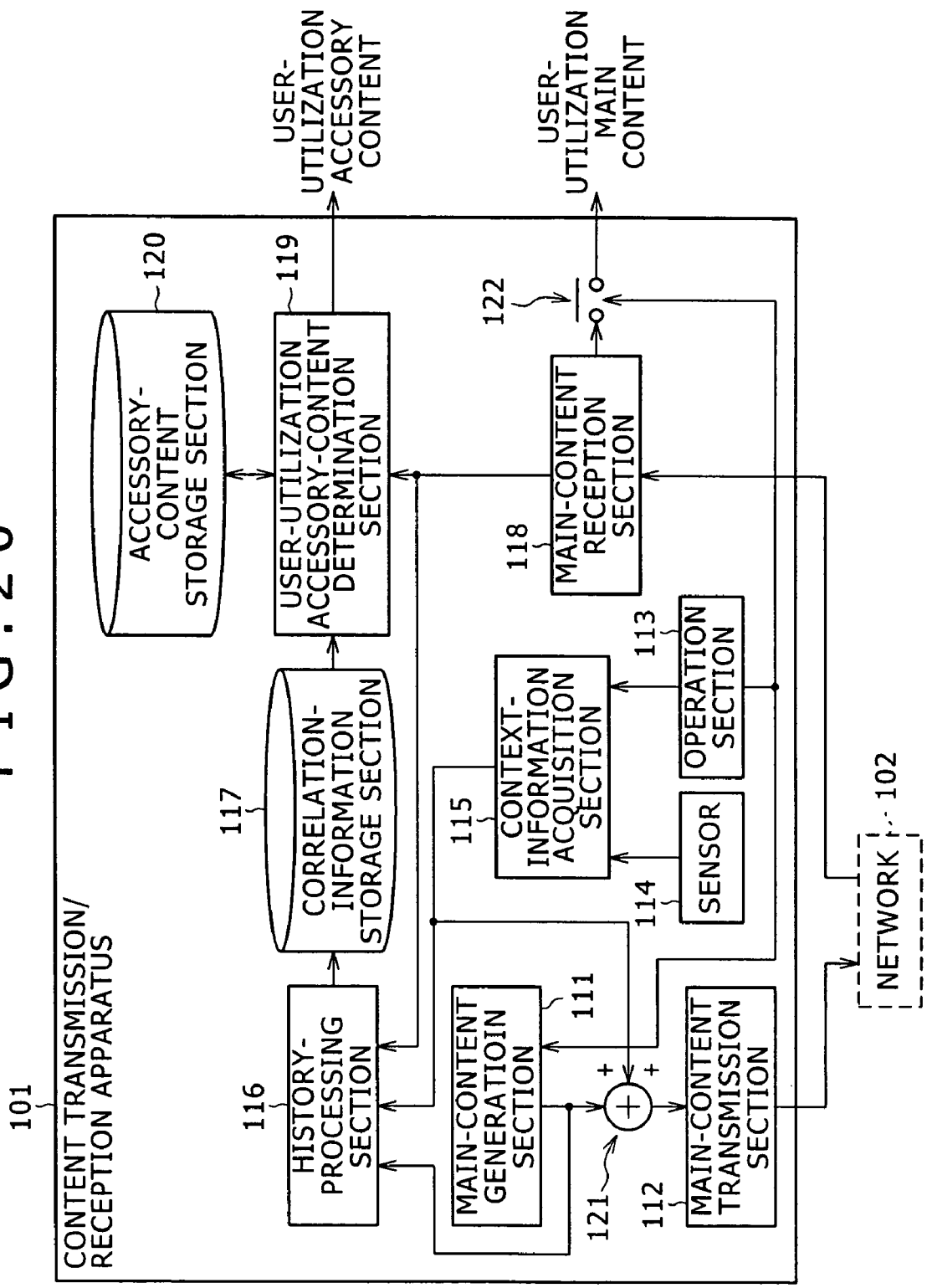
FIG. 20 is a block diagram showing a typical functional configuration of a content transmission/reception apparatus employed in the information-processing system shown in FIG. 19.
Figure 22:
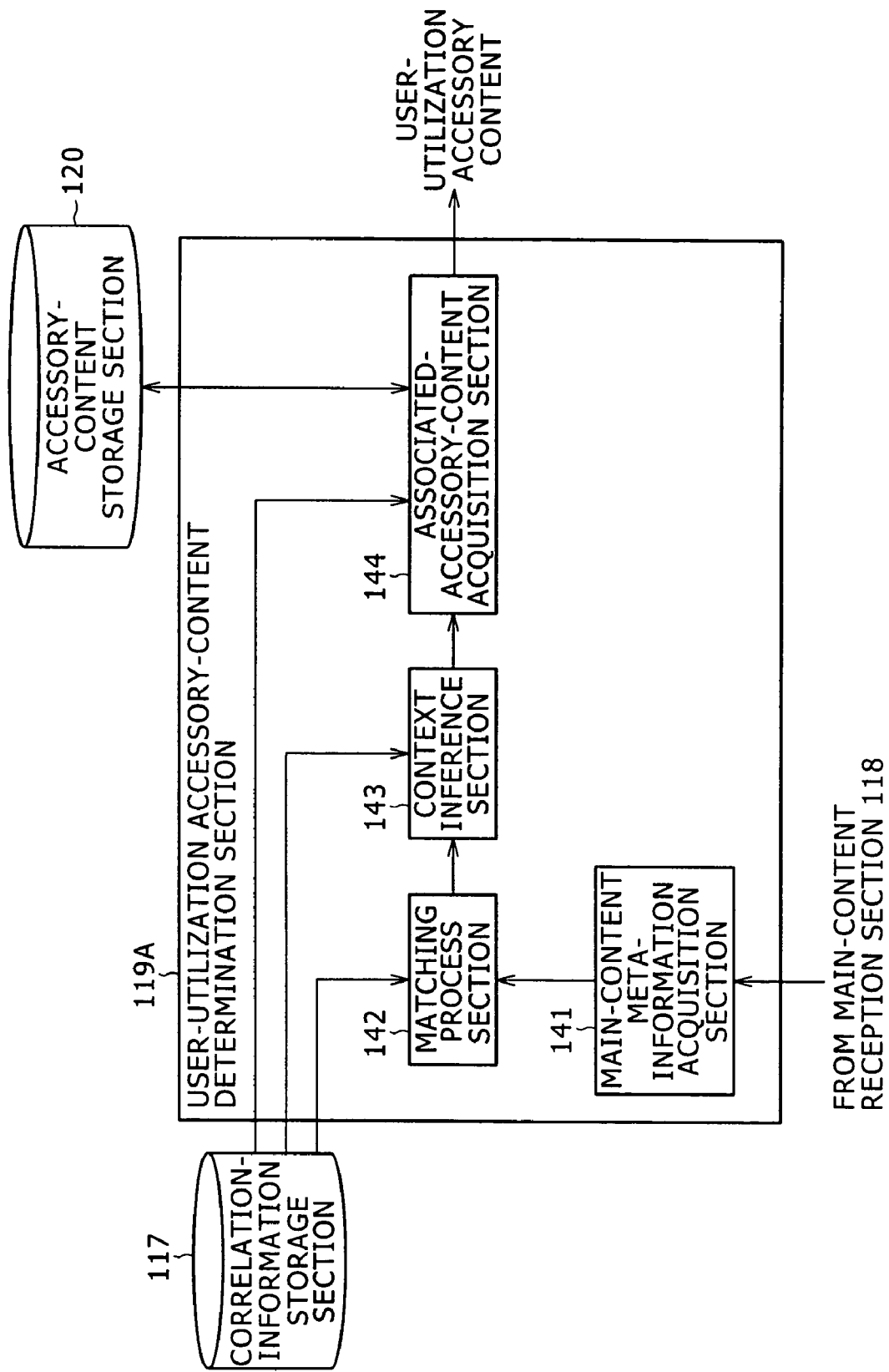
FIG. 22 is a diagram showing details of a typical functional configuration of a user-utilization accessory-component determination section employed in the content transmission/reception apparatus shown in FIG. 20.
Figure 28:
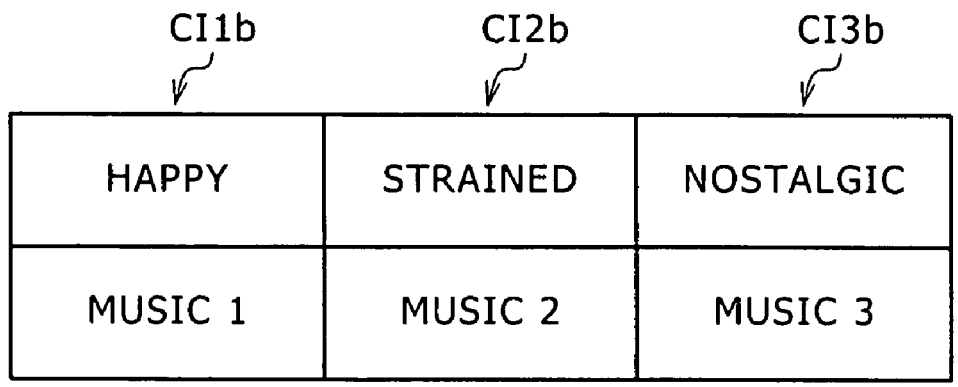
FIG. 28 is a diagram showing typical correlation information generated as a result of execution of the correlation-information generation processing represented by the flowchart of FIG. 27 on the main contents shown in FIG. 25.
Figure 30:
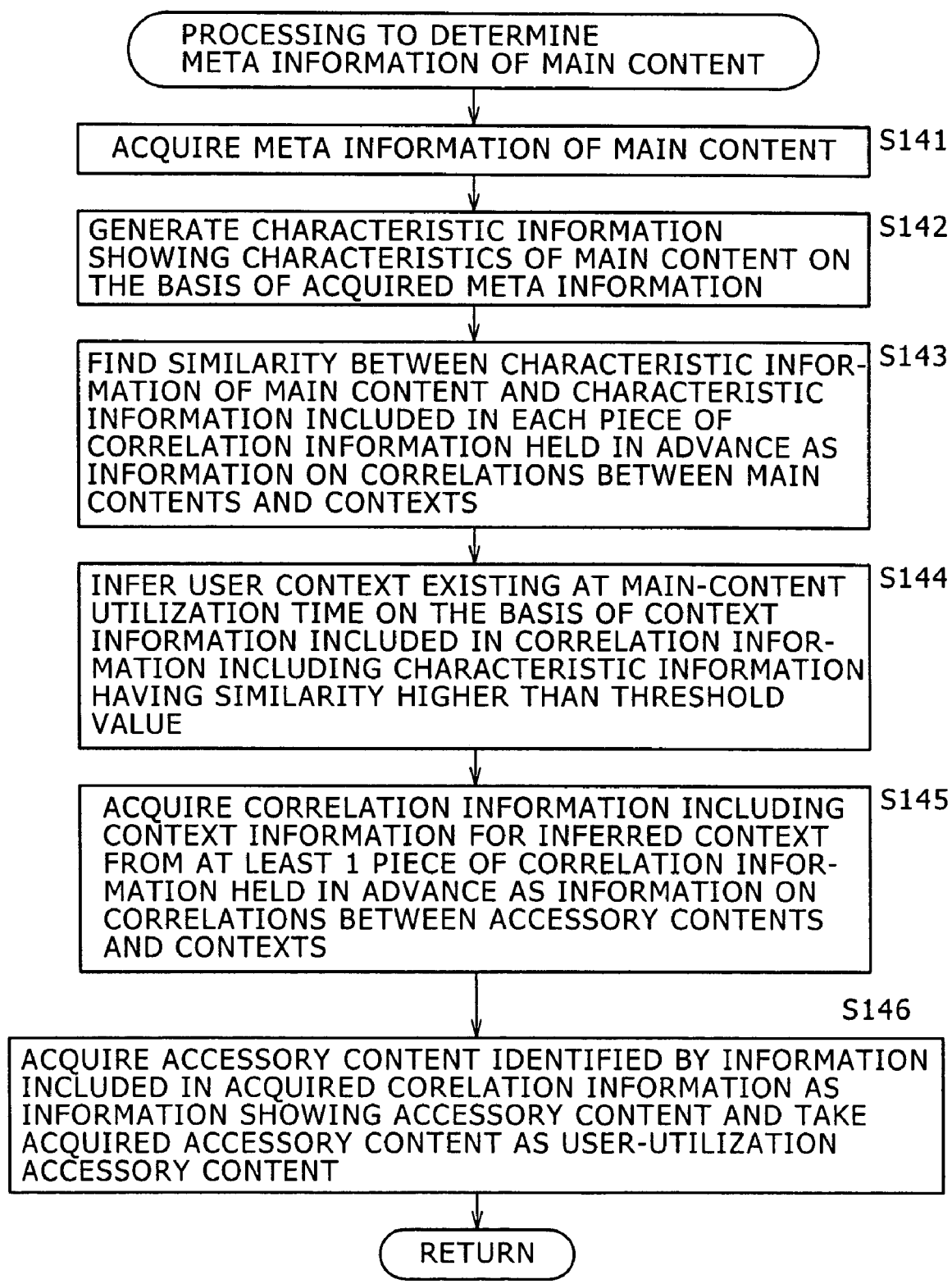
FIG. 30 shows a flowchart representing typical details of accessory-content determination processing of the reception processing represented by the flowchart shown in FIG. 29.

In the above information-processing apparatus (such as the content transmission/reception apparatus 101 shown in FIG. 20): the history-information generation section generates: first history information (such as pieces of correlation information CI1$a$, CI2$a$ and CI3$a$ shown in FIG. 26) including at least first characteristic information showing characteristics of an already used content of the first type and first context information showing a user context at an output time of the already used content of the first type; and second history information (such as pieces of correlation information CI1$b$, CI2$b$ and CI3$b$ shown in FIG. 28) including at least second characteristic information showing characteristics of an already used content of the second type and second context information showing a user context at an output time of the already used content of the second type; the history-information storage section is used for storing the first history information and the second history information; the second-type-content determination section (such as a user-utilization accessory-content determination section 119A shown in FIG. 22): selects one or more pieces of first history information each including first characteristic information identical with or similar to characteristic information showing characteristics of a new content of the first type among one or more pieces of first history information stored in the history-information storage section; acquires first context information included in each of the selected pieces of first history information; selects one or more pieces of second history information each including second context information identical with or similar to the acquired first context information among one or more pieces of second history information stored in the history-information storage section; and determines (for example, by carrying out processing represented by a flowchart shown in FIG. 30 as processing to determine an accessory content) a second-type content identified by second characteristic information included in each of the selected pieces of second history information as a second-type content whose output operation in course of an operation to output a new content of the first type or before or after the operation to output a new content of the first type is considered to be suitable for the user.

Figure 19:
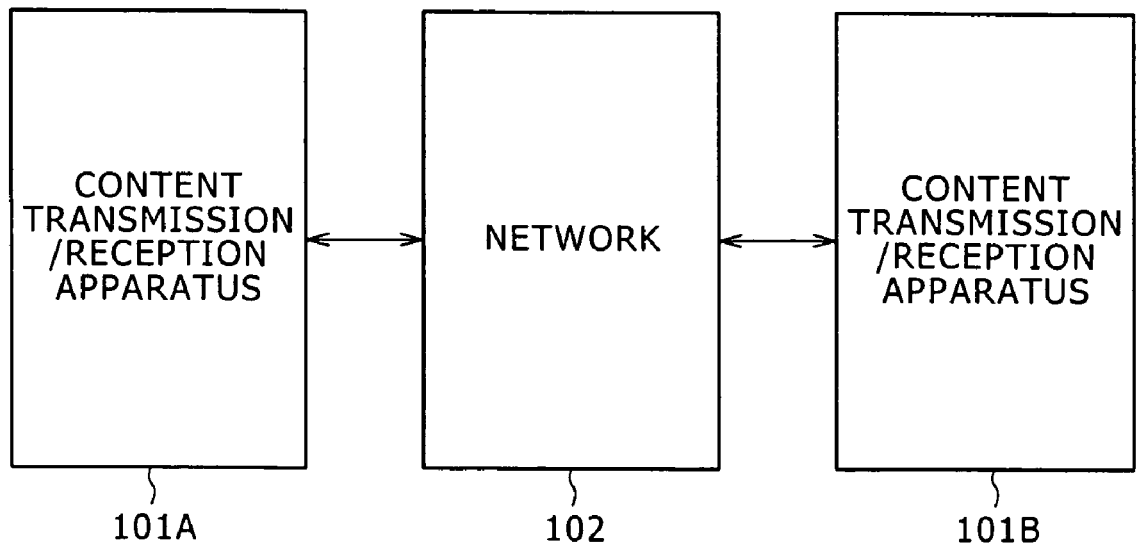
FIG. 19 is a block diagram showing a typical configuration of an information-processing system according to an embodiment of the present invention.
Figure 32:
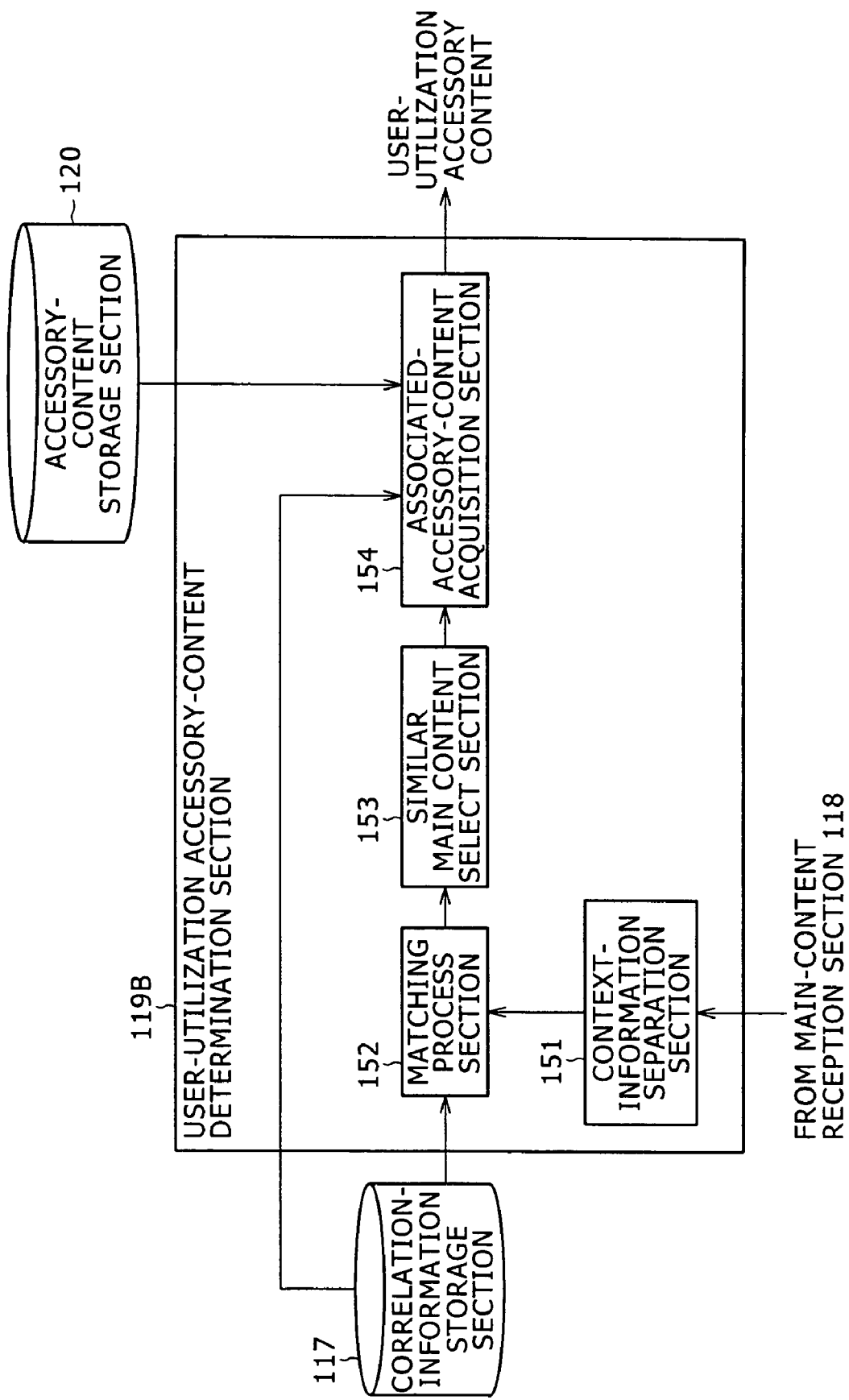
FIG. 32 is a block diagram showing typical details of a functional configuration of a user-utilization accessory-content determination section employed in the content transmission/reception apparatus shown in FIG. 20.

In the above information-processing apparatus (such as the content transmission/reception apparatus 101 shown in FIG. 20): the apparatus further includes a data reception section (such as a main-content reception section 118 shown in FIG. 20) for receiving a content of the first type and first context information added to the content of the first type as information showing a context of another user from another apparatus (such as a content transmission/reception apparatus 101B shown in FIG. 19 for a content transmission/reception apparatus 101A serving as the content transmission/reception apparatus 101 shown in FIG. 20) used by the other user, the history-information generation section generates: first history information (such as the pieces of correlation information CI1a, CI2a and CI3a shown in FIG. 26) including at least first characteristic information showing characteristics of an already used content of the first type and second context information showing a user context at an output time of the already used content of the first type; and second history information (such as pieces of correlation information CI1, CI2 and CI3 shown in FIG. 5) including at least first characteristic information showing characteristics of an already used content of the first type and second characteristic information showing characteristics of an already used second-type content, which was output from the information-processing apparatus while the already used content of the first type was being output or before or after the already used content of the first type was output; the history-information storage section is used for storing the first history information and the second history information; and the second-type-content determination section (such as a user-utilization accessory-content determination section 119B shown in FIG. 32): selects one or more pieces of first history information each including second context information identical with or similar to first context information added to a new first-type content received by the data reception section the among one or more pieces of first history information stored in the history-information storage section; acquires first characteristic information included in each of the selected pieces of first history information; selects one or more pieces of second history information each including second characteristic information identical with or similar to the acquired first characteristic information among one or more pieces of second history information stored in the history-information storage section; and determines (for example, by carrying out processing to determine an accessory content shown in FIG. 33) a second-type content identified by second characteristic information included in each of the selected pieces of second history information as a second-type content whose output operation in course of an operation to output a new content of the first type or before or after the operation to output a new content of the first type is considered to be suitable for the user.

In accordance with another embodiment of the present invention, there is provided an information-processing method adopted by an information-processing apparatus (such as the information-processing apparatus shown in FIG. 1 or the content transmission/reception apparatus 101 shown in FIG. 20) including: a content-outputting section (such as the user-utilization accessory-content determination section 6 shown in FIG. 1. However, FIG. 1 does not show explicitly an operation to output a content of a first type. Other examples of the content-outputting section are an output functional portion of a user-utilization accessory-content determination section 119 shown in FIG. 20, an output functional portion of a main-content transmission section 112 shown in the same figure and an output functional portion of a main-content reception section 118 shown in the same figure) for individually outputting a content of a first type and a content of a second type; a first storage section (such as a accessory-content storage section 3 shown in FIG. 1 or a accessory-content storage section 120 shown in FIG. 20) for storing one or more contents of the second type; and a second storage section (such as a correlation-information storage section 2 shown in FIG. 1 or a correlation-information storage section 117 shown in FIG. 20) for storing other information different from the contents of the second type. The information-processing method includes the steps of: generating history information including one or more pieces of information on the user, which utilized the information-processing apparatus at a point of time the content-outputting section output an already used content of the first type and in a time band including the point of time (for example, by carrying out correlation-information generation processing represented by a flowchart shown in FIG. 4, 17, 24 or 27); controlling an operation to store history information in the second storage section each time history information is generated in a process carried out at the step of generating history information (for example, by carrying out the last portion of the correlation-information generation processing represented by a flowchart shown in FIG. 4, 17, 24 or 27); and determining a second-type content regarded as a content whose output operation in course of an operation to output a new content of the first type or before or after the operation to output a new content of the first type is considered to be suitable for the user on the basis of characteristics of one or more second-type contents stored in the first storage section and one or more pieces of history information stored in a process carried out at the step of controlling an operation to store history information in the second storage section (for example, by carrying out the processing represented by the flowchart shown in FIG. 6 or 16 as processing to determine an accessory content to be utilized by the user, the processing represented by the flowchart shown in FIG. 30 as processing to determine an accessory content or the processing represented by the flowchart shown in FIG. 33 as processing to determine an accessory content).

In accordance with a further embodiment of the present invention, there is provided a program to be executed by a computer such as a personal computer shown in FIG. 34 as a program for implementing the above information-processing method provided in accordance with the other embodiment of the present invention.

Next, embodiments of the present invention are explained by referring to diagrams.

FIG. 1 is a diagram showing a typical functional configuration of an information-processing apparatus according to an embodiment of the present invention.

As shown in FIG. 1, the information-processing apparatus has components ranging from a history-processing section 1 to a correlation-information-updating section 9. However, a sensor 7 and an operation section 8 can each be included as an internal component or an external component connected to the information-processing apparatus.

In addition, each of the components ranging from the history-processing section 1 to the correlation-information-updating section 9 is not specially limited to a specific configuration. In particular, the history-processing section 1, an accessory-content meta-information acquisition section 5, a user-utilization accessory content determination section 6 and the correlation-information-updating section 9 can each be implemented by software, hardware or a combination of software and hardware.

By the way, an apparatus according to an embodiment of the present invention handles a content to be utilized by the user as data, that is, in the form of content data. Contents to be utilized by the user include a content to be used in a trial or an experiment. As described above, the information-processing apparatus having the functional configuration shown in FIG. 1 is an example of the apparatus according to an embodiment of the present invention.

It is to be noted that, in this specification, what is generally referred to as a content is a wide concept including all kinds of hardware and software that can be utilized by the user, such as, a TV broadcast program, a movie, a picture, a piece of music, a text, a commodity including goods, conversations and the like. The piece of music includes a moving image, a still picture, a sound and their combination. In the case of a goods (hardware) content, however, data obtained as a result of projecting the goods as a moving and/or still picture is handled as content data.

If the user has utilized, is utilizing or will utilize contents of two or more types at the same time, the content intended as the main utilization purpose of the user is referred to hereafter as the main content. On the other hand, a content intended as a secondary utilization purpose of the user is referred to hereafter as an accessory content. A typical accessory content is the so-called BGM cited before.

A method for determining whether a content is a main or accessory content is not specially prescribed. In the following description, the main and accessory contents are typically determined in advance in order to make the explanation simple. In addition, a content defined in this specification as described above can be used as a main or accessory content. In the explanation of the information-processing apparatus shown in FIG. 1, however, a text handled by the user is used as the main content. As an accessory content, on the other hand, a piece of music serving as the so-called BGM or a content serving as the so-called BGV is used. A content serving as the so-called BGV can be a static picture or a moving image and, if necessary, a sound accompanying the moving image.

The main content can be a main content already utilized by the user or a main content being utilized or to be utilized by the user. A main content already utilized by the user is referred to as an already used main content. On the other hand, a main content being utilized or to be utilized by the user is referred to as a user-utilization main content. By the same token, an accessory content can be an accessory content already utilized by the user or an accessory content being utilized or to be utilized by the user. An accessory content already utilized by the user is referred to as an already used accessory content. On the other hand, a accessory content being utilized or to be utilized by the user is referred to as a user-utilization accessory content.

Next, the typical functional configuration of the information-processing apparatus shown in FIG. 1 is explained in detail.

Every time a pair of already used main and accessory contents is supplied, the history-processing section 1 generates a history including one or more pieces of information on the user utilizing the information-processing apparatus of FIG. 1 at a point of time the already used main content was output and in a time band including the point of time. In place of the already used accessory content, meta information is supplied by the accessory-content meta-information acquisition section 5 to be described later as meta information of the already used accessory content.

For example, the history-processing section 1 generates information on correlation between the already used main content and the already used accessory content, and stores the correlation information in the correlation-information storage section 2. Examples of the correlation information are pieces of correlation information CI1, CI2, CI3 and so on shown in FIG. 5. Details and examples of the correlation information will be described later.

As will be described later in detail, the history-processing section 1 is capable of acquiring context information from information supplied by the sensor 7 or the operation section 8 and including the context information in the information on a correlation between the already used main content and the already used accessory content. The context information of a user is information showing the context in which the user utilizes an input already used main content.

It is to be noted that, in this specification, a context of a user is all internal and external conditions of the user. The internal condition of the user includes the physical shape and emotion of the user. The emotion of a user includes the mood and psychological condition of the user. The external condition of a user includes a spatial position and time-wise position of the user. The time-wise position is typically the present time. The external condition of a user also includes a predetermined condition such as a distribution in spatial directions and a distribution in the time-axis direction or a distribution in the spatial directions as well as the time-axis direction.

As described above, the correlation-information storage section 2 is thus used for storing one or more pieces of correlation information generated by the history-processing section 1 as history information.

The accessory-content storage section 3 is a memory used for storing already used accessory contents each corresponding to one of the one or more pieces of correlation information stored in the correlation-information storage section 2. In addition, an unused accessory content supplied by the user from an external source is also stored in the accessory-content storage section 3. The unused accessory content supplied by the user from an external source is referred to hereafter as a user unused accessory content.

The accessory-content meta-information storage section 4 is a memory for information acquired by the accessory-content meta-information acquisition section 5 as meta information of an accessory content. In the following description, the meta information of an accessory content is referred to as accessory-content meta information in order to distinguish it from main-content meta information, which is meta information of a main content.

The accessory-content meta-information acquisition section 5 acquires accessory-content meta information every time an already used accessory content or a user unused accessory content is supplied to the accessory-content meta-information acquisition section 5 and stores the acquired accessory-content meta information in the accessory-content meta-information storage section 4. If necessary, the accessory-content meta-information acquisition section 5 also supplies the acquired accessory-content meta information to the history-processing section 1.

It is to be noted that, in this specification, the accessory-content meta information is information described below. The accessory content is data of music used as the BGM or data of a picture (or a moving image accompanied by sounds) used as the BGV. Thus, the accessory-content meta information used in this specification is not merely the ordinary meta information such as the meta information of a program.

Instead, the accessory-content meta information used in this specification is a wide concept of information expressed in terms of words. The information expressed in terms of words includes numerical values. An example of the information expressed in terms of words is a result of an analysis such as an analysis of characteristics of a piece of music or a picture. The characteristics of a piece of music or a picture include a tempo, a rhythm, an instrument and a libretto. In other words, any information relevant to an accessory content can be accessory-content meta information as long as the information is information on one or more characteristics of an accessory content.

Thus, the accessory-content meta information can be information acquired from the accessory content itself or acquired as information distributed (supplied) separately from the accessory content. An example of the information distributed (supplied) separately from the accessory content is program information such as an EPG (Electronic Program Guide).

The user-utilization accessory-content determination section 6 is a component for selecting a user-utilization accessory content suitable for an input user-utilization main content from one or more accessory contents stored in the accessory-content storage section 3. On the basis of the past history of the user, the user-utilization accessory-content determination section 6 determines that the selected user-utilization accessory content is a user-utilization accessory content suitable for the user. Then, the user-utilization accessory-content determination section 6 reads out the selected user-utilization accessory content from the accessory-content storage section 3 and outputs the user-utilization accessory content to an external destination. In a process to confirm the user-utilization accessory content determined to be a user-utilization accessory content suitable for the user, the user-utilization accessory-content determination section 6 refers to correlation information stored in the correlation-information storage section 2, context information based on information received from the sensor 7 and/or the operation section 8, accessory-content meta information stored in the accessory-content meta-information storage section 4 or a combination of at least one of these pieces of information. Details of the processing to select and confirm a user-utilization accessory content will be described later.

It is to be noted that, as shown by an upper dotted line in FIG. 1, a user-utilization accessory content already output by the user-utilization accessory-content determination section 6 is utilized as an already used accessory content if necessary. By the same token, after being output, a user-utilization main content associated with the user-utilization accessory content is utilized as an already used main content if necessary.

The correlation-information-updating section 9 updates at least part of one or more pieces of correlation information stored in the correlation-information storage section 2 on the basis of accessory-content meta information stored in the accessory-content meta-information storage section 4 and a history of user operations received from the operation section 8.

Figure 2:
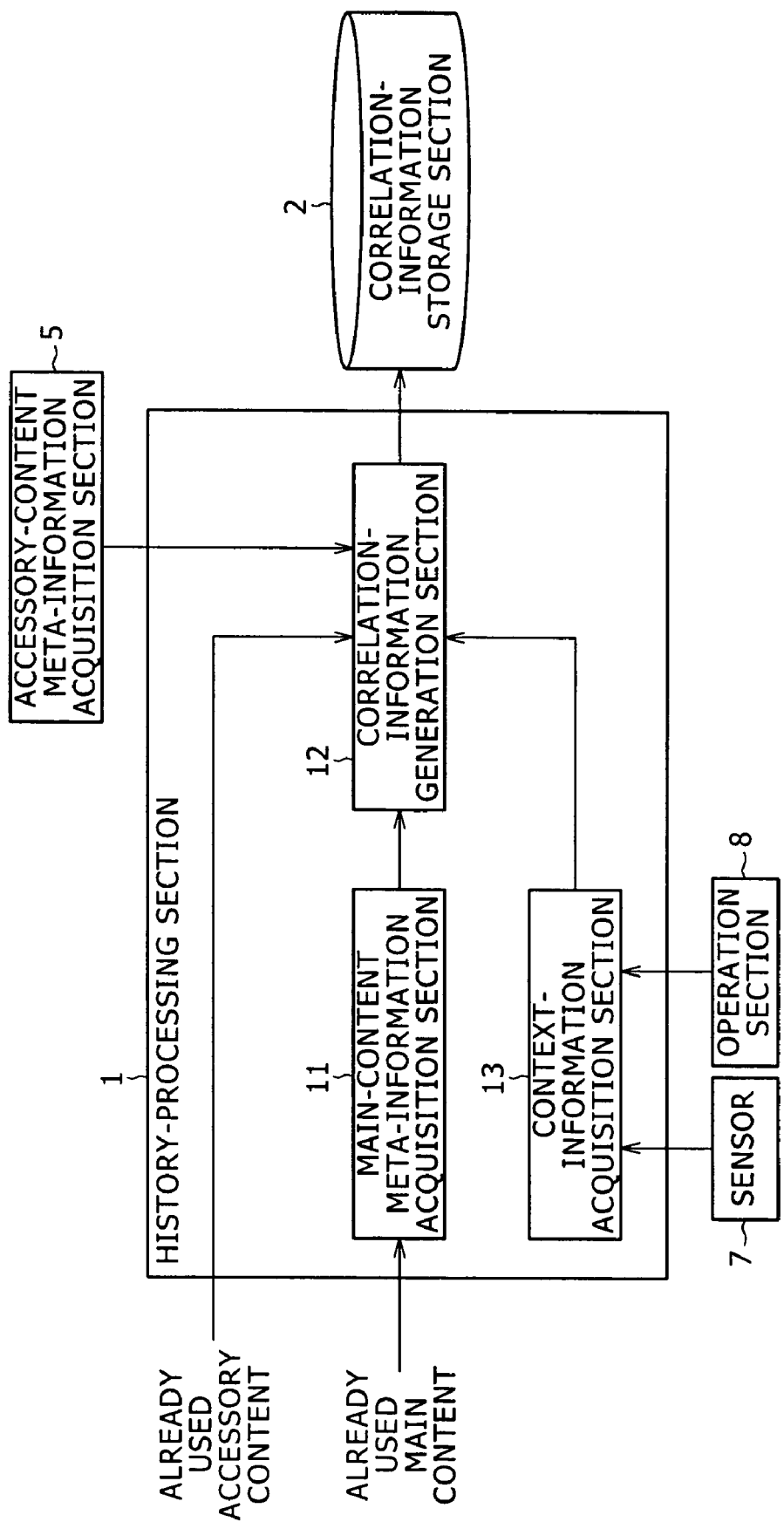
FIG. 2 is a block diagram showing a typical functional configuration of a history-processing section employed in the information-processing apparatus shown in FIG. 1.

Next, by referring to FIG. 2, a typical functional configuration of the history-processing section 1 is explained in detail. FIG. 2 is a diagram showing a typical functional configuration of the history-processing section 1 in detail.

Every time an already used main content is supplied to the history-processing section 1, a main-content meta-information acquisition section 11 acquires meta information from the already used main content and supplies the acquired meta information to the correlation-information generation section 12. The acquired meta information is referred to as main-content meta information in order to distinguish it from the accessory-content meta information.

It is to be noted that, in this specification, the main-content meta information is information described as follows. For example, the main content is not an ordinary content but, as described above, a private text of the user. An example of the private text is a mail text to be described later. Thus, in this specification, main-content meta information is not just ordinary meta information such as meta data of a program. Instead, the main-content meta information used in this specification is a wide concept of information expressed in terms of words. The information expressed in terms of words includes numerical values. Examples of the information expressed in terms of words are the content itself, a portion of the content or attributes of the content. In this case, the content is a content of a wide concept. In other words, any information relevant to a main content can be main-content meta information as long as the information is information on one or more characteristics of the main content.

Thus, main-content meta information can be information acquired from the main content itself or information acquired as information distributed (supplied) separately from the main content. An example of the information distributed (supplied) separately from the main content is program information such as an EPG (Electronic Program Guide).

For example, the main content is a text. In this case, the main-content meta-information acquisition section 11 divides the text of an input already used main content into predetermined units such as sentences or paragraphs, analyzes each of the units obtained as a result of the division and disassembles each of the units into words such as the words "travel" and "schedule" shown in FIG. 5. The main-content meta-information acquisition section 11 then supplies the words to the correlation-information generation section 12.

The correlation-information generation section 12 generates correlation information associating main-content meta information supplied from the main-content meta-information acquisition section 11 as main-content meta information associated with an already used main content with the already used accessory content, which is an accessory content used at the same time as the already used main content associated with the supplied main-content meta information. Examples of the correlation information are pieces of correlation information CI1, CI2 and CI3 shown in FIG. 5. The correlation-information generation section 12 then supplies the generated correlation information to the correlation-information storage section 2. It is to be noted that details of the correlation information will be described later by giving examples.

In place of the already used accessory content, accessory-content meta information for the already used accessory content may be supplied to the correlation-information generation section 12 from the accessory-content meta-information acquisition section 5 in some cases or, as an alternative, the accessory-content meta information for the already used accessory content may be supplied to the correlation-information generation section 12 from the accessory-content meta-information acquisition section 5 along with the already used accessory content. In this case, the correlation-information generation section 12 generates correlation information on the basis of the accessory-content meta information for the already used accessory content.

In addition, the correlation-information generation section 12 is capable of including context information received from the context-information acquisition section 13 in the correlation information.

That is to say, the context-information acquisition section 13 acquires context information of the user from information supplied by the sensor 7 or the operation section 8, or from information obtained as a result of conversion of the information supplied by the sensor 7 or the operation section 8, and supplies the context information to the correlation-information generation section 12. The context information is information on a context prevailing at a point of time the user utilized the already used main content and the already used accessory content for the already used main content all being processed by the history-processing section 1.

To put in detail, the operation section 8 typically includes a keyboard, a mouse and other input interfaces. The user operates the operation section 8 to enter signals showing a variety of contexts to the context-information acquisition section 13.

Then, the context-information acquisition section 13 analyzes the signals received from the operation section 8 in order to convert them into data expressed in terms of words and supplies the data to the correlation-information generation section 12 as context information.

In addition, assume for example that the sensor 7 includes a sensor for detecting an external context of the user and a sensor for detecting its internal context. That is to say, the sensor 7 is a sensor group comprising not only a sensor for detecting one context but also one sensor or a plurality of sensors capable of detecting at least two contexts. The number of contexts detectable by the sensor 7 and the types of the contexts are not specially prescribed. To put it concretely, examples of the sensor for detecting an external context are a GPS (Global Positioning System) for detecting information on the present position of the user, a clock for measuring/detecting the present time and a radio communication apparatus for detecting a person or a thing existing in the surroundings of the user. On the other hand, an example of the sensor for detecting an internal context is a sensor for detecting the number of pulse beats, the number of breaths, sweating or the opening of an eye.

If the information received from the sensor 7 is numerical data, the context-information acquisition section 13 supplies the numerical data to the correlation-information generation section 12 as context information. The numerical data may be updated in accordance with a predetermined rule in some cases before being supplied to the correlation-information generation section 12. If the information received from the sensor 7 is information other than numerical data, on the other hand, the context-information acquisition section 13 analyzes the received information, converting the information into data expressed in terms of words including numbers. The context-information acquisition section 13 then supplies the data expressed in terms of words to the correlation-information generation section 12 as context information.

Figure 3:
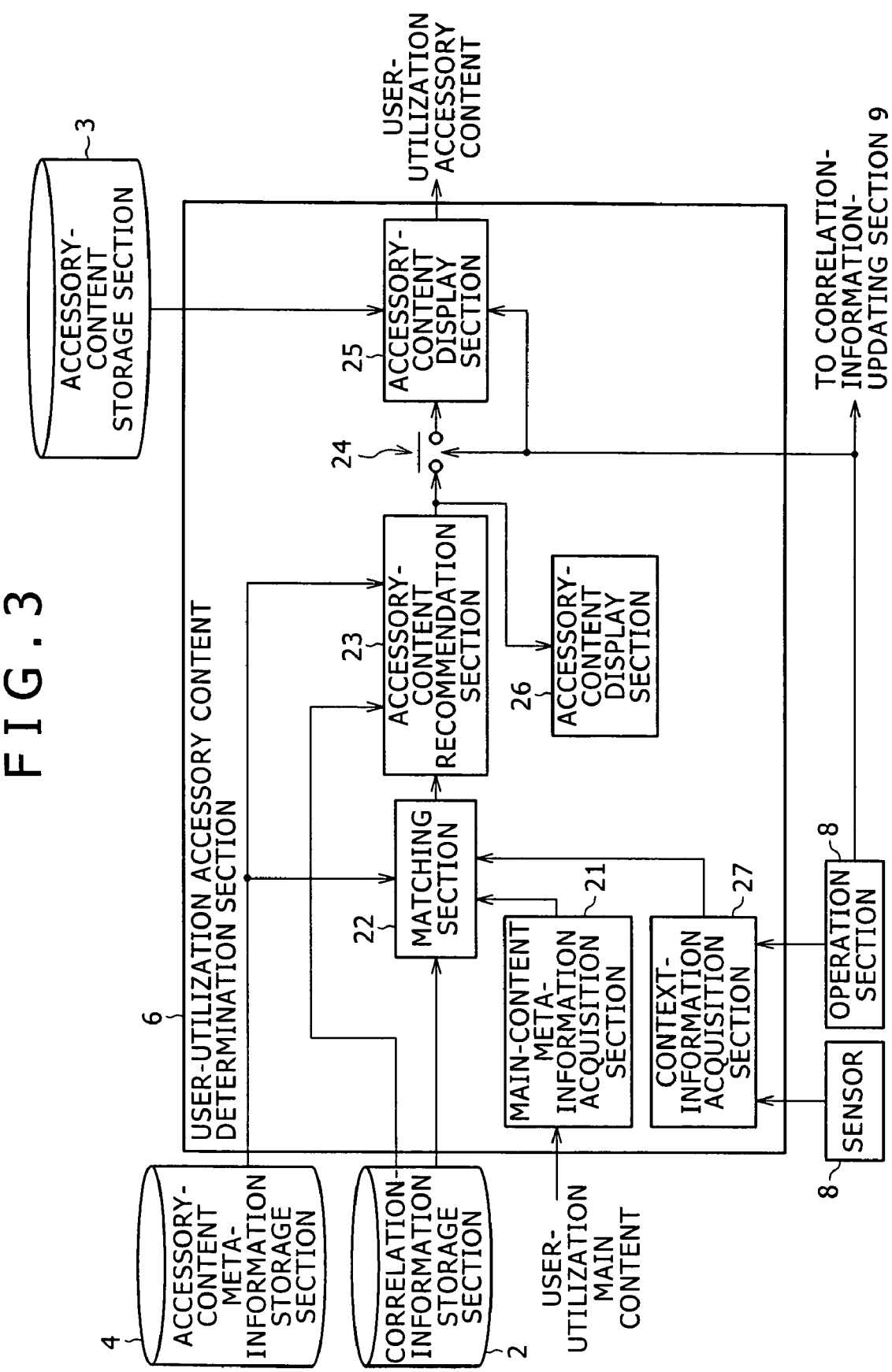
FIG. 3 is a block diagram showing a typical functional configuration of a user-utilization accessory-content determination section employed in the information-processing apparatus shown in FIG. 1.

By referring to FIG. 3, the following description explains details of a typical functional configuration of the user-utilization accessory-content determination section 6. FIG. 3 is a diagram showing details of a typical functional configuration of the user-utilization accessory-content determination section 6.

A main-content meta-information acquisition section 21 has basically the same configuration and functions as the main-content meta-information acquisition section 11 shown in FIG. 2. However, the main-content meta-information acquisition section 21 receives a main content presently being utilized by the user or a main content scheduled to be utilized by the user from now on. As described above, a main content presently being utilized by the user and a main content scheduled to be utilized from now on are referred to as a user-utilization main content. Thus, the main-content meta-information acquisition section 21 acquires main-content meta information for the user-utilization main content and supplies the main-content meta information to a matching section 22.

The matching section 22 is a component for receiving the main-content meta information for the user-utilization main content from the main-content meta-information acquisition section 21. To put it concretely, the matching section 22 receives characteristic vectors to be described later. The characteristic vectors are vectors each generated as a vector having one or more pieces of main-content meta information for the user-utilization main content as components. To put it more concretely, the matching section 22 acquires characteristic vectors CCV1, CCV2, CCV3 and so on to be described later by referring to FIG. 5.

In addition, the matching section 22 acquires main-content meta information included in each of one or more pieces of correlation information stored in the correlation-information storage section 2. To put it concretely, the matching section 22 typically generates characteristic vectors to be described later in detail. In a word, a characteristic vector is a vector having one or more pieces of main-content meta information included in each of one or more pieces of associated correlation information stored in the correlation-information storage section 2 as components. The matching section 22 generates a characteristic vector for each of the one or more pieces of correlation information stored in the correlation-information storage section 2. To put it more concretely, the matching section 22 generates a characteristic vector CCVn to be described later by referring to FIG. 7.

Then, the matching section 22 finds the degree of similarity between the main-content meta information for the user-utilization main content and each main-content meta information included in each of one or more pieces of correlation information stored in the correlation-information storage section 2. An example of the main-content meta information for the user-utilization main content is a characteristic vector representing the main-content meta information for the user-utilization main content and an example of the main-content meta information included in each of one or more pieces of correlation information stored in the correlation-information storage section 2 is a characteristic vector representing the main-content meta information for an already used main content. The matching section 22 then supplies the degree of similarity to the accessory-content recommendation section 23.

It is to be noted that, as will be described later in detail, if context information is included in correlation information, that is, if context information is included in components of characteristic vectors CCV4, CCV5 and CCV6 to be described later by referring to FIG. 10, in the processing to compute the degree of similarity, the matching section 22 can utilize context information received from a context-information acquisition section 27. The context information received from the context-information acquisition section 27 is information showing a context of the user as a context in which the user utilizes the main content.

The accessory-content recommendation section 23 is a component for identifying an already used main content similar to a user-utilization main content on the basis of the degree of similarity received from the matching section 22 as a result of the processing to compute the degree of similarity and for acquiring correlation information for the identified already used main content from the correlation-information storage section 2. Then, the accessory-content recommendation section 23 outputs information showing an accessory content included in the acquired correlation information as information showing a recommended accessory content, which is defined as an accessory content to be recommended to the user as a content suitable for utilization by the user along with the user-utilization main content.

In this case, if accessory-content meta information is included in information showing a recommended accessory content included in the acquired correlation information, the accessory-content recommendation section 23 may acquire accessory-content meta information identical with or similar to the accessory-content meta information included in the correlation information from the accessory-content meta-information storage section 4. Then, the accessory-content recommendation section 23 is capable of determining an accessory content identified by the accessory-content meta information acquired from the accessory-content meta-information storage section 4 as an additional recommended accessory content, newly generating information showing the determined additional recommended accessory content and outputting the newly generated information typically with a different name.

In addition, as will be described later, the matching section 22 is also capable of acquiring accessory-content meta information identical with or similar to main-content meta information received from the main-content meta-information acquisition section 21 from the accessory-content meta-information storage section 4 and supplying the acquired main-content meta information to the accessory-content recommendation section 23. The main-content meta information received from the main-content meta-information acquisition section 21 is main-content meta information for a user-utilization main content.

In this case, the accessory-content recommendation section 23 determines an accessory content identified by the accessory-content meta information acquired from the accessory-content meta-information storage section 4 as a recommended accessory content, generates information showing the determined recommended accessory content and outputs the newly generated information typically with a different name.

A switch 24 is put in an on or off state in dependence on an operation carried out by the user on the operation section 8.

With the switch 24 put in an off state, the information output by the accessory-content recommendation section 23 as information showing a recommended accessory content is supplied to a accessory-content information display section 26 but not to a accessory-content output section 25.

With the switch 24 put in an on state, on the other hand, information output by the accessory-content recommendation section 23 as information showing a recommended accessory content is supplied to both the accessory-content output section 25 and the accessory-content information display section 26.

The accessory-content output section 25 reads out a recommended accessory content indicated by the information received from the accessory-content recommendation section 23 by way of the switch 24 as information showing the recommended accessory content from the accessory-content storage section 3 and outputs the recommended accessory content to an external destination as a user-utilization accessory content. To put it concretely, assume for example that the recommended accessory content is a piece of music. In this case, the accessory-content output section 25 can be implemented as an apparatus for decoding the digital data of the music into an analog audio signal and a device for outputting the analog audio signal to an external destination. Examples of such a device are a speaker and headphone terminals.

In addition, the accessory-content output section 25 is capable of changing the accessory content being output as a user-utilization accessory content to a content other than the accessory content and stopping the process to output the accessory content in accordance with an operation carried out by the user on the operation section 8 in case the user operates the operation section 8.

The accessory-content information display section 26 is capable of displaying information output by the accessory-content recommendation section 23 as information showing a recommended accessory content to the user. Assume for example that there is a plurality of recommended accessory contents, that is, the accessory-content recommendation section 23 outputs a plurality of pieces of information showing the recommended accessory contents. In this case, the accessory-content information display section 26 is capable of presenting a picture to the user as a picture listing the pieces of information showing the recommended accessory contents. The picture may show a list of the pieces of information output by the accessory-content recommendation section 23 as it is or new pieces of information generated on the basis of the information output by the accessory-content recommendation section 23. In this case, the accessory-content information display section 26 may include a display unit and a display control unit for controlling the display unit.

A context-information acquisition section 27 has basically the same configuration and functions as the context-information acquisition section 13 shown in FIG. 2. However, the context-information acquisition section 27 acquires context information from input information supplied by the sensor 7 or the operation section 8 and supplies the context information to the matching section 22. The context information is information showing a context in which the user is utilizing a user-utilization main content, which is defined as a main content presently being utilized by the user or a main content scheduled to be utilized by the user from now on.

Typical functional configurations of the information-processing apparatus according to an embodiment of the present invention has been described above by referring to FIGS. 1 to 3. Processing carried out by the information-processing apparatus having such functional configurations can be classified into two large categories, i.e., first processing and second processing described as follows. The first processing is processing to generate information on a history showing utilizations of contents by the user. On the other hand, the second processing is processing to recommend (or determine) an accessory content to be utilized by the user along with a user-utilization main content, which is a main content currently being utilized by the user or a main content scheduled to be utilized by the user from now on, on the basis of a plurality of pieces of history information stored by carrying out the first processing repeatedly.

By referring to flowcharts shown in FIGS. 4, 6, 15 and 16, the following description explains a variety of examples of the first processing and the second processing carried out by the information-processing apparatus with configurations shown in FIGS. 1 to 3. The second processing is referred to hereafter as user-utilization accessory content determination processing.

Figure 4:
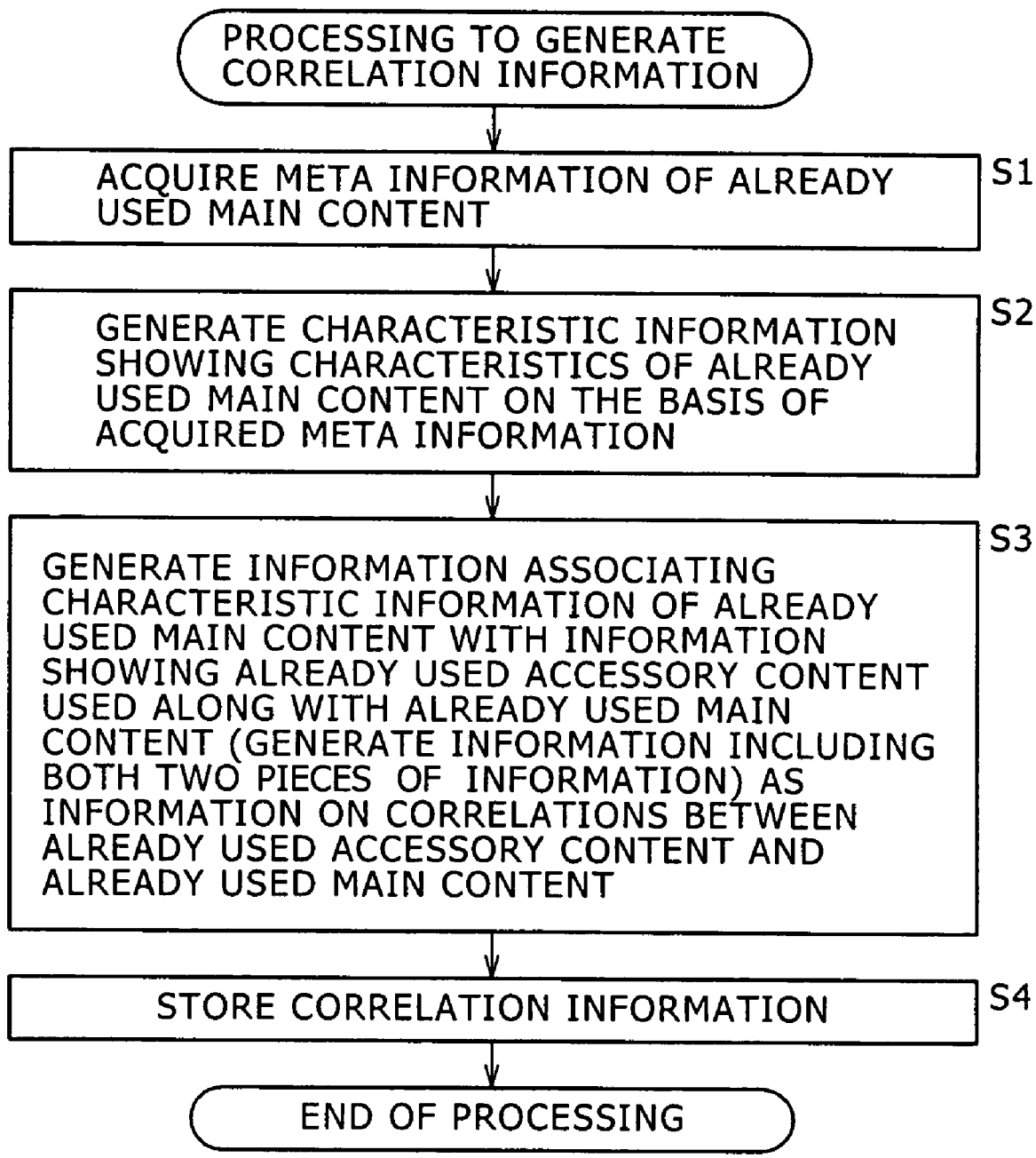
FIG. 4 shows a flowchart representing processing carried out by the information-processing apparatus of FIG. 1 to generate correlation information.

First of all, typical first processing to generate correlation information as information on a history showing utilizations of contents by the user is explained by referring to the flowchart shown in FIG. 4. This typical first processing is referred to hereafter as correlation-information generation processing.

As shown in FIG. 4, the flowchart begins with a step S1 at which the main-content meta-information acquisition section 11 employed in the history-processing section 1 acquires main-content meta information and supplies the acquired main-content meta information to the correlation-information generation section 12. The main-content meta information is meta information of an already used main content.

Then, at the following step S2, the correlation-information generation section 12 generates characteristic information showing characteristics of the already used main content on the basis of the acquired main-content meta information.

As described before, the main-content meta information itself acquired in the process carried out at the step S1 does show one or more characteristics of an already used main content. Thus, in the process carried out at the step S2, the correlation-information generation section 12 in effect generates characteristic information showing overall characteristics, which are determined by characteristics shown by one or more pieces of main-content meta information. It is to be noted that examples of such characteristic information will be described later.

Then, at the following step S3, the correlation-information generation section 12 generates information associating the characteristic information generated in the process carried out at the step S2 as the characteristic information of the already used main content with an already used accessory content used along with the already used main content as correlation information on correlations between the already used accessory content and the already used main content. The already used accessory content is an already used accessory content supplied to the correlation-information generation section 12 as shown in FIG. 2. The information associating the characteristic information of the already used main content with an already used accessory content used along with the already used main content typically includes both the characteristic information of the already used main content and the information showing the already used accessory content used along with the already used main content.

Then, at the following step S4, the correlation-information generation section 12 stores the correlation information generated in the process carried out at the step S3 in the correlation-information storage section 2.

Finally, the execution of the correlation-information generation processing represented by the flowchart shown in FIG. 4 is ended.

The correlation-information generation processing described above is carried out every time the user utilizes a main content along with an accessory content. In the correlation-information generation processing, a piece of correlation information for the main and accessory contents is generated as information on a history event occurring at that point of time for the user and stored in the correlation-information storage section 2.

Let us assume that the user receives three mail texts, i.e., Doc1, Doc2 and Doc3. The user then separately browses (utilizes) the mail texts Doc1, Doc2 and Doc3 as main contents by using typically mail-text-browsing software not shown in the figure. In addition, also let us assume that, when the user is browsing (utilizing) the mail text Doc1, the user also listens to (utilizes) a predetermined piece of music referred to hereafter as SongA (folk) as a BGM accessory content. When the user is browsing (utilizing) the mail text Doc3, the user also listens to (utilizes) another predetermined piece of music referred to hereafter as SongC (samba) as a BGM accessory content. When the user is browsing (utilizing) the mail text Doc2, on the other hand, the user listens to no piece of music or utilizes no accessory content.

In this case, for the mail texts Doc1, Doc2 and Doc3, the correlation-information generation processing described above is carried out at different times. As a result, three pieces of correlation information are generated and each stored in the correlation-information storage section 2.

To put it in detail, in the process carried out at the step S1 on each of the mail texts Doc1, Doc2 and Doc3, the main-content meta-information acquisition section 11 acquires each of the mail texts Doc1, Doc2 and Doc3 and disassembles each of the mail texts Doc1, Doc2 and Doc3 into one or more noun words shown in word groups (I) to (III) respectively. Word groups (I) to (III) are acquired as pieces of main-content meta information for the main contents Doc1, Doc2 and Doc3 respectively and supplied to the correlation-information generation section 12.

Word groups (I) to (III) are listed as follows:
(I): travel, schedule, travel, map, hot spring and souvenir
(II): conference, schedule, contact, conference, memo and participation
(III): music, samba and Brazil In this case, in the process carried out at the step S2 on each on the mail texts Doc1, Doc2 and Doc3, the correlation-information generation section 12 generates pieces of characteristic information for the main contents Doc1, Doc2 and Doc3. Examples of the characteristic information are characteristic vectors CCV1, CCV2 and CCV3 shown in FIG. 5.

The characteristic vectors are explained as follows.

A characteristic vector is a vector having one or more pieces of meta information for the content as components (or as dimension). In the above example, the content is an already used main content, such as the mail text Doc1, Doc2 or Doc3, and the meta information is each main-content meta information of the mail text Doc1, Doc2 or Doc3. To put it concretely, the meta information includes each word of the word groups (I) to (III).

Thus, the configuration of a characteristic vector is not specially prescribed. However, let us assume that the dimension of the characteristic vector is determined. By the dimension of the characteristic vector, the number of components composing the vector is implied. In addition, let us assume that information corresponding to each component of the characteristic vector is also determined. In this example, each component of the characteristic vector of a content is a piece of meta information for the content. That is to say, let us assume that the number of components composing the characteristic vector or the dimension of the vector is fixed and pieces of information assigned to their respective components as well as the order of assignment are also fixed. In the example, the pieces of information assigned to their respective components are pieces of main-content meta information, which are the words "travel", "schedule" and so on shown in FIG. 5. It is to be noted that this configuration of the characteristic vector is referred to hereafter as a standard form.

To put it concretely, a characteristic vector having the standard form is a vector typically having components of the words Travel, Schedule, Destination, Map, Contact, Hot spring, Conference, Memo, Participation, Souvenir, Music, Samba and Brazil shown in FIG. 5.

However, each of the components composing a characteristic vector having the standard form actually has a value determined by a word showing a corresponding piece of main-content meta information and a weight multiplied by adoption of a weight multiplication technique such as a frequency method or a tf method.

To put it concretely, in accordance with word group (I) representing the main-content meta information of the main content Doc1, in the main content Doc1, the word 'travel' appears twice whereas the words 'schedule', 'map' and 'souvenir' each appear only once. In this case, if the frequency method is adopted as the weight multiplication technique, the components 'travel', 'schedule', 'map' and 'souvenir' of the characteristic having the standard form have values of 2, 1, 1 and 1 respectively. On the other hand, the other components such as the word 'destination' has a value of 0 since the word 'destination' of the characteristic having the standard form does not appear at all in the main content Doc1. Thus, a characteristic vector CCV1 for the main content Doc1 is generated as a vector having components with values of (2, 1, 0, 1, 0, 1, 0, 0, 0, 1, 0, 0, 0) shown in FIG. 5.

By the same token, a characteristic vector CCV2 for the main content Doc2 is generated as a vector having components with values of (0, 1, 0, 0, 1, 0, 2, 1, 1, 0, 0, 0, 0) shown in FIG. 5. In the same way, a characteristic vector CCV3 for the main content Doc3 is generated as a vector having components with values of (0, 0, 0, 0, 0, 0, 0, 0, 0, 0, 1, 1, 1) shown in FIG. 5.

It is to be noted that, if the frequency method is adopted as the weight multiplication technique, the frequency of the component is typically used as the value of the component. The frequency of the component is the number of appearances of the component in the text. It is of course possible to use a value other than the frequency. Examples of the other value include a normalized value of the frequency and a value obtained as a result of converting the frequency in accordance with a predetermined rule.

In the process carried out at the step S3 on the main contents Doc1, Doc2 and Doc3, correlation information such as pieces of correlation information CI1, CI2 and CI3 shown in FIG. 5 are generated and, in a process carried out at a step S4, the pieces of correlation information CI1, CI2 and CI3 are stored in the correlation-information storage section 2. The pieces of correlation information CI1, CI2 and CI3 associate the characteristic vectors CCV1, CCV2 and CCV3 generated as described above with pieces of information showing the already used BGM accessory contents for the characteristic vectors CCV1, CCV2 and CCV3 respectively.

In the case of the example shown in FIG. 5, for example, the information showing an already used BGM accessory content is the name of the content. Thus, in this case, the correlation information CI1 for the main content Doc1 is information associating the characteristic vector CCV1 with the song name 'SongA (Folk)' or information including both the characteristic vector CCV1 and the song name 'SongA (Folk)'. By the same token, the correlation information CI3 for the main content Doc3 is information associating the characteristic vector CCV3 with the song name 'SongC (Samba)' or information including both the characteristic vector CCV3 and the song name 'SongC (Samba)'.

It is to be noted that, as described above, an already used BGM accessory content for the main content Doc2 does not exist. That is to say, when the user utilized the main content Doc2, the user did not listen to an already used BGM accessory content. In such a case, as the information showing an already used BGM accessory content, that is, as information indicating that the user did not listen to an already used BGM accessory content when the user utilized the main content Doc2, special information such as the word 'None' can be used as shown in FIG. 5. Thus, much like the pieces of correlation information CI1 and CI3, the correlation information CI2 for the main content Doc2 can be generated as information associating the characteristic vector CCV2 with the special information represented by the word 'None' or information including both the characteristic vector CCV2 and the special information represented by the word 'None'.

By referring to a flowchart shown in FIG. 6, the following description explains the processing to determine a user-utilization accessory content as processing corresponding to the processing to generate correlation information in accordance with the flowchart shown in FIG. 4. As described earlier, the processing to generate correlation information is referred to as the first processing and the processing to determine a user-utilization accessory content is referred to as the second processing.

One or more pieces of correlation information generated by repeatedly carrying out the correlation-information generation processing represented by the flowchart shown in FIG. 4 are stored in the correlation-information storage section 2. Then, when the user is utilizing a new main content or plans to utilize a new main content from now on, the processing to determine a user-utilization accessory content in accordance with the flowchart shown in FIG. 6 is carried out.

Every time a user-utilization main content is supplied to the user-utilization accessory-content determination section 6 shown in FIG. 3, the processing to determine a user-utilization accessory content in accordance with the flowchart shown in FIG. 6 is carried out.

As shown in FIG. 6, the flowchart begins with a step S21 at which the main-content meta-information acquisition section 21 acquires meta information of a user-utilization main content and supplies the main-content meta information to the matching section 22.

Then, at the next step S22, the matching section 22 generates characteristic information showing characteristics of user-utilization main content on the basis of the acquired meta information.

It is to be noted that the processes carried out at the steps S21 and S22 are basically similar to respectively the processes carried out at the steps S1 and S2 of the flowchart shown in FIG. 4 except that the object of the processes is different. To put it concretely, the object of the processes carried out at the steps S21 and S22 is a user-utilization main content while the object of the processes carried out at the steps S1 and S2 is an already used main content. For this reason, the processes carried out at the steps S21 and S22 are not explained in detail this time.

Subsequently, at the next step S23, the matching section 22 finds similarity between characteristic information generated in the process carried out at the step S22 as characteristic information of the user-utilization main content and characteristic information included each of one or more pieces of correlation information held (stored) in advance in the correlation-information storage section 2. The matching section 22 then supplies the similarity to the accessory-content recommendation section 23.

It is to be noted that the method to find similarity is not specially prescribed. If a characteristic vector is used as characteristic information, however, a typical method described below is adopted. In order to make the explanation simple, the adopted method is simply explained as follows:

The matching section 22 computes an inner product of a standard-form characteristic vector of the user-utilization main content and a characteristic vector included in each of one or more pieces of correlation information held (stored) in advance in the correlation-information storage section 2, and supplies each inner product obtained as a result of computation to the accessory-content recommendation section 23 as a degree of similarity between the standard-form characteristic vector of the user-utilization main content and the characteristic vector included in the correlation information. The larger the inner product computed by adoption of the method, the higher the degree of similarity.

Then, at the next step S24, the accessory-content recommendation section 23 acquires correlation information including characteristic information with a degree of similarity exceeding a threshold value from the correlation-information storage section 2. For example, the accessory-content recommendation section 23 acquires correlation information including a characteristic vector with an inner product exceeding a threshold value from the correlation-information storage section 2. Then, the accessory-content recommendation section 23 takes an accessory content for the acquired correlation information as a candidate for the user-utilization accessory content. The accessory content taken as a candidate for the user-utilization accessory content is an accessory content identified by information included in the correlation information along with the characteristic information having a degree of similarity exceeding the threshold value. The accessory content taken as a candidate for the user-utilization accessory content is used as a recommended accessory content.

Finally, the execution of the processing to determine a user-utilization accessory content in accordance with the flowchart shown in FIG. 6 as processing corresponding to the processing to generate correlation information in accordance with the flowchart shown in FIG. 4 is ended.

The following description explains typical concrete processing to determine a user-utilization accessory content in accordance with the flowchart shown in FIG. 6 by associating this typical processing with typical processing to generate correlation information in accordance with the flowchart shown in FIG. 4, that is, by associating this typical processing with typical processing to generate correlation information for the main contents Doc1, Doc2 and Doc3 described before.

Assume for example that, now, the user is browsing or about to browse a newly received mail text as a main content by using typically mail-browsing software not shown in the figure. Let the mail text received as a main content be named TargetDoc. That is to say, TargetDoc is a main content utilized by the user.

In the process carried out at the step S21, the main-content meta-information acquisition section 21 acquires meta information of TargetDoc and disassembles the meta information into information expressed in terms of one or more noun words arranged in word group (IV) like one shown below. Word group (IV) is acquired as the main-content meta information of TargetDoc and supplied to the matching section 22.

(IV) travel, souvenir, map, contact, hot spring and souvenir

In this case, in the process carried out at the step S22, the matching section 22 generates a characteristic vector CCVn (1, 0, 0, 1, 1, 1, 0, 0, 0, 2, 0, 0, 0) shown in FIG. 7.

As shown in the figure, the form of the characteristic vector CCVn generated in the process carried out at the step S22 is the standard form described earlier by referring to FIG. 5 as the standard form of a characteristic vector. That is to say, the form of the characteristic vector CCVn is the same as the form described earlier by referring to FIG. 5 as the standard form of the characteristic vectors CCV1, CCV2 and CCV3.

In this case, since pieces of correlation information CI1, CI2 and CI3 shown in FIG. 5 have been held (or stored) in the correlation-information storage section 2, in the process carried out at the step S22, the matching section 22 computes an inner product of the characteristic vector CCVn shown in FIG. 7 and the characteristic vector CCV1 included in the correlation information CI1 as a degree of similarity between the characteristic vector CCVn and the characteristic vector CCV1, an inner product of the characteristic vector CCVn and the characteristic vector CCV2 included in the correlation information CI2 as a degree of similarity between the characteristic vector CCVn and the characteristic vector CCV2, and an inner product of the characteristic vector CCVn and the characteristic vector CCV3 included in the correlation information CI3 as a degree of similarity between the characteristic vector CCVn and the characteristic vector CCV3.

To put it concretely, assume for example that the matching section 22 generates a matrix A having the characteristic vectors CCV1, CCV2 and CCV3 as its column elements arranged in the horizontal direction as shown in FIG. 8. The matching section 22 also handles the characteristic vector CCVn shown in FIG. 7 as a matrix B. Then, the matching section 22 multiplies the matrix B by the transposed matrix At of the matrix A from the right side in a matrix multiplication process to produce At×B shown in FIG. 9. As shown in FIG. 9, the result At×B of the matrix multiplication process is a matrix consisting of elements equal to the inner products of the matrix multiplication process. As described earlier, the inner products each represent a degree of similarity.

Thus, the matching section 22 supplies the matrix shown in FIG. 9 to the accessory-content recommendation section 23.

Then, at the next step S24, the accessory-content recommendation section 23 analyzes each of the elements composing the matrix At×B shown in FIG. 9 to determine a candidate for the user-utilization accessory content. As mentioned before, the candidate for the user-utilization accessory content is referred to as a recommended accessory content.

Assume for example that the threshold value is 5. In this case, the correlation information CI1 for the main content Doc1 is acquired from the correlation-information storage section 2 because the correlation information CI1 includes the characteristic vector CCV1 having a similarity of 6 exceeding the threshold value of 5 as a degree of similarity to the characteristic vector CCVn. Since the correlation information CI1 includes the name of 'Song A (Folk)' given to a BGM accessory content, this BGM accessory content is taken as a candidate for the user-utilization accessory content. As mentioned before, the candidate for the user-utilization accessory content is referred to as a recommended accessory content.

Assume for example that the switch 24 shown in FIG. 3 has been turned on. In this case, as described above, the BGM accessory content named 'SongA (Folk)' is acquired from the accessory-content storage section 3 and output from the accessory-content output section 25 as a user-utilization accessory content while the user is browsing (or utilizing) the main content TargetDoc or before or after the user browses (or utilizes) the main content TargetDoc.

In addition, even if the switch 24 has been turned off, for example, the name of 'SongA (Folk)' is displayed to the user through the accessory-content information display section 26 while the user is browsing (or utilizing) the main content TargetDoc or before or after the user browses (or utilizes) the main content TargetDoc.

It is to be noted that, with the switch 24 turned on, the name of 'SongA (Folk)' can be displayed to the user through the accessory-content information display section 26 while the BGM accessory content named 'SongA (Folk)' is being output from the accessory-content output section 25. That is to say, the name of 'SongA (Folk)' can be displayed to the user through the accessory-content information display section 26 at the same time as the BGM accessory content named 'SongA (Folk)' is being output from the accessory-content output section 25.

In addition, in the example described above, the main content is a mail text or sentences. As explained before, however, the main content is by no means limited to a mail text. For example, the main content can also be a home page presented by a server by way of a network such as the Internet. Such a home page is also referred to as the so-called web page.

On the top of that, in addition to the correlation information generated in the processing to generate correlation information in accordance with the flowchart shown in FIG. 4, correlation information can also be directly entered by the user by operating the operation section 8 and stored in the correlation-information storage section 2.

In addition, the processing to determine a user-utilization accessory content in accordance with the flowchart shown in FIG. 6 can also be used as a partial process of the following processing.

In processing to manipulate a text by utilizing the information-processing apparatus shown in FIG. 1, that is, in processing of using the information-processing apparatus as a word processor, for example, the text being processed by the user is handled as a main content and the information-processing apparatus is used to carry out the processing to determine a user-utilization accessory content in accordance with the flowchart shown in FIG. 6.

In this case, the information-processing apparatus analyzes the text being processed and generates characteristic information of the text. Then, the information-processing apparatus is capable of selecting sentences used in the past as sentences having characteristic information with a highest degree of similarity to the generated characteristic information. With such sentences selected, the information-processing apparatus is capable of automatically reproducing a piece of music or picture associated with the sentence.

Thus, if the user listened to a piece of rock music named TitleA while using the information-processing apparatus to create a home page of its own, that is, if the user utilized the piece of rock music named TitleA as an accessory content while utilizing the home page as a main content, the information-processing apparatus is capable of automatically reproducing a piece of music identical with or similar to TitleA in processing carried out next time to create a home page.

It is to be noted that the process to automatically reproduce an accessory content is not a process requested by a command entered by the user by operating the operation section 8 as a command to start the process, but a process carried out as a result of determination by the information-processing apparatus itself.

In addition, the information-processing apparatus is also capable of showing a list of candidate pieces of music to the user while automatically reproducing an accessory content or automatically reproducing no accessory content. Typically, the candidate pieces of music are arranged on the list in the order of decreasing degrees of similarity. Thus, the user is capable of selecting a user-utilization accessory content from the list or changing a user-utilization accessory content to one on the list.

By the way, as described above, information on a context of the user can be included in correlation information. Thus, the information-processing apparatus is capable of carrying out the following processing.

The information-processing apparatus acquires the information on a user context prevailing at a point of time the user was utilizing an already used main content and an already used accessory content at the same time. For example, as described above, the information-processing apparatus acquires context information associated with information received from the sensor 7 as information on detection and/or information received from the operation section 8 as information on operations. An operation indicated by the information received from the operation section 8 is an operation intentionally selected by the user. Examples of the operation are shakings, vibrations and caresses.

Then, the information-processing apparatus generates correlation information associating the information on the context, characteristics of the sentences handled as an already used main content and information showing an already used accessory content with each other, storing the correlation information in the correlation-information storage section 2. With the sentences handled as an already used main content, the characteristics are each a weight of a word.

Thus, by carrying out processing similar to the processing to determine a user-utilization accessory content in accordance with the flowchart shown in FIG. 6, even if the user does not carry out any operation for example due to the fact that no user-utilization main content exists, the information-processing apparatus is capable of finding a degree of similarity between pieces of context information stored in advance in the correlation-information storage section 2 and context information acquired from some emotions of the user provided that the context information can be acquired from the emotions, selecting correlation information including stored context information with a highest degree of similarity to the context information acquired from the emotions and reproducing an accessory content indicated by information included in the selected correlation information along with the stored context information. The context information acquired from some emotions of the user is information on emotions, which are revealed by the user at that time.

If the user carries out an operation because a user-utilization main content exists, on the other hand, the information-processing apparatus is capable of recommending an accessory content considering a context in which the user exists for example as shown in FIGS. 10 to 14.

Assume for example that pieces of correlation information C14, C15 and C16 shown in FIG. 10 have been stored in the correlation-information storage section 2.

In this case, as shown in FIG. 10, a characteristic vector CCV4 included in the correlation information CI4, a characteristic vector CCV5 included in the correlation information CI5 and a characteristic vector CCV6 included in the correlation information CI6 are each a vector having a standard form including components Mailer, Editor, Browser, Inspect, Edit, Create, Travel, Destination, Hot spring, Conference, Schedule, Contact, Map, Music, Tango, Nation, Company, Home and Outdoors even though this standard format is different from the standard format shown in FIG. 5.

The components Mailer, Editor and Browser of the standard form are each a component indicating that application software, which was used (that is, inspected, edited or created as will be described later) or probably used when the user utilized an already used main content such as Doc4, Doc5 or Doc6 in the case of the example shown in FIG. 10. The application software is also referred to hereafter simply as an application. An application component for an application actually used by the user has a value of 1. On the other hand, an application component for an application not actually used by the user has a value of 0.

In the case of the characteristic vector CCV4, for example, the components Mailer, Editor and Browser have values of 1, 0 and 0 respectively. The value of 1 assigned to the Mailer component indicates that the user has used the application named Mailer in utilization of the main content Doc4.

By the same token, in the case of the characteristic vector CCV6, the components Mailer, Editor and Browser also have values of 1, 0 and 0 respectively. The value of 1 assigned to the Mailer component indicates that the user has used the application named Mailer in utilization of the main content Doc6.

In the case of the characteristic vector CCV5, on the other hand, the components Mailer, Editor and Browser have values of 0, 1 and 0 respectively. The value of 1 assigned to the Editor component indicates that the user has used the application named Editor in utilization of the main content Doc5.

The components Inspect, Edit and Create of the standard form are each a component revealing a method adopted by the user to utilize an already used main content such as Doc4, Doc5 or Doc6 in the case of the example shown in FIG. 10 or a method adopted by the user to carry out an operation on the operation section 8 or a possible candidate for the operation. In the following description, the possible candidate for the operation is referred to simply as an operation. A component revealing a method of an operation actually carried out by the user has a value of 1. On the other hand, a component revealing a method of an operation not actually carried out by the user has a value of 0.

In the case of the characteristic vector CCV4, for example, the components Inspect, Edit and Create have values of 1, 0 and 0 respectively. The value of 1 assigned to the Inspect component indicates that the user inspected Doc4 as a main content.

In the case of the characteristic vector CCV5, the components Inspect, Edit and Create have values of 0, 1 and 1 respectively. The value of 1 assigned to the Edit and Create components indicates that the user edited and created Doc5 as a main content.

In the case of the characteristic vector CCV6, for example, the components Inspect, Edit and Create have values of 0, 1 and 0 respectively. The value of 1 assigned to the Edit component indicates that the user edited Doc6 as a main content.

Much like the characteristic vectors CCV1, CCV2 and CCV3 explained earlier by referring to FIG. 5, the components Travel, Destination, Hot spring, Conference, Schedule, Contact, Map, Music, Tango and Nation of the standard form each have a value equal to a weight representing a frequency at which the component representing main-content meta information of the already used main content appears in the already used main content.

The components Company, Home and Outdoors of the standard form each reveal a location at which the user utilized the already used main content, which is Doc4, Doc5 or Doc6 in the example shown in FIG. 10, or a possible candidate for the location. A possible candidate for the location is referred to hereafter simply as a location. If the user utilized an already used main content, a component corresponding to a location at which the user actually existed has a value of 1 while a component corresponding to a location at which the user did not actually exist has a value of 0.

In the case of the characteristic vector CCV4, for example, the components Company, Home and Outdoors have values of 0, 1 and 0 respectively. The value of 1 assigned to the Home component indicates that the user utilized Doc4 as a main content at a home.

By the same token, in the case of the characteristic vector CCV6, the components Company, Home and Outdoors have values of 0, 1 and 0 respectively. The value of 1 assigned to the Home component indicates that the user utilized Doc6 as a main content at a home.

In the case of the characteristic vector CCV5, on the other hand, the components Company, Home and Outdoors have values of 1, 0 and 0 respectively. The value of 1 assigned to the Company component indicates that the user utilized Doc5 as a main content in the company.

By the way, in actuality, the application and the operation described above are each used by being clearly distinguished from context information in some cases. In this specification, however, the application and the operation are handled as a kind of context information similar to the location in order to make the description simple. That is to say, in the following description of this specification, it is assumed that the history-processing section 1 shown in FIG. 1 or, to be specific, the context-information acquisition section 13 shown in FIG. 2 and the user-utilization accessory-content determination section 6 shown in FIG. 1 or, to be specific, the context-information acquisition section 27 shown in FIG. 3 acquire the application, the operation and the location as one piece of context information.

In this case, in the process carried out at the step S2 of the flowchart shown in FIG. 4 for each of the main contents Doc4, Doc5 and Doc6, the correlation-information generation section 12 shown in FIG. 2 is capable of generating a characteristic vector having components including context information by acquiring pieces of information on the application, the operation and the location from the context-information acquisition section 13. To put it concretely, for example, the correlation-information generation section 12 is capable of generating the standard-form vectors CCV4, CCV5 and CCV6 explained earlier by referring to FIG. 10.

It is to be noted that, in the example shown in FIG. 10, the characteristic vector CCV4 has a value of (1, 0, 0, 1, 0, 0, 1, 2, 1, 0, 2, 0, 2, 0, 0, 0, 0, 1, 0), the characteristic vector CCV5 has a value of (0, 1, 0, 0, 1, 1, 0, 1, 0, 1, 2, 0, 1, 0, 0, 0, 1, 0, 0) and the characteristic vector CCV6 has a value of (1, 0, 0, 0, 1, 0, 0, 0, 0, 0, 0, 0, 0, 1, 1, 0, 0, 1, 0).

Then, in a process carried out at the step S3 for each of the main contents Doc4, Doc5 and Doc6, as shown in FIG. 10, the correlation-information generation section 12 generates correlation information CI4 including the characteristic vector CCV4 and 'SongD', correlation information CI5 including the characteristic vector CCV5 and 'None' as well as correlation information CI6 including the characteristic vector CCV6 and 'SongE'. 'SongD' indicates that the already used accessory content is a piece of music with a title of 'SongD'. 'None' indicates that the user did not utilize or listen to an already used accessory content. 'SongE' indicates that the already used accessory content is a piece of music with a title of 'SongE'.

Let us assume that, after that, the user is utilizing or is about to utilize a new main content named TargetDoc'. That is to say, the user-utilization main content has a title of TargetDoc'.

In this case, in the process carried out at the step S22 of the flowchart shown in FIG. 6, the matching process section 22 acquires an application, operation and location for utilization of a user-utilization main content by the user in addition to the meta information of the user-utilization main content from the context-information acquisition section 13, and generates a characteristic vector having a standard form explained earlier by referring to FIG. 10. The components of the characteristic vector include context information representing the application, the operation and the location. A typical characteristic vector generated by the matching process section 22 is a vector CCVn' having a value of (0, 1, 0, 0, 1, 1, 1, 1, 0, 0, 1, 0, 0, 0, 1, 0, 0) as shown in FIG. 11.

Now that the pieces of correlation information CI4, CI5 and CI6 shown in FIG. 10 have been held (or stored) in the correlation-information storage section 2, in the process carried out at the step S23, the matching process section 22 finds the inner products of the characteristic vector CCVn' shown in FIG. 11 and the characteristic vector CCV4 included in the correlation information CI4, the characteristic vector CCV5 included in the correlation information CI5 and the characteristic vector CCV6 included in the correlation information CI6 in order to determine degrees of similarity between the vector CCVn' and the vectors CCV4, CCV5 as well as CCV6.

Figure 12:
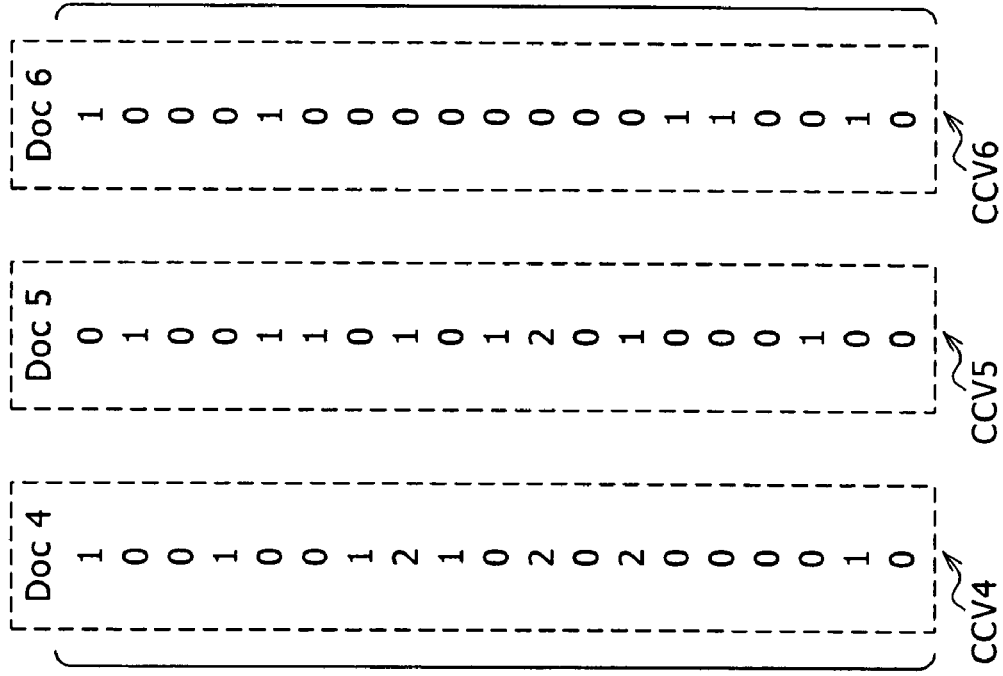
FIG. 12 is a diagram showing a vector C generated for computing degrees of similarity to the characteristic vector shown in FIG. 11.
Figures 13, 14, 15:
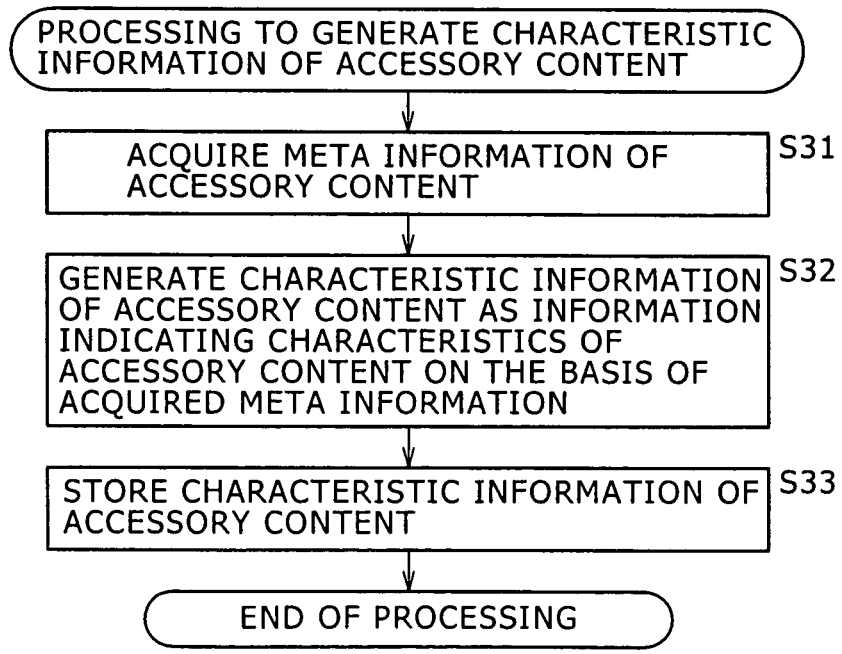
FIG. 13 is a diagram showing degrees of similarity resulting from computation as degrees of similarity between the characteristic vector shown in FIG. 11 and characteristic vectors each serving as a column element of the matrix C shown in FIG. 12.
FIG. 14 is a diagram showing degrees of similarity resulting from computation as degrees of similarity between the characteristic vector shown in FIG. 11 and characteristic vectors each serving as a column element of the matrix C shown in FIG. 12 with 0 set in each characteristic-vector component representing context information.
FIG. 15 shows a flowchart representing typical processing carried out by the information-processing apparatus of FIG. 1 to generate characteristic information of an accessory content.

To put it concretely, assume for example that the matching process section 22 generates a matrix C having the characteristic vectors CCV4, CCV5 and CCV6 as its column elements arranged in the horizontal direction as shown in FIG. 12. The matching process section 22 also handles the characteristic vector CCVn' shown in FIG. 11 as a matrix D. Then, the matching process section 22 multiplies the matrix D by the transposed matrix CT of the matrix C from the right side in a matrix multiplication process to produce a matrix product CT×D shown in FIG. 13. As shown in FIG. 13, the result CT×D of the matrix multiplication process is a matrix consisting of elements equal to the respective inner products of the matrix multiplication process. As described earlier, the inner products each represent a degree of similarity.

By the way, the matching process section 22 is also capable of finding inner products of characteristic vectors not including context information representing applications, operations and locations as is the case with the characteristic vectors CCV1 and CCVn' shown in FIGS. 5 and 7 respectively. That is to say, the matching process section 22 is also capable of finding inner products of the characteristic vector CCVn shown in FIG. 11 and the characteristic vector CCV4 included in the correlation information CI4, the characteristic vector CCV5 included in the correlation information CI5 and the characteristic vector CCV6 included in the correlation information CI6 by excluding pieces of context information included in the characteristic vectors CCVn', CCV4, CCV5 and CCV6 in order to determine degrees of similarity between the vector CCVn' and the vectors CCV4, CCV5 as well as CCV6.

In this case, the matching process section 22 generates a matrix C' by setting each of the components for pieces of context information representing applications, operations and locations of the matrix C as shown in FIG. 12 at 0. By the same token, the matching process section 22 also generates a matrix D' by setting each of the components for pieces of context information representing applications, operations and locations of the matrix C as shown in FIG. 11 at 0. Then, the matching process section 22 multiplies the matrix D' by the transposed matrix C'T of the matrix C from the right side in a matrix multiplication process to produce a matrix product C'T×D' shown in FIG. 14. As shown in FIG. 14, the result C'T×D' of the matrix multiplication process is a matrix consisting of elements equal to the respective inner products of the matrix multiplication process. As described earlier, the inner products each represent a degree of similarity.

Then, in the process carried out at the step S24, the accessory-content recommendation section 23 shown in FIG. 3 determines a recommended accessory content serving as a candidate for the user-utilization accessory content.

For example, the accessory-content recommendation section 23 takes an accessory content associated with a main content having the highest degree of similarity among the main contents Doc4 to Doc6 as the recommended accessory content, which is used as a candidate for the user-utilization accessory content.

In this case, if the context information representing applications, operations and locations is not taken into consideration to give a matrix multiplication result shown in FIG. 14, the user-utilization main content TargetDoc' is determined to have a highest degree of similarity to the already used main content Doc4. Thus, an accessory content named SongD and associated with the already used main content Doc4 is taken as the recommended accessory content, which is used as a candidate for the user-utilization accessory content. The name SongD is included in the correlation information CI4 shown in FIG. 10.

Thus, as described above, with the switch 24 turned on, the BGM accessory content named 'SongD is acquired from the accessory-content storage section 3 and output from the accessory-content output section 25 as a user-utilization accessory content while the user is utilizing (or editing and creating in accordance with FIG. 11) the main content TargetDoc' or before or after the user utilizes (or edits and creates in accordance with FIG. 11) the main content TargetDoc'.

If the context information representing applications, operations and locations is taken into consideration to give a matrix multiplication result shown in FIG. 13, on the other hand, the user-utilization main content TargetDoc' is determined to have a highest degree of similarity to the already used main content Doc5. Thus, no accessory content is taken as the recommended accessory content, which should be used as a candidate for the user-utilization accessory content, since 'None' is included in the correlation information CI5.

Thus, as described above, even with the switch 24 turned on, no accessory content is output from the accessory-content output section 25 as a user-utilization accessory content while the user is utilizing (or editing and creating in accordance with FIG. 11) the main content TargetDoc' or before or after the user utilizes (or edits and creates in accordance with FIG. 11) the main content TargetDoc'.

As described above, if the history of context information representing an application, an operation and a location is taken into consideration in the pieces of correlation information (or history information) CI4, CI5 and CI6 of the user, the history of context information indicates that the user used an editor to edit and create the main content Doc5 shown in FIG. 10 in a company. In this case, the information-processing apparatus infers that the user wants to concentrate its attention on the work, revealing a tendency that the user wants no BGM accessory content to be reproduced.

As a result, the information-processing apparatus is capable of displaying a recommendation result reflecting a user tendency obtained as described above. That is to say, in this case, it is assumed that the user will utilize the user-utilization main content TargetDoc' in a context using an editor to edit and create the user-utilization main content in a company. Thus, as a recommendation result reflecting a user tendency obtained as described above, the information-processing apparatus determines that no recommended accessory content to serve as a candidate for the user-utilization accessory content exists or is output.

Next, by referring to a flowchart shown in FIG. 15, the first processing to generate accessory-content characteristic information as history information is explained. The accessory-content characteristic information is information on characteristics of an accessory content. The first processing to generate accessory-content characteristic information as history information is referred to hereafter as accessory-content characteristic information generation processing. FIG. 15 thus shows a flowchart representing other typical first processing (that is, accessory-content characteristic information generation processing) different from the typical first processing, which is represented by the flowchart shown in FIG. 4 as the processing to generate correlation information.

The flowchart shown in FIG. 15 begins with a step S31 at which the accessory-content meta-information acquisition section 5 shown in FIG. 1 acquires accessory-component meta information, which is meta information of an already used accessory content.

Then, at the next step S32, the accessory-content meta-information acquisition section 5 generates characteristic information of the already used accessory content as information indicating characteristics of the accessory content on the basis of the acquired meta information. The information indicating characteristics of the accessory content is also referred to as accessory-content characteristic information.

While the format of the accessory-content characteristic information is not specially prescribed, the accessory-content characteristic information can be typically implemented as a characteristic vector having a predetermined standard form much like the main-content characteristic information. It is to be noted, however, that the characteristic vector implementing the accessory-content characteristic information is shown in none of the figures.

Then, at the next step S33, the accessory-content meta-information acquisition section 5 stores the accessory-content characteristic information generated in the process carried out at the step S32 as the characteristic information of an accessory content in the accessory-content meta-information storage section 4.

Finally, the execution of the accessory-content characteristic information generation processing represented by the flowchart shown in FIG. 15 is ended.

Every time the user utilizes an accessory content, the accessory-content characteristic information generation processing represented by the flowchart shown in FIG. 15 is carried out to store accessory-content characteristic information generated for the accessory content in the accessory-content meta-information storage section 4 as history information of the user.

Figure 16:
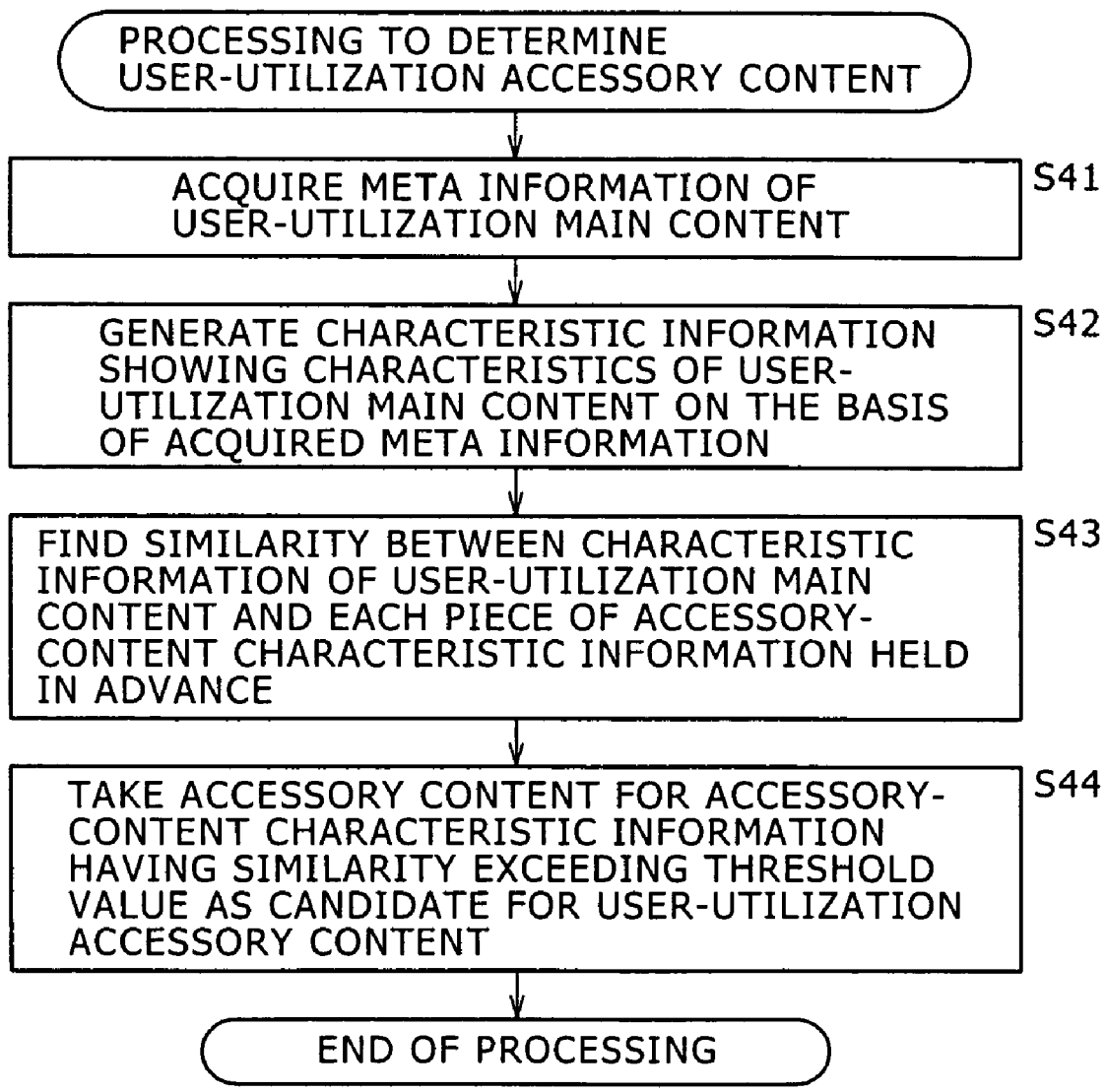
FIG. 16 shows a flowchart representing typical processing carried out by the information-processing apparatus of FIG. 1 to determine an accessory content to be utilized by the user.

By referring to a flowchart shown in FIG. 16, the following description explains typical user-utilization accessory content determination processing (which is other typical second processing different from the typical second processing represented by the flowchart Then, at the next step S42, the matching process section 22 generates characteristic information showing characteristics of the user-utilization main content on the basis of the acquired meta information of the user-utilization main content.

It is to be noted that the processes carried out at the steps S41 and S42 are basically the same as respectively the processes carried out at the steps S21 and S22 of the flowchart shown in FIG. 6. In the case of the processes carried out at the steps S41 and S42, however, the format of the characteristic information showing the characteristics of the user-utilization main content needs to be made compatible with accessory-content characteristic information.

Then, at the next step S43, the matching process section 22 finds a degree of similarity between characteristic information generated at the step S42 as characteristic information of the user-utilization main content and each piece of accessory-content characteristic information held (or stored) in advance in the accessory-content meta-information storage section 4. Subsequently, the matching process section 22 supplies the degrees of similarity obtained as a result of the process to the accessory-content recommendation section 23.

It is to be noted that the method to find the degrees of similarity is not specially prescribed. For example, it is possible to adopt a method whereby words included in the characteristic information of the user-utilization main content are compared with those included in any accessory-content characteristic information and, if the former is identical with or similar to the latter, the characteristics of the accessory content are determined to be similar to the characteristics of the user-utilization main content. In addition, the more the identical and/or similar words, the higher the degree of similarity.

If a characteristic vector having a standard form is used as characteristic information, much like the examples described so far, the matching process section 22 typically adopts a processing method whereby an inner product of the standard-form characteristic vector of the user-utilization main content and the standard-form characteristic vector representing each piece of accessory-content characteristic information held (or stored) in advance in the accessory-content meta-information storage section 4 is found. Subsequently, the matching process section 22 supplies each inner product resulting from the process to the accessory-content recommendation section 23 as a degree of similarity. As described above, in this case, the more the identical and/or similar words, the higher the degree of similarity.

Then, at the next step S44, the accessory-content recommendation section 23 takes an accessory content with accessory-content characteristic information having a degree of similarity exceeding a predetermined threshold value as a recommended accessory content, which serves a candidate for a user-utilization accessory content. In the case of a characteristic vector used as characteristic information, the accessory-content recommendation section 23 acquires a characteristic vector with a computed inner product exceeding a predetermined threshold value from the accessory-content meta-information storage section 4 and takes an accessory content corresponding to (or identified by) the fetched characteristic vector as the recommended accessory content.

Finally, the execution of the user-utilization accessory content determination processing represented by the flowchart shown in FIG. 16 as processing to determine an accessory content corresponding to characteristic information generated in the accessory-content characteristic information generation processing represented by the flowchart shown in FIG. 15 is ended.

The following description explains examples of the accessory-content characteristic information generation processing represented by the flowchart shown in FIG. 15 and the user-utilization accessory content determination processing represented by the flowchart shown in FIG. 16.

For example, by carrying out the accessory-content characteristic information generation processing represented by the flowchart shown in FIG. 15, the information-processing apparatus is capable of making a database for keeping meta data of various kinds of music as accessory-content characteristic information or a group of pieces of accessory-content meta information. The meta information associated with a piece of music includes the title, artists and album name of the piece of music. The database for keeping meta information of various kinds of music is referred to hereafter as a music DB.

The music DB is stored in the accessory-content meta-information storage section 4 employed in the information-processing apparatus owned by the user. It is to be noted, however, that the music DB does not have to be stored in the accessory-content meta-information storage section 4. That is to say, a variety of configurations is possible. For example, the music DB can be stored in a music server connected to a network as a server shared by the user owning the information-processing apparatus and other users owning other apparatus.

Let us assume for example that the user utilizes a home page managed by the user itself as a user-utilization main content. To be more specific, for example, the user enters a text to the home page to update the home page.

In this case, the information-processing apparatus is capable of carrying out the following processing as the user-utilization accessory content determination processing represented by the flowchart shown in FIG. 16.

In the processes carried out at the steps S41 and S42, the information-processing apparatus analyzes words appearing on the home page being updated by the user to generate characteristic information. In the processes carried out at the steps S43 and S44, the information-processing apparatus searches the music DB for meta information of words identical with or similar to words of the characteristic information, and determines a piece of music identified by the meta information found in the search operation as a recommended accessory content, which serves as a candidate for the user-utilization accessory content.

It is to be noted that, as described above, the information-processing apparatus may simply select words each having a high frequency of appearance on the home page or, alternatively, select words appearing on the title of the home page or a file containing the home page as the words of the characteristic information. As another alternative, the information-processing apparatus may compute weights by adoption of a tfidf method.

By referring to FIGS. 4 to 16, the descriptions given so far have explained a variety of examples of the first processing to generate correlation information or accessory-content characteristic information and the second processing to determine a user-utilization accessory content.

By the way, as described above, the correlation-information-updating section 9 shown in FIG. 1 is capable of updating correlation information stored in the correlation-information storage section 2.

Figure 17:
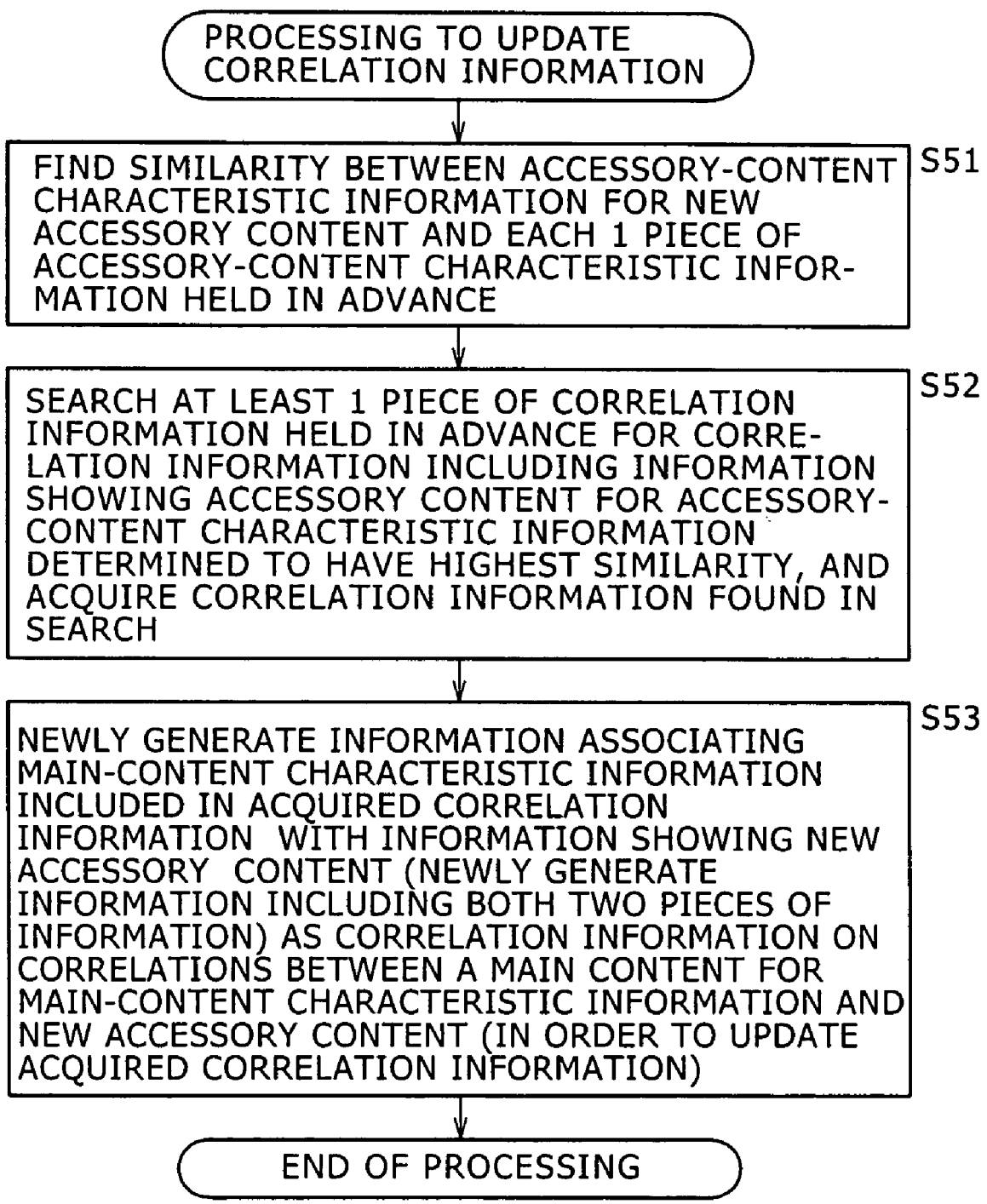
FIG. 17 shows a flowchart representing typical processing carried out by the information-processing apparatus of FIG. 1 to update correlation information.
Figure 18:
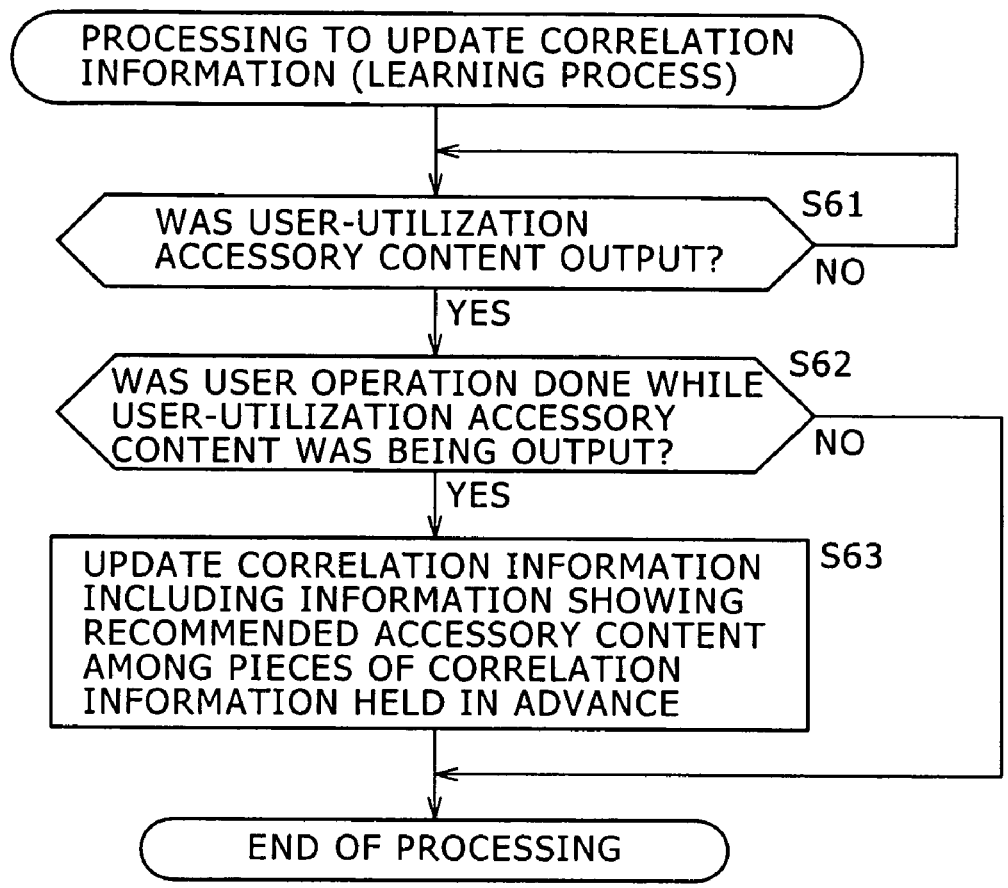
FIG. 18 shows a flowchart representing typical processing carried out by the information-processing apparatus of FIG. 1 to update correlation information as a learning process.

Two examples of processing carried out by the correlation-information-updating section 9 to update correlation information are explained by referring to flowcharts shown in FIGS. 17 and 18 respectively. The processing is referred to as correlation-information-updating processing.

The flowchart shown in FIG. 17 represents the correlation-information-updating processing, which is carried out to update already generated correlation information stored in the correlation-information storage section 2 in order to include information showing a new unused accessory content when a new piece of music or data of a new picture is received by the information-processing apparatus as the a candidate for the accessory content, that is, when the new unused accessory content is received by the information-processing apparatus.

It is to be noted that, in the correlation-information-updating processing represented by the flowchart shown in FIG. 17, it is assumed that the accessory-content characteristic information for the new unused accessory content has already been stored in the accessory-content meta-information storage section 4. It is also worth noting that the information-processing apparatus is capable of generating accessory-content characteristic information for the new unused accessory content by carrying out the accessory-content characteristic information generation processing represented by the flowchart shown in FIG. 15 and storing the generated accessory-content characteristic information in the accessory-content meta-information storage section 4.

On the assumption that the accessory-content characteristic information for the new unused accessory content has already been stored in the accessory-content meta-information storage section 4, at the first step S51 of the flowchart shown in FIG. 17, the correlation-information-updating section 9 finds a degree of similarity between the accessory-content characteristic information stored in the accessory-content meta-information storage section 4 as the accessory-content characteristic information for the new unused accessory content and each piece of accessory-content characteristic information also held in advance in the accessory-content meta-information storage section 4.

Then, at the next step S52, the correlation-information-updating section 9 searches pieces of correlation information held (or stored) in advance in the correlation-information storage section 2 for correlation information including information showing an accessory content corresponding to accessory-content characteristic information determined in the process carried out at the step S51 to have the highest degree of similarity to the accessory-content characteristic information for the new unused accessory content, and acquires the correlation information found in search.

Subsequently, at the next step S53, the correlation-information-updating section 9 newly generates information associating main-content characteristic information included in the correlation information acquired in the process carried out at the step S52 with information showing the new unused accessory content as information on a correlation between a main content corresponding to the main-content characteristic information and the new unused accessory content in order to update correlation information acquired in the process carried out at the step S52. The correlation-information-updating section 9 then stores the updated correlation information in the correlation-information storage section 2. The information associating the above two information includes both information.

Finally, the execution of the correlation-information-updating processing represented by the flowchart shown in FIG. 17 is ended.

It is to be noted that, in a process to store the correlation information newly generated in the process carried out at the step S53 in the correlation-information storage section 2, the original correlation information acquired in the process carried out at the step S52 may be deleted, being overwritten by the newly generated correlation information. That is to say, the original correlation information is updated with the newly generated correlation information. As an alternative, the original correlation information is kept as it is and the newly generated correlation information is stored in a new area. That is to say, the newly generated correlation information is added to the original correlation information.

By carrying out the user-utilization accessory content determination processing represented by the flowchart shown in FIG. 6 after the correlation-information-updating processing represented by the flowchart shown in FIG. 17 has been performed, the information-processing apparatus is capable of automatically reproducing a newly received piece of music or a newly received image if necessary. This is because the information-processing apparatus is capable of using meta information of the newly received piece of music or the newly received image to associate the newly received piece of music or the newly received image with the present operation carried out by the user or a main content utilized by the user in the same way as accessory contents associated with main contents in the past. In addition, even if the newly received piece of music or the newly received image does not have meta information attached thereto, the information-processing apparatus is capable of analyzing characteristics of the newly received piece of music or the newly received image and storing results of the analysis in the accessory-content meta-information storage section 4 as meta information. Thus, the information-processing apparatus is capable of associating the newly received piece of music or the newly received image with the present operation carried out by the user or a main content utilized by the user with ease. The characteristics of a piece of music or a picture include a tempo, a rhythm, an instrument and a libretto.

For the correlation-information-updating processing represented by the flowchart shown in FIG. 17, processing to update correlation information in accordance with a flowchart shown in FIG. 18 is processing to learn a history showing correlations between operations carried out by the user on the operation section 8 and user-utilization accessory contents.

The flowchart shown in FIG. 18 begins with a step S61 at which the correlation-information-updating section 9 determines whether or not a user-utilization accessory content has been output from the user-utilization accessory-content determination section 6.

If the determination result produced in the process carried out at the step S61 indicates that a user-utilization accessory content has not been output from the user-utilization accessory-content determination section 6, the process of the step S61 is carried out again to determine whether or not a user-utilization accessory content has been output from the user-utilization accessory-content determination section 6. The correlation-information-updating section 9 carries out the process of the step S61 repeatedly in order to monitor the state of the user-utilization accessory-content determination section 6 to output a user-utilization accessory content all the time till a user-utilization accessory content is output from the user-utilization accessory-content determination section 6.

As a user-utilization accessory content is output, that is, as the correlation-information-updating section 9 determines in the process carried out at the step S61 that a user-utilization accessory content has been output from the user-utilization accessory-content determination section 6, the flow of the processing goes on to a step S62 at which the correlation-information-updating section 9 determines whether or not a user operation was done while user-utilization accessory content was being output.

That is to say, if a recommended accessory content suggested by the accessory-content recommendation section 23 has been output as a user-utilization accessory content but the user does not like the recommended accessory content, the user is allowed to operate the operation section 8 to stop the process of outputting the recommended accessory content typically by turning off the switch 24 or operate the operation section 8 to change the user-utilization accessory content to another one by typically entering the name of the other accessory content to the accessory-content output section 25. If the user has carried out such an operation on the operation section 8 so that an operation signal has been supplied to the correlation-information-updating section 9, the determination result produced in the process carried out at the step S62 indicates that a user operation was done while user-utilization accessory Finally, the execution of the correlation-information-updating processing represented by the flowchart shown in FIG. 18 is ended.

If the determination result produced in the process carried out at the step S62 indicates that no user operation was done while user-utilization accessory content was being output, that is, if the recommended accessory content is output as it is, on the other hand, the execution of the correlation-information-updating processing represented by the flowchart shown in FIG. 18 is ended without carrying out the process of the step S63. This is because the recommended accessory content is regarded as a content satisfying the user or the recommendation gives a satisfactory result.

By carrying out the correlation-information-updating processing represented by the flowchart shown in FIG. 18, the information-processing apparatus shown in FIG. 1 is capable of demonstrating the following two effects.

The exhibited first effect is an effect that, if the user forms a judgment of determining that the automatically reproduced recommended accessory content or recommended accessory contents put on a list are not proper, the user is allowed to operate the operation section 8 to select another accessory content. In this case, the information-processing apparatus carries out a learning process based on the operation carried out by the user, newly associates the specified accessory content with a user-utilization main content and reflects the specified accessory content in the correlation-information-updating processing carried out next time. As described earlier, examples of the accessory content are a piece of music and a picture.

The exhibited second effect is an effect that, if the user operates the operation section 8 to output a user-utilization accessory content as a BGM/BGV accessory content, the information-processing apparatus learns characteristics of the user-utilization main content such as a text so that, next time, the information-processing apparatus is capable of automatically determining that a main content such as a text having characteristics similar to the learned characteristics is a main content requiring that no accessory content be automatically reproduced.

So far, the information-processing apparatus shown in FIG. 1 has been explained as a typical information-processing apparatus according to an embodiment of the present invention. It is needless to say that the present invention can have a variety of embodiments other than the information-processing apparatus shown in FIG. 1.

To put it concretely, the present invention can be applied for example to apparatus for transmitting and receiving contents as shown in FIG. 19. An apparatus for transmitting and receiving contents is referred to hereafter as a content transmission/reception apparatus. FIG. 19 is a diagram showing another typical configuration of the information-processing apparatus according to the embodiment of the present invention. In other words, FIG. 19 is a diagram showing a typical configuration of an information-processing system according to an embodiment of the present invention.

As shown in FIG. 19, the information-processing system may include any arbitrary number of content transmission/reception apparatus as long as the number of content transmission/reception apparatus is greater than two. The information-processing system shown in FIG. 19 includes a content transmission/reception apparatus 101A and a content transmission/reception apparatus 101B, which are connected to each other by a network 102.

The network 102 is typically a LAN (Local Area Network) for wire communication, a LAN for radio communication or a WAN (Wide Area Network) such as the Internet. The LAN for wire communication and the LAN for radio communication are referred to hereafter as a wire LAN and a radio LAN respectively.

It is to be noted that, in the information-processing system, the network 102 is not a mandatory configuration element. That is to say, the content transmission/reception apparatus 101A and the content transmission/reception apparatus 101B may also directly communicate with each other without the network 102.

FIG. 20 is a diagram showing a typical functional configuration of the content transmission/reception apparatus 101A and the content transmission/reception apparatus 101B composing the information-processing system shown in FIG. 19.

It is to be noted that, in the following description, the content transmission/reception apparatus 101A and 101B are both referred to as the content transmission/reception apparatus 101, which is a generic name for the content transmission/reception apparatus 101A and 101B, in case there is no need to distinguish the apparatus from each other.

As shown in FIG. 20, the content transmission/reception apparatus 101 includes configuration components ranging from a main-content generation section 111 to a switch 122. However, a sensor 114 and an operation section 113 can be implemented as internal configuration components of the content transmission/reception apparatus 101 or components external to the content transmission/reception apparatus 101.

In addition, the configurations of the components ranging from the main-content generation section 111 to the switch 122 are not specially prescribed. For example, the components ranging from the main-content generation section 111 to the switch 122 can be implemented by software, hardware or a combination of software and hardware.

The main-content generation section 111 is a component for generating a main content on the basis of an operation carried out by the user on the operation section 113 and for supplying the generated main content to a data-multiplexing section (or an adder) 121.

As described above, every content can serve as a main content. In order to make the explanation simple, however, the main content cited in the following description is a mail text or text data.

In addition, every content can be utilized as an accessory content. In order to make the explanation simple, however, the accessory content cited in the following description is a piece of music or audio data.

A main-content transmission section 112 is a component for transmitting a main content received from the main-content generation section 111 through the data-multiplexing section 121 to another content transmission/reception apparatus by way of the network 102. To put it concretely, the main-content transmission section 112 employed in the content transmission/reception apparatus 101A shown in FIG. 19 is a component for transmitting a main content to the content transmission/reception apparatus 101B by way of the network 102. On the other hand, the main-content transmission section 112 employed in the content transmission/reception apparatus 101B shown in FIG. 19 is a component for transmitting a main content to the content transmission/reception apparatus 101A by way of the network 102.

The components ranging from the operation section 113 to a context-information acquisition section 115 have basically the same configurations and functions as respectively the operation section 8, the sensor 7 and the context-information acquisition section 27, which are shown in FIG. 3, so that the components are not explained in the following description.

A history-processing section 116 is a component for generating history information including at least a piece of information relevant to the user utilizing the content transmission/reception apparatus 101 shown in FIG. 20 in a time band including a point of time to output a mail text, which is an already used main content, and storing the generated history information in a correlation-information storage section 117.

For example, in this case, every time a pair of an already used main content and information on the context of the user is supplied to the history-processing section 116, the history-processing section 116 generates information on a correlation between the already used main content and the context of the user as history information, storing the correlation information in the correlation-information storage section 117. The already used main content is a mail text received from the main-content generation section 111. The context of the user is a context existing at a point of time the user utilizes the already used main content or, to put it concretely, a context existing at a point of time the user carries out an operation to input the mail text. The information on the context of the user is received from the context-information acquisition section 115.

In addition, as another example, every time a pair of an already used main content and information on the context of the user is supplied to the history-processing section 116, the history-processing section 116 generates information on a correlation between the already used main content and the context of the user as history information, storing the correlation information in the correlation-information storage section 117. The already used main content is a mail text received from a main-content reception section 118. The context of the user is a context existing at a point of time the user utilizes the already used main content or, to put it concretely, a context existing at a point of time the user carries out an operation to inspect the mail text. The information on the context of the user is received from the context-information acquisition section 115.

In addition, as a further example, every time a pair of an already used accessory content and information on the context of the user is supplied to the history-processing section 116, the history-processing section 116 generates information on a correlation between the already used accessory content and the context of the user as history information, storing the correlation information in the correlation-information storage section 117. The already used accessory content is a piece of music received from a user-utilization accessory-content determination section 119 even though FIG. 20 does not show so. The context of the user is a context existing at a point of time the user utilizes the already used accessory content or, to put it concretely, a context existing at a point of time the user carries out an operation to listen to the piece of music. The information on the context of the user is received from the context-information acquisition section 115.

In addition, in this case, as a still further example, if an already used accessory content is utilized while an already used main content is being utilized or before or after an already used main content is utilized or, to put it concretely, the user listens to a piece of music as a BGM accessory content while carrying out operations to write or read a mail text handled as a main content or before or after the operations, the history-processing section 116 generates information on a correlation between the already used accessory content and the already used main content as history information in the same way as the history-processing section 1 shown in FIG. 1 and stores the correlation information in the correlation-information storage section 117.

In addition, as a still further example, the history-processing section 116 is capable of generating information on correlations between three parties, i.e., an already used main content, an already used accessory content and the context of the user as history information and storing the correlation information in the correlation-information storage section 117. The context of the user is a context existing at a point of time the user utilizes the already used main content and the already used accessory content.

As described above, as history information, the correlation-information storage section 117 is used for storing information on correlations between three parties or any two of the three parties, i.e., an already used main content, an already used accessory content and the context of the user.

A main-content reception section 118 is a component for receiving a main content transmitted by another content transmission/reception apparatus by way of the network 102. With the switch 122 turned on, the main-content reception section 118 outputs a user-utilization main content. To put it concretely, the main-content reception section 118 employed in the content transmission/reception section 101A shown in FIG. 19 receives a main content transmitted by the content transmission/reception section 101B shown in the same figure by way of the network 102. On the other hand, the main-content reception section 118 employed in the content transmission/reception section 101B receives a main content transmitted by the content transmission/reception section 101A by way of the network 102.

An user-utilization accessory-content determination section 119 refers to correlation information stored in the correlation-information storage section 117 to determine a user-utilization accessory content suitable for the user in the present context, reads out the determined user-utilization accessory content from an accessory-content storage section 120 and outputs the user-utilization accessory content to an external destination. The selected user-utilization accessory content is an accessory content determined to be suitable for the user on the basis of a past history of the user.

Thus, the accessory-content storage section 120 is a memory used for storing one or more accessory contents.

The data-multiplexing section 121 is a component for multiplexing a main content received from the main-content generation section 111 with context information received from the context-information acquisition section 115 and outputting a result of the multiplexing to the main-content transmission section 112. As described above, an example of the main content is a mail text. Thus, the main-content transmission section 112 is capable of transmitting a main content along with context information added thereto.

The switch 122 changes its state from an on state to an off state or vice versa in accordance with a command received from the operation section 113. That is to say, when the user desires to inspect a mail text received by the main-content reception section 118 as a main content, for example, the user operates the operation section 113 to turn on the switch 122. With the switch 122 put in an on state, the main-content reception section 118 outputs the mail text typically to a display unit as a picture for example.

Figure 21:
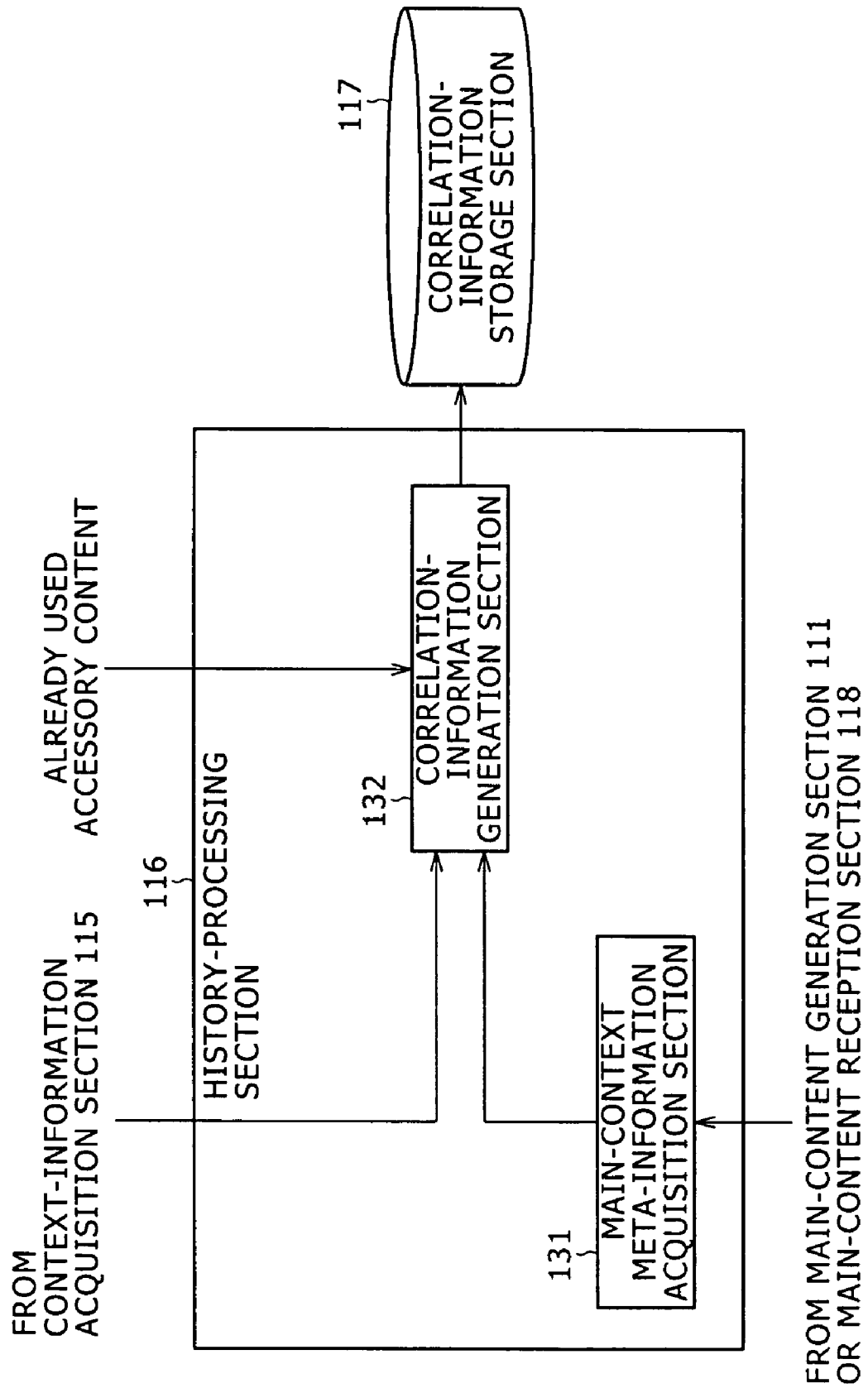
FIG. 21 is a block diagram showing details of a typical functional configuration of a history-processing section employed in the content transmission/reception apparatus shown in FIG. 20.

By referring to FIGS. 21 and 22, the following description explains detailed typical functional configurations of the user-utilization accessory-content determination section 119 and the user-utilization accessory-content determination section 119, which are employed in the content transmission/reception section 101. FIG. 21 is a diagram showing details of a typical functional configuration of the history-processing section 116 whereas FIG. 22 is a diagram showing details of a typical functional configuration of the user-utilization accessory-content determination section 119. The following description begins with an explanation of the history-processing section 116.

As shown in FIG. 21, the history-processing section 116 has a main-content meta-information acquisition section 131 and a correlation-information generation section 132.

Every time an already used main content is received from the main-content generation section 111 or the main-content reception section 118, the main-content meta-information acquisition section 131 acquires main-content meta information from the already used main content and supplies the acquired main-content meta information to the correlation-information generation section 132.

The correlation-information generation section 132 receives main-content meta information from the main-content meta-information acquisition section 131, context information from the context-information acquisition section 115 and an already used accessory content.

Thus, while referring to the main-content meta information, the context information and the already used accessory content, the correlation-information generation section 132 properly generates information on correlations between three parties or any two of the three parties, stores the information on correlations in the correlation-information storage section 117.

Next, details of the typical functional configuration of the user-utilization accessory-content determination section 119 are explained by referring to FIG. 22.

It is to be noted that the user-utilization accessory-content determination section 119 shown in FIG. 22 is provided for the purpose of determining a piece of music as an accessory content suitable for a user context existing at a point of time a mail text received as a main content is displayed to the user or a context existing before or after such a point of time and outputting the accessory content or, to put it concretely, automatically reproducing the piece of music. An user-utilization accessory-content determination section 119 designed for another purpose has a configuration different to a certain degree from the configuration shown in FIG. 22. An example of the user-utilization accessory-content determination section 119 designed for another purpose is shown in FIG. 32 to be described later. Thus, if it is necessary to distinguish the user-utilization accessory-content determination section 119 shown in FIG. 22 from a user-utilization accessory-content determination section 119 having a functional configuration designed for another purpose, the user-utilization accessory-content determination section 119 having the functional configuration shown in FIG. 22 is referred to as an user-utilization accessory-content determination section 119A.

As shown in FIG. 22, the user-utilization accessory-content determination section 119A includes components ranging from a main-content meta-information acquisition section 141 to a associated-accessory-content acquisition section 144.

The main-content meta-information acquisition section 141 has basically the same configuration and functions as the main-content meta-information acquisition section 131 shown in FIG. 21. In the user-utilization accessory-content determination section 119A shown in FIG. 22, however, the main-content meta-information acquisition section 141 receives a user-utilization main content from the main-content reception section 118 instead of an already used main content. As described earlier, a user-utilization main content is a mail text being inspected by the user or to be inspected by the user from now on. Thus, the main-content meta-information acquisition section 141 acquires main-content meta information for the user-utilization main content and supplies the main-content meta information to a matching process section 142.

The matching process section 142 computes the degree of similarity between the main-content meta information received from the main-content meta-information acquisition section 141 as the main-content meta information for a user-utilization main content and main-content meta information included in each piece of correlation information stored in the correlation-information storage section 2, supplying the computed degrees of similarity to the context recommendation section 143.

On the basis of the degrees of similarity received from the matching process section 142, the context recommendation section 143 identifies an already used main content similar to the user-utilization main content and acquires the correlation information for the identified already used main content from the correlation-information storage section 2. In this case, the acquired correlation information is typically information on a correlation between the already used main content and the context of the user. Then, the context recommendation section 143 infers the context indicated by context information included in the acquired correlation information to be a context in which the user utilizes the user-utilization main content, and supplies the context information to the associated-accessory-content acquisition section 144.

The associated-accessory-content acquisition section 144 acquires correlation information including the context information supplied by the context recommendation section 143 from the correlation-information storage section 117. In this case, however, the acquired correlation information is typically information on a correlation between an already used accessory content and the context of the user. Then, the context recommendation section 143 acquires an accessory content indicated (or identified) by information included in the acquired correlation information from the accessory-content storage section 120 and outputs the acquired accessory content as already used accessory content.

That is to say, in this case, the associated-accessory-content acquisition section 144 outputs a piece of music as an accessory content most suitable for a context inferred by the context recommendation section 143 as a context in which the user utilizes a received user-utilization main content or, to put it concretely, a context in which the user inspects a received mail text.

By referring to FIGS. 20 to 22, the above description has explained a typical functional configuration of the content transmission/reception apparatus 101 serving as another information-processing apparatus according to an embodiment of the present invention. The content transmission/reception apparatus 101 having such a functional configuration is capable of individually carrying out pieces of processing, which are classified into large categories, i.e., transmission processing and reception processing. The transmission processing is processing to generate a main content and transmit the generated main content to another content transmission/reception apparatus. On the other hand, the reception processing is processing to receive a main content from another content transmission/reception apparatus and outputting the received main content.

Examples of the transmission processing and the reception processing, which are carried out by the content transmission/reception apparatus 101 described earlier by referring to FIGS. 20 to 22, are explained below by referring to flowcharts shown in FIGS. 23 and 29 respectively. The description begins with an explanation of the example of the transmission processing.

Figure 23:
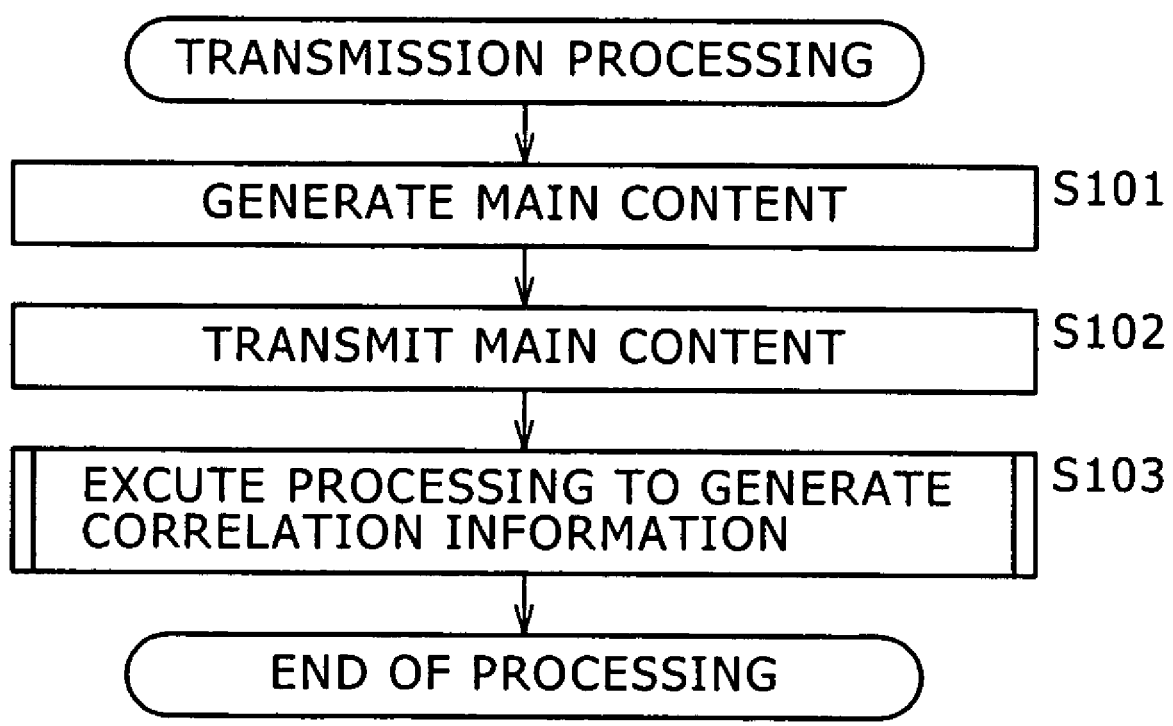
FIG. 23 shows a flowchart representing typical transmission processing carried out by the content transmission/reception apparatus shown in FIG. 20.

The transmission processing represented by the flowchart shown in FIG. 23 begins with a step S101 at which the main-content generation section 111 generates a main content, which is a mail text in this case, and supplies the generated mail text to the main-content transmission section 112 by way of the data-multiplexing section 121. It is to be noted that, as described before, if the data-multiplexing section 121 receives information on a context from the context-information acquisition section 115, the data-multiplexing section 121 multiplexes the information on a context with the main content and supplies a result of the multiplexing to the main-content transmission section 112.

Then, at the next step S102, the main-content transmission section 112 transmits the main content generated by the main-content generation section 111 in the process carried out at the step S101 to another content transmission/reception apparatus by way of the network 102.

Subsequently, at the next step S103, the history-processing section 116 carries out correlation-information generation processing to generate correlation information as history information for the transmission processes carried out at the steps S101 and S102 and store the generated correlation information in the correlation-information storage section 117.

Figure 24:
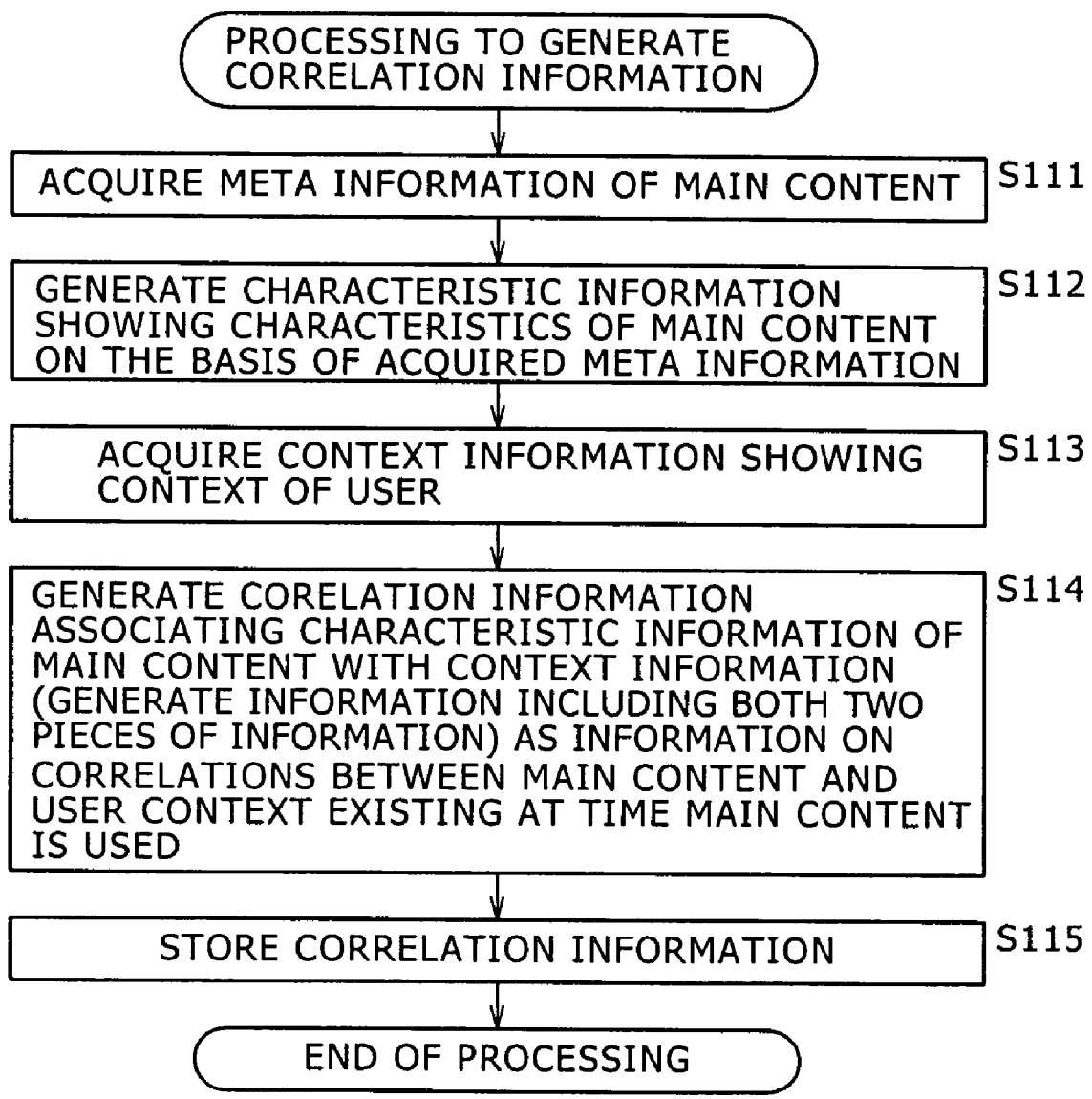
FIG. 24 shows a flowchart representing typical details of correlation-information generation processing of the transmission processing represented by the flowchart shown in FIG. 23.

Details of the correlation-information generation processing carried out at the step S103 are shown in a flowchart of FIG. 24. By referring to the flowchart shown in FIG. 24, the following description explains the details of the correlation-information generation processing carried out at the step S103 as follows.

The flowchart shown in FIG. 24 begins with a step S111 at which the main-content meta-information acquisition section 131 employed in the history-processing section 116 shown in FIG. 21 acquires meta information of an already used main content and supplies the acquired meta information to the correlation-information generation section 132. In this example, the already used main content is a mail text generated by the main-content generation section 111. As described before, the meta information of an already used main content is referred to as main-content meta information.

Then, at the next step S112, the correlation-information generation section 132 generates characteristic information showing characteristics of the already used main content on the basis of the acquired meta information. An example of the characteristic information will be described later.

Subsequently, at the next step S113, the correlation-information generation section 132 acquires context information from the context-information acquisition section 115 as information showing a user context existing at a point of time the already used main content was utilized.

Then, at the next step S114, the correlation-information generation section 132 generates correlation information associating the characteristic information generated in the process carried out at the step S112 as the characteristic information of the already used main content with the context information acquired in the process carried out at the step S113 as information on a correlation between the already used main content and the user context existing at a point of time the already used main content was utilized. The information associating the characteristic information of a main content with context information includes both the characteristic information of the main content and the context information.

Subsequently, at the next step S115, the correlation-information generation section 132 stores the correlation information generated in the process carried out at the step S114 in the correlation-information storage section 117.

Finally, the execution of the correlation-information generation processing represented by the flowchart shown in FIG. 24 is ended.

The correlation-information generation processing represented by the flowchart shown in FIG. 24 is carried out for every transmission processing represented by the flowchart shown in FIG. 23, every reception processing to be described later by referring to the flowchart shown in FIG. 29 or every processing performed by the content transmission/reception apparatus 101 in response to an operation carried out by the user to utilize a main content. The processing performed by the content transmission/reception apparatus 101 in response to an operation carried out by the user to utilize a main content is shown in none of the figures. The correlation information generated in the processing represented by the flowchart shown in FIG. 24 is information on a correlation between an already used main content and a user context for the main content and is stored in the correlation-information storage section 117 as history information of the user.

To put it concretely, let us assume for example that the content transmission/reception apparatus 101 carries out the transmission processing represented by the flowchart shown in FIG. 23 as described above three times. In the pieces of such processing, the user operates the operation section 113 to create three mail texts and the content transmission/reception apparatus 101 transmits the mail texts to another content transmission/reception apparatus. Let the three mail texts be referred to hereafter as mails 1, 2 and 3.

In addition, let us also assume that, when the user utilizes mail 1 or, to put it concretely, when the user creates mail 1, the context-information acquisition section 115 gets 'Happy' as context information, when the user utilizes mail 2 or, to put it concretely, when the user creates mail 2, the context-information acquisition section 115 gets 'Strained' as context information and when the user utilizes mail 3 or, to put it concretely, when the user creates mail 3, the context-information acquisition section 115 gets 'Nostalgic' as context information.

In this case, the correlation-information generation processing represented by the flowchart shown in FIG. 24 is carried out individually once for each of mails 1, 2 and 3 to generate three pieces of correlation information for mails 1, 2 and 3 respectively and store the three pieces of correlation information in the correlation-information storage section 117.

To put it in detail, in the process carried out at the step S111 for each of mails 1, 2 and 3, the main-content meta-information acquisition section 131 acquires meta information of each of mails 1, 2 and 3 respectively by disassembling mails 1, 2 and 3 into respectively noun-word groups (Ia) to (IIIa) each comprising one or more noun words as shown below. The main-content meta-information acquisition section 131 acquires noun-word groups (Ia) to (IIIa) as pieces of meta information of mails 1, 2 and 3 respectively and supplies the groups to the correlation-information generation section 132.

Words in noun-word groups (Ia) to (IIIa) are listed as follows:

(Ia): travel, schedule, travel, destination, map, contact, hot spring, souvenir and hot spring (IIa): schedule, contact, conference, memo, participation, memo and conference (IIIa): destination, map, participation, music, folk, folk and music In this case, in the process carried out at the step S112 for each of mails 1, 2 and 3, first of all, the correlation-information generation section 132 generates characteristic vectors CCV1a, CCV2a and CCV3a each having a standard form like one shown in FIG. 25 as pieces of characteristic information for mails 1, 2 and 3 respectively. As shown in the figure, the characteristic vectors CCV1a, CCV2a and CCV3a of the standard form each have vector components consisting of the following words: Travel, Schedule, Destination, Map, Contact, Hot spring, Conference, Memo, Participation, Souvenir, Music and Folk. In the example shown in FIG. 25, much like the examples explained earlier, the main-content meta information including the vector components such as the noun words Travel, Schedule and so on composing each of the characteristic vectors CCV1a, CCV2a and CCV3a with the standard form each have a value equal to the frequency of appearance of the word in the mail text associated with the characteristic vector.

Thus, as shown in FIG. 25, the characteristic vector CCV1a has a typical value of (2, 1, 1, 1, 1, 2, 0, 0, 0, 2, 0, 0), the characteristic vector CCV2a has a typical value of (0, 1, 0, 0, 1, 0, 2, 2, 1, 0, 0, 0) and the characteristic vector CCV3a has a typical value of (0, 0, 1, 1, 0, 0, 0, 0, 1, 0, 2, 2).

Much like the examples explained earlier, the characteristic vectors CCV1a, CCV2a and CCV3a can be used as characteristic information of mails 1, 2 and 3 respectively.

In this case, however, the correlation-information generation section 132 selects only vector components each having a value of at least two among vector components composing each of the characteristic vectors CCV1a, CCV2a and CCV3a, that is, the correlation-information generation section 132 selects only noun words each having an appearance frequency of at least two among noun words serving as the vector components composing each of the characteristic vectors CCV1a, CCV2a and CCV3a, and takes the selected noun words as characteristic information of each of the characteristic vectors CCV1a, CCV2a and CCV3a.

For example, as shown in FIG. 26, the correlation-information generation section 132 generates characteristic information CCI1a including the three noun words 'travel', 'hot spring' and 'souvenir' for mail 1, characteristic information CCI2a including the two noun words 'conference' and 'memo' for mail 2 and characteristic information CCI3a including the two noun words 'music' and 'folk' for mail 3.

Then, in the process carried out at the step S113 for each of mails 1, 2 and 3, the correlation-information generation section 132 acquires respectively the words Happy, Strained and Nostalgic shown in FIG. 25 from the context-information acquisition section 115.

In the process carried out at the step S114 for each of mails 1, 2 and 3, as shown in FIG. 26, the correlation-information generation section 132 generates correlation information CI1a correlating the word Happy to the characteristic information CCI1a, correlation information CI2a correlating the word Strained to the characteristic information CCI2a and correlation information CI3a correlating the word Nostalgic to the characteristic information CCI3a.

Then, in the same process carried out at the step S114 for each of mails 1, 2 and 3, the correlation-information generation section 132 stores the generated pieces of information CI1a, CI2a and CI3a in the correlation-information storage section 117.

By the way, as described above for example, let us assume that the content transmission/reception apparatus 101 carries out the transmission processing represented by the flowchart shown in FIG. 23 as described above three times to generate and send mails 1, 2 and 3 respectively and, at points of time mails 1, 2 and 3 have been transmitted, the content transmission/reception apparatus 101 outputs three pieces of music with titles of Music1, Music2 and Music3 respectively each as an accessory content.

In this case, by carrying out the correlation-information generation processing represented by the flowchart shown in FIG. 24, the content transmission/reception apparatus 101 is capable of generating information on correlations between the already used main contents mails 1 to 3 and contexts existing at points of time the user utilized the already used main contents. In addition, by carrying out correlation-information generation processing represented by a flowchart shown in FIG. 27, the content transmission/reception apparatus 101 is capable of generating information on correlations between the pieces of music with the titles of Music1, Music2 and Music3 each utilized as an already used accessory content and contexts existing at points of time the user utilized the already used accessory contents.

Figure 27:
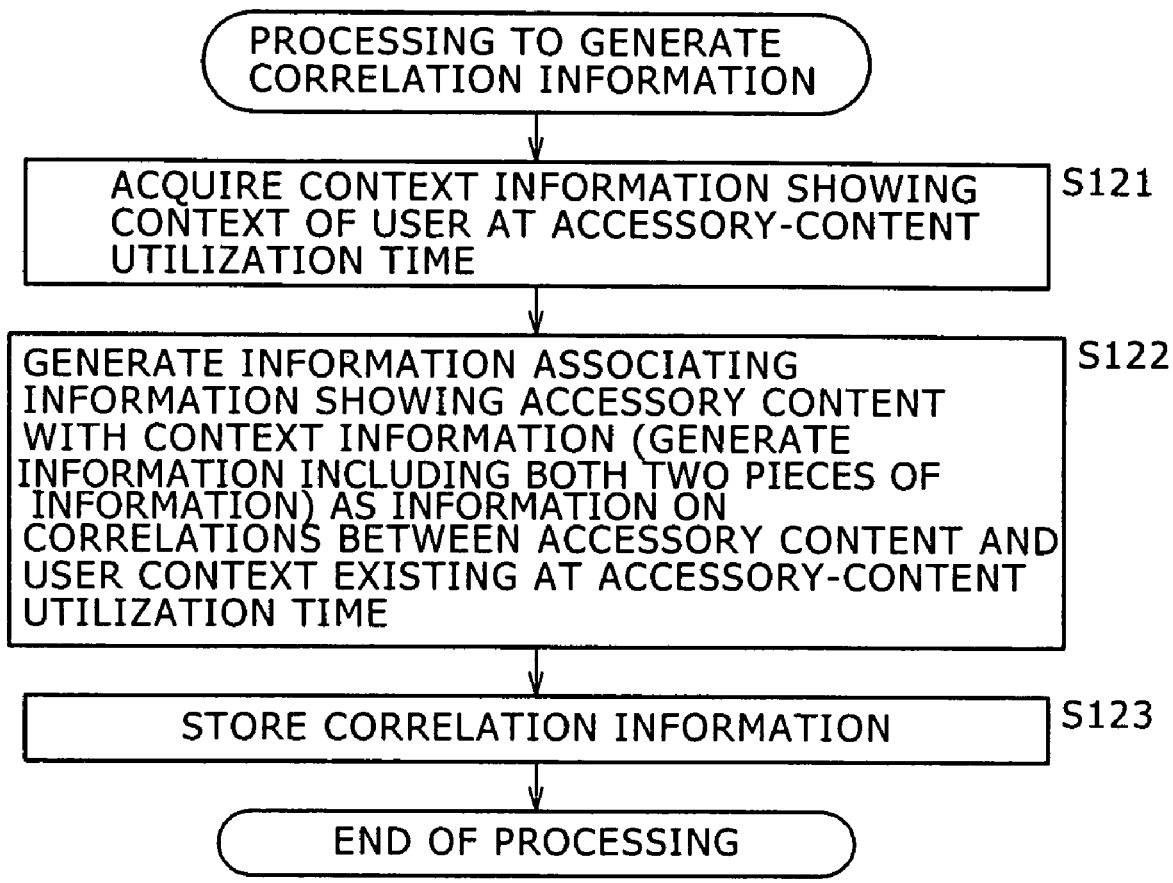
FIG. 27 shows a flowchart representing typical details of correlation-information generation processing of the transmission processing represented by the flowchart shown in FIG. 23.

That is to say, the process of the step S103 of the flowchart shown in FIG. 23 is carried out as two pieces of processing, i.e., the correlation-information generation processing represented by the flowchart shown in FIG. 24 and the correlation-information generation processing represented by the flowchart shown in FIG. 27.

Next, the correlation-information generation processing represented by the flowchart shown in FIG. 27 is explained as follows.

As shown in the figure, the flowchart begins with a step S121 at which the correlation-information generation section 132 shown in FIG. 21 acquires context information showing a context existing at a point of time, at which an already used accessory content was utilized, from the context-information acquisition section 115 as the context of the user.

Then, at the next step S122, the correlation-information generation section 132 generates correlation information associating information showing an accessory content with the context information acquired in the process carried out at the step S121 as information on correlations between the accessory content and the user context existing at a point of time, at which the accessory content was utilized. The information associating the information showing an accessory content with context information includes both the information showing the accessory content and the context information.

Subsequently, at the next step S123, the correlation-information generation section 132 stores the correlation information generated in the process carried out at the step S122 in the correlation-information storage section 117.

Finally, the execution of the correlation-information generation processing represented by the flowchart shown in FIG. 27 is ended.

It is to be noted that, in this embodiment, the correlation-information generation processing represented by the flowchart shown in FIG. 27 is a portion of the process carried out at the step S103 of the flowchart shown in FIG. 23. As will be described later, the correlation-information generation processing represented by the flowchart shown in FIG. 27 may be carried out as a portion of a process carried out at a step S137 of the flowchart shown in FIG. 29. That is to say, the correlation-information generation processing represented by the flowchart shown in FIG. 27 is carried out if necessary when an accessory content is utilized even if a main content is not.

To put it concretely, in this case, let us assume for example that, in the process carried out at the step S121 for each of the pieces of music with the titles of Music1, Music2 and Music3, the correlation-information generation section 132 acquires the same pieces of context information as those acquired in the process carried out at the step S113 of the flowchart shown in FIG. 24, that is, the correlation-information generation section 132 acquires the words Happy, Strained and Nostalgic for the pieces of music with the titles of Music1, Music2 and Music 3 respectively.

In the process carried out at the step S122 for each of the pieces of music with the titles of Music1, Music2 and Music 3, as shown in FIG. 28, the correlation-information generation section 132 generates correlation information CI1b correlating the word Happy to the piece of music with the title of Music1, correlation information CI2b correlating the word Strained to the piece of music with the title of Music2 and correlation information CI3b correlating the word Nostalgic to the piece of music with the title of Music3.

Then, in the process carried out at the step S123 for each of the pieces of music with the titles of Music1, Music2 and Music 3, the correlation-information generation section 132 stores each of the pieces of correlation information CI1b, CI2b and CI3b in the correlation-information storage section 117.

Thus, in the case of this embodiment, as a result of carrying out the transmission processing represented by the flowchart shown in FIG. 23 as described above three times, the pieces of correlation information CI1a, CI2a and CI3a shown in FIG. 26 and the pieces of correlation information CI1b, CI2b and CI3b shown in FIG. 28 are stored in the correlation-information storage section 117.

The above description has explained examples of the transmission processing carried out by the content transmission/reception apparatus 101 shown in FIGS. 20 to 22.

Figure 29:
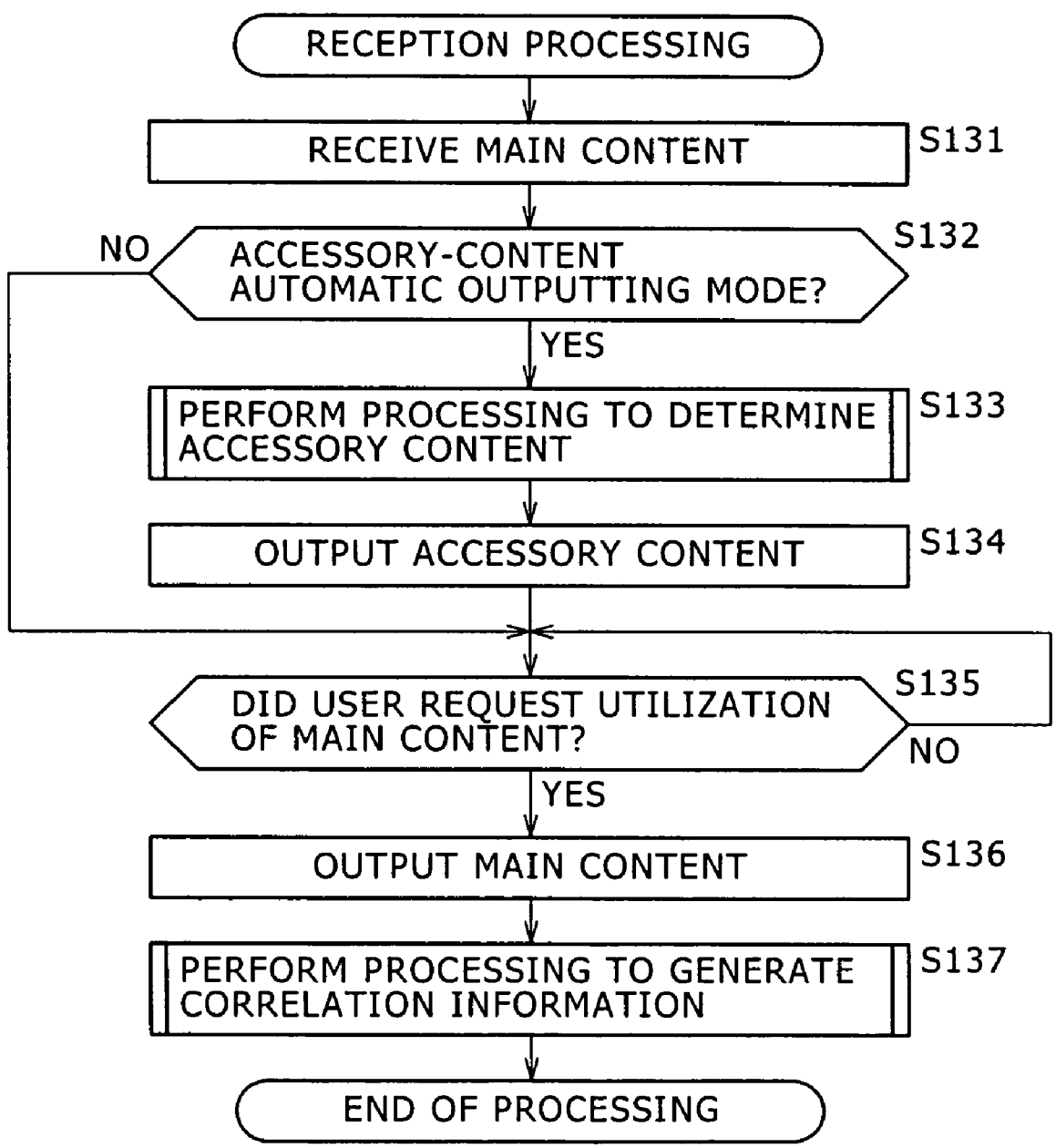
FIG. 29 shows a flowchart representing typical reception processing carried out by the content transmission/reception apparatus shown in FIG. 20.

By referring to a flowchart shown in FIG. 29, the following description explains examples of reception processing carried out by the content transmission/reception apparatus 101 shown in FIGS. 20 to 22.

As shown in the figure, the flowchart begins with a step S131 at which the main-content reception section 118 shown in FIG. 20 receives a mail text as a main content transmitted by another content transmission/reception apparatus by way of the network 102.

Then, at the next step S132, the user-utilization accessory-content determination section 119 determines whether or not the present operating mode of the content transmission/reception apparatus 101 is an accessory-content automatic outputting mode, which is a mode to output an accessory content automatically. In this embodiment, the accessory content is a piece of music as described before. It is to be noted that an operation to automatically output an accessory content is of the same concept as the operation to automatically reproduce an accessory content as described earlier. That is to say, the operation to automatically reproduce an accessory content is no more than another technical term of the operation to automatically output an accessory content.

If the determination result produced in the process carried out at the step S132 indicates that the present operating mode of the content transmission/reception apparatus 101 is an accessory-content automatic outputting mode, the flow of the processing goes on to a step S133. Processes carried out at the step S133 and subsequent steps will be described later.

If the determination result produced in the process carried out at the step S132 indicates that the present operating mode of the content transmission/reception apparatus 101 is not an accessory-content automatic outputting mode, on the other hand, the flow of the processing goes on to a step S135 at which the main-content reception section 118 determines whether or not the user has made a request for utilization of the main content, that is, whether or not the user has made a request for inspection of the mail text.

If the switch 122 is in an off state, the determination result produced in the process carried out at the step S135 indicates that the user has not made a request for utilization of the main content. In this case, the flow of the processing goes back to the step S135 at which the main-content reception section 118 again determines whether or not the user has made a request for utilization of the main content. The process of the step S135 is carried out repeatedly in a stet of waiting for the switch 122 to be turned on.

If the user desires to delete the mail text handled as a main content without inspecting the text, the user operates the operation section 113 to enter a delete command to the main-content reception section 118. In this case, the waiting loop process of the step S135 is ended to forcibly terminate the execution of the reception processing represented by the flowchart shown in FIG. 29. It is to be noted that no arrow connecting the operation section 113 to the main-content reception section 118 is shown in FIG. 20 as an arrow representing this delete command.

If the user desires to inspect the mail text handled as a main content, on the other hand, the user operates the operation section 113 to turn on the switch 122.

With the switch 122 turned on, the determination result produced in the process carried out by the main-content reception section 118 at the step S135 indicates that the user has made a request for utilization of the main content. In this case, the flow of the processing goes on to a step S136 at which the main content is output. That is to say, at the step S136, the mail text handled as a main content is displayed on typically a display unit as a picture.

Then, at the next step S137, the history-processing section 116 carries out a process to generate correlation information and store the correlation information in the correlation-information storage section 117 as history information regarding this reception processing, which includes the processes carried out at the steps S131 to S136.

As the process of the step S137 to generate correlation information, typically, the correlation-information generation processing represented by the flowchart shown in FIG. 24 is carried out. That is to say, in the process carried out at the step S137, correlation information is generated and stored in the correlation-information storage section 117 as information on a correlation between the already used main content and a context existing at a point of time the user utilized the already used main content. In this case, the already used main content is the received and inspected mail text.

In addition, if the operating mode of the content transmission/reception apparatus 101 is not an accessory-content automatic outputting mode as described above and an accessory content such as a piece of music specified by the user by operating the operation section 113 is output at least during a portion of a period to carry out the processes of the steps S131 to S136 described above, typically, the correlation-information generation processing represented by the flowchart shown in FIG. 27 is carried out. That is to say, in the process carried out at the step S137, correlation information is generated and stored in the correlation-information storage section 117 as information on a correlation between the already used accessory content and a context existing at a point of time the user utilized the already used accessory content. In this case, the already used accessory content is the piece of music, which was output when the user inspected the received mail text.

Finally, the execution of the reception processing represented by the flowchart shown in FIG. 29 is ended.

The above description has explained the reception processing, which is carried out if the operating mode of the content transmission/reception apparatus 101 is not an accessory-content automatic outputting mode.

On the other hand, the following description explains the reception processing, which is carried out if the operating mode of the content transmission/reception apparatus 101 is an accessory-content automatic outputting mode.

As described above, at the step S131, the main-content reception section 118 receives a mail text as a main content. In this case, however, the determination result produced in the process carried out at the next step S132 indicates that the present operating mode of the content transmission/reception apparatus 101 is an accessory-content automatic outputting mode so that the flow of the processing goes on to a step S133.

At the step S133, the user-utilization accessory-content determination section 119 carries out a process to determine a piece of music as an accessory content suitable for a context inferred as a context to utilize the main content received at the step S131 by properly referring to correlation information stored in the correlation-information storage section 117. It is to be noted that the process carried out at the step S133 is referred to accessory-content determination processing in the following description. Details of the accessory-content determination processing will be explained later by referring to a flowchart shown in FIG. 30.

Then, at the next step S134, the user-utilization accessory-content determination section 119 output an accessory content such as the piece of music determined in the accessory-content determination processing carried out at the step S133 as user-utilization accessory content.

That is to say, the piece of music determined in the accessory-content determination processing carried out at the step S133 is automatically reproduced.

It is to be noted that, in the typical processing represented by the flowchart shown in FIG. 29, the processes of the steps S133 and S134 are carried out before the step S136. That is to say, the piece of music determined in the accessory-content determination processing carried out at the step S133 is automatically reproduced in a process carried out at the step S134 with a timing preceding the inspection of the mail text by the user, that is, a timing before the process carried out at the step S136 to output the mail text as a main content.

However, the timing to automatically reproduce the piece of music can be set at for example a point of time in course of the inspection of the mail text by the user. In this case, the process of the step S135 is carried out concurrently with the processes of the steps S133 and S134 and, as soon as the determination result of the process carried out the step S135 becomes YES, the process of the step S136 is carried out.

In addition, the timing to automatically reproduce the piece of music can be set at for example a point of time after the inspection of the mail text by the user. In this case, the process of the step S136 is carried out before the process of the step S132 to be followed by the processes of the steps S133 and S134.

By referring to a flowchart shown in FIG. 30, the following description explains details of the accessory-content determination processing carried out at the step S133 of the flowchart shown in FIG. 29.

The flowchart shown in FIG. 30 begins with a step S141 at which the main-content meta-information acquisition section 141 employed in the user-utilization accessory-content determination section 119A shown in FIG. 22 acquires meta information of the main content and supplies the meta information to the matching process section 142. The main content is the mail text received by the main-content reception section 118. As described previously, the meta information of the main content is referred to as a main-content meta information.

Then, at the next step S142, the matching process section 142 generates characteristic information showing characteristics of the main content on the basis of the acquired meta information.

It is to be noted that the processes carried out at the steps S141 and S142 are basically the same as respectively the processes carried out at the steps S111 and S112 of the flowchart shown in FIG. 24. They are different from each other in that, in the processes carried out at the steps S141 and S142, the object of processing is a mail text being inspect or to be inspect by the user while, in the processes carried out at the steps S111 and S112, the object of processing is a mail text already inspected by the user. Thus, a detailed explanation of the processes carried out at the steps S141 and S142 is omitted.

Subsequently, at the next step S143, the matching process section 142 finds a degree of similarity between the characteristic information generated in the process carried out at the step S142 as the characteristic information of the main content and characteristic information included in each piece of correlation information held (stored) in advance in the correlation-information storage section 117 as information on correlations between main contents and contexts, and supplies the degrees of similarity to the context recommendation section 143.

Then, at the next step S144, the context recommendation section 143 acquires a piece of correlation information including characteristic information having a degree of similarity higher than a threshold value and infers a user context existing at a main-content utilization time on the basis of context information included in the acquired piece of correlation information. Typical pieces of correlation information are the pieces of correlation information CI1a, CI2a and CI3a each shown in FIG. 26 as information on a correlation between a main content and a user context existing at the utilization time of the main content, the meta information of which was acquired in the process carried out at the step S141.

The context information used as a basis for inferring a context in the process carried out at the step S144, that is, the context information included in the acquired piece of correlation information including characteristic information having a degree of similarity higher than the threshold value, is supplied to the associated-accessory-content acquisition section 144.

Subsequently, at the next step S145, the associated-accessory-content acquisition section 144 acquires correlation information including context information for the inferred context from at least one piece of correlation information held (stored) in advance in the correlation-information storage section 117 as information on correlations between accessory contents and contexts. Typical pieces of correlation information are the pieces of correlation information CI1b, CI2b and CI3b each shown in FIG. 28 as information on a correlation between an accessory content and a user context existing at the utilization time of the accessory content.

Then, at the next step S146, the associated-accessory-content acquisition section 144 acquires an accessory content indicated by information included in the acquired correlation information acquired in the process carried out at the step S145 as information showing an accessory content and takes the acquired accessory content as a user-utilization accessory content.

Finally, the execution of the accessory-content determination processing represented by the flowchart shown in FIG. 30 is ended.

An example of the accessory-content determination processing represented by the flowchart shown in FIG. 30 is explained as follows.

Let us assume for example that the main-content reception section 118 receives a mail text like one shown in FIG. 31 and supplies the text to the main-content meta-information acquisition section 141.

In compliance with the examples described above, information stored in the correlation-information storage section 117 includes the pieces of correlation information CI1a, CI2a and CI3a each shown in FIG. 26 as information on a correlation between a main content and a user context existing at the utilization time of the main content as well as the pieces of correlation information CI1b, CI2b and CI3b each shown in FIG. 28 as information on a correlation between an accessory content and a user context existing at the utilization time of the accessory content.

In this case, in the process carried out at the step S141, the main-content meta-information acquisition section 141 disassembles the mail text shown in FIG. 31 into words of word group (IVa) shown below. As shown in the figure, the mail text says: "Last week, I went to Hokkaido. There, I bought a souvenir good for tea time. I hope you will join me in enjoying the souvenir." Each of the words is acquired as main-content meta information and supplied to the matching process section 142.

(IVa): Souvenir Souvenir

It is to be noted that, in actuality, the main-content meta-information acquisition section 141 also acquires the words 'last week' and 'Hokkaido' as main-content meta information. In this case, however, as main-content meta information, the main-content meta-information acquisition section 141 acquires only words used as components of a characteristic vector having the standard form including the following words: Travel, Schedule, Destination, Map, Contact, Hot spring, Conference, Memo, Participation, Souvenir, Music and Folk as shown in FIG. 25.

Then, in the process carried out at the step S142, the matching process section 142 generates a characteristic vector CCVna having the standard form shown in FIG. 25 from the main-content meta information shown by word group (IVa) as a vector having a value of {0, 0, 0, 0, 0, 0, 0, 0, 0, 2, 0, 0}. Then, the matching process section 142 generates characteristic information CIIna including the word 'souvenir' from the characteristic vector CCVna.

Subsequently, in the process carried out at the step S143, the matching process section 142 computes a degree of similarity between the characteristic information CIIna and each of the pieces of characteristic information CII1a, CII2a and CII3a included in respectively the pieces of correlation information CI1a, CI2a and CI3a shown in FIG. 26, supplying the degrees of similarity to the context recommendation section 143.

In the case of this example, the characteristic information CIIna has the highest degree of similarity to the characteristic information CII1a included in the correlation information CI1a shown in FIG. 26. Thus, in the process carried out at the step S144, on the basis of the context information 'happy' included in the correlation information CI1a, the context recommendation section 143 infers a context of typically 'happy feeling' as a context of the user when inspecting the mail text shown in FIG. 31. Then, the context information 'happy' used as a basis for inferring the context of 'happy feeling' is supplied to the associated-accessory-content acquisition section 144.

Receiving the context information 'happy', in the processes carried out at the steps S145 and S146, the associated-accessory-content acquisition section 144 acquires correlation information CI1b shown in FIG. 28 as correlation including the context information 'happy' from the correlation-information storage section 117 and a piece of music with a title of Music1 included in the correlation information CI1b from the accessory-content storage section 120, which is used for storing the piece of music as an accessory content.

As described above, if the operating mode of the content transmission/reception apparatus 101 is set at the accessory-content automatic outputting mode, when receiving the mail text shown in FIG. 31, the content transmission/reception apparatus 101 infers a context of 'happy feeling' as a user context to inspect the mail text and automatically reproduces a piece of music with a title of Music1 as a piece of music, which was reproduced in the past when the user had a happy feeling.

Speaking more generally, if the operating mode of the content transmission/reception apparatus 101 is set at the accessory-content automatic outputting mode, before the user inspect a received mail text, that is, before the user opens a file containing the received mail text, or while the user is inspecting the received mail text or, at a point of time the user opens the file containing the received mail text or at a point of time after the file has been opened, the content transmission/reception apparatus 101 infers a context in which the user is inspecting the mail text and automatically reproduces a piece of music or a picture as an accessory content associated with the inferred context.

As described above, an accessory-content automatic outputting timing is not specially prescribed. If the accessory-content automatic outputting timing is set at a point of time preceding the inspection of a received mail text or an operation to open the file containing the received mail text, however, the user is allowed to predict an atmosphere in which the user inspects the received mail text, that is, the user is allowed to predict a context in which the user inspects the mail text.

In addition, as described above, the automatically output accessory content is not specially limited to music. That is to say, the automatically output accessory content can also be an image of characters, an image of an icon or a sound. If the automatically output accessory content is an image of characters, the characters themselves can have different colors and/or different designs. By merely using an image of characters, an image of an icon or a sound as an automatically output accessory content, that is, by merely listening to a sound or looking at an image as an automatically output accessory content, the user is capable of feeling the atmosphere of the received mail even if the user does not inspect the text of the mail.

In addition, if the content transmission/reception apparatus 101 has a function to read a mail text, outputting the mail text as a reading voice, the received mail text can also be regarded as an accessory content. Then, in an operation to automatically output the mail text by reading the mail text and outputting the mail text as a reading voice, the quality and tone of the voice can be changed in accordance with the inferred context of the user.

In addition, if a received mail text is also regarded as an accessory content, the output destination of the mail text can be changed in accordance with the inferred context. In the example shown in FIG. 20, the output destination is an external destination. However, a folder in a memory embedded in the content transmission/reception apparatus 101 can also be used as an output destination. Such a memory is shown in none of the figures though. Folders used for storing mail texts can be classified by inferred context, for example, by feeling. If the content transmission/reception apparatus 101 is implemented by a hand phone or a PDA (Personal Digital Assistant), the output destination can be a desk-top computer or a computer of another type. With the content transmission/reception apparatus 101 implemented by a hand phone or a PDA, a filtering process can be carried out. To put it concretely, the content transmission/reception apparatus 101 carried by the user during leisure time can be used to receive only enjoyable (recommended) mail texts and the content transmission/reception apparatus 101 is capable of transferring mail texts each inferred to be a mood-spoiling text to a desk-top computer or a computer of another type.

By the way, as described above, such a content transmission/reception apparatus 101 is capable of adding context information showing a context of the user to a mail text handled as a main content and sending the mail text along with the context information to another content transmission/reception apparatus. That is to say, the user is capable of adding context information showing a context of its own to a mail text and sending the mail text along with the context information to a communication partner. When the user sends a mail text expressing gratitude to a communication partner, for example, the user is capable of adding context information showing the feeling of gratitude and sending the context information along with the mail text to the communication partner. An example of the context information showing the feeling of gratitude is 'happy' context information.

Thus, when the content transmission/reception apparatus 101 serving as a mail receiver receives a mail text with such context information added thereto, the content transmission/reception apparatus 101 is capable of selecting a piece of music as an accessory content associated with a context indicated by the context information added to the receive mail text on the basis of a history of another user operating the content transmission/reception apparatus 101 and automatically outputting the selected piece of music. That is to say, as described above, if the 'happy' context information is added to the mail text, the content transmission/reception apparatus 101 receiving the mail text is capable of automatically reproducing a piece of music suitable for a 'happy' context.

In this case, a point drawing attention is the fact that the automatically reproduced piece of music is not music making the mail sender happy, but music suitable for a 'happy' context or the like that makes the mail receiver happy.

To put it in detail, as described above, traditionally, when a mail sender wants to send a 'happy' context to a mail receiver, the mail sender is capable of adding a piece of music suitable for a context regarded by the sender as a 'happy' context to a mail text and sending the piece of music along with the mail text to the mail receiver. However, the mail receiver does not necessarily feel happy by listening to the piece of music added to the mail text as music regarded by the mail sender as music suitable for the 'happy' context. As a matter of fact, it is quite within the bounds of possibility that the mail receiver misunderstands the 'happy' context defined by the mail sender.

In order to solve the above problem, in accordance with the embodiment, a content transmission/reception apparatus 101 used by the mail sender transmits context information showing a context of the mail sender to a content transmission/reception apparatus 101 used by the mail receiver, whereas the content transmission/reception apparatus 101 used by the mail receiver recommends a piece of music regarded by the mail receiver as music suitable for the context shown by the context information and automatically reproduces the recommended piece of music.

FIG. 32 is a diagram showing a typical functional configuration of a user-utilization accessory-content determination section 119 designed for the purpose of receiving a mail text as a main content including additional context information, determining a piece of music as an accessory content regarded by the mail receiver as music suitable for the context shown by the context information added to the received mail text at a specific point of time the received mail text is shown to the mail receiver or a point of time before or after the specific point of time and automatically reproducing the determined piece of music as described above.

It is to be noted that, in order to distinguish the user-utilization accessory-content determination section 119 having the functional configuration shown in FIG. 32 from the user-utilization accessory-content determination section 119A having the functional configuration shown in FIG. 22 and other accessory-content determination sections, the user-utilization accessory-content determination section 119 having the functional configuration shown in FIG. 32 is referred to hereafter as the user-utilization accessory-content determination section 119B.

As shown in FIG. 32, the user-utilization accessory-content determination section 119B includes components ranging from a context-information separation section 151 to an associated-accessory-content acquisition section 154.

The context-information separation section 151 inputs a mail text received by the main-content reception section 118 along with context information added to the text and to be inspected or being inspected by the user. That is to say, the context-information separation section 151 is a component for inputting a user-utilization main content. Thus, the context-information separation section 151 separates the context information from the mail text input as a user-utilization main content along with the context information and supplies the separated context information to a matching process section 152.

The matching process section 152 computes a degree of similarity between the context information received from the context-information separation section 151 and context information included in each piece of correlation information stored in advance in the correlation-information storage section 117, acquires a piece of correlation including context information with a degree of similarity exceeding a threshold value as context information similar to the received context information to a certain degree and supplies the acquired piece of correlation information to a similar-main-content select section 153. In this case, however, the correlation information supplied to the similar-main-content select section 153 typically includes characteristic information of an already used main content and context information. Examples of the correlation information are the pieces of correlation information CI1$a$, CI2$a$ and CI3$a$ shown in FIG. 26.

The similar-main-content select section 153 determines that an already used main content such as a previously inspected mail text associated with characteristic information included in the correlation information received from the matching process section 152 is similar to the mail text received this time, and supplies the characteristic information to the associated-accessory-content acquisition section 154.

The associated-accessory-content acquisition section 154 acquires correlation information including the characteristic information supplied by the similar-main-content select section 153 from the correlation-information storage section 117. In this case, however, the correlation information acquired from the correlation-information storage section 117 is typically information on a correlation between an already used accessory content and an already used main content. Examples of the correlation information are the pieces of correlation information CI1, CI2 and CI3 shown in FIG. 5. Then, the associated-accessory-content acquisition section 154 acquires an accessory content indicated (or identified) by information included in the acquired correlation information from the accessory-content storage section 120 and outputs the acquired accessory content as a user-utilization accessory content.

That is to say, in this case, the associated-accessory-content acquisition section 154 selects a mail text similar to the mail text received this time as a user-utilization main content among mail texts inspected by the user in the past. Strictly speaking, the associated-accessory-content acquisition section 154 selects a mail text inspected by the user in the past in a context similar to the context indicated by the context information added to the received mail text. Then, the associated-accessory-content acquisition section 154 automatically reproduces a piece of music associated with the mail text inspected by the user in the past. The automatically reproduced piece of music is music, which was output when the user inspected the selected mail text in the past.

As described above, in the example shown in FIG. 32, correlation information stored in the correlation-information storage section 117 includes correlation information showing correlations between already used main contents and their contexts as well as correlation information showing correlations between already used main contents and already used accessory contents. Examples of the correlation information showing correlations between already used main contents and their contexts are the pieces of correlation information CI1$a$, CI2$a$ and CI3$a$ shown in FIG. 26 whereas examples of the correlation information showing correlations between already used main contents and already used accessory contents are the pieces of correlation information CI1, CI2 and CI3 shown in FIG. 5. That is to say, FIG. 32 is a diagram showing a typical functional configuration of the user-utilization accessory-content determination section 119B using correlation information of these two types.

If the correlation-information storage section 117 is used for storing for example correlation information including characteristic information of already used accessory contents and context information, however, the similar-main-content select section 153 is not required. That is to say, a user-utilization accessory-content determination section 119 using correlation information of this 1 type typically includes only the context-information separation section 151, the matching process section 152 and the associated-accessory-content acquisition section 154. However, such a configuration is shown in none of the figures. Examples of such correlation information are the pieces of correlation information CI1$b$, CI2$b$ and CI3$b$ shown in FIG. 28.

In this case, the matching process section 152 computes a degree of similarity between the context information received from the context-information separation section 151 and context information included in each piece of one or more correlation information stored in advance in the correlation-information storage section 117, acquires a piece of correlation including context information having a degree of similarity exceeding a threshold value as context information similar to the received context information to a certain degree and supplies the acquired piece of correlation information to the associated-accessory-content acquisition section 154. As described above, the correlation information includes characteristic information of already used accessory contents and context information. Examples of such correlation information are the pieces of correlation information CI1$b$, CI2$b$ and CI3$b$ shown in FIG. 28.

The associated-accessory-content acquisition section 154 acquires an already used accessory content indicated (or identified) by information included in the correlation information supplied by the matching process section 152 from the accessory-content storage section 120 and outputs the already used accessory content as a user-utilization accessory content.

To put it in detail, as the user-utilization accessory content, the associated-accessory-content acquisition section 154 selects a piece of music among pieces of music output in the past. The selected piece of music is music listened to by the user in the past in a context identical with or similar to the context indicated by the context information added to the received mail text. Then, the associated-accessory-content acquisition section 154 automatically reproduces the selected piece of music.

By referring to a flowchart shown in FIG. 33, the following description explains the accessory-content determination processing carried out by the user-utilization accessory-content determination section 119B shown in FIG. 32, that is, the accessory-content determination processing using correlation information of two types, i.e. correlation information showing correlations between already used main contents and their contexts as well as correlation information showing correlations between already used main contents and already used accessory contents. Examples of the correlation information showing correlations between already used main contents and their contexts are the pieces of correlation information CI1$a$, CI2$a$ and CI3$a$ shown in FIG. 26 whereas examples of the correlation information showing correlations between already used main contents and already used accessory contents are the pieces of correlation information CI1, CI2 and CI3 shown in FIG. 5.

Let us assume for example that, in the process carried out at the step S131 of the flowchart shown in FIG. 29, the main-content reception section 118 receives a mail text including additional context information and the operating mode of the content transmission/reception apparatus 101 shown in FIG. 20 is the accessory-content automatic outputting mode as described above. Thus, since the determination result produced in the process carried at the step S132 of the flowchart shown in FIG. 29 indicates that the operating mode of the content transmission/reception apparatus 101 is the accessory-content automatic outputting mode, the flow of the processing goes on to the step S133.

In this case, the accessory-content determination processing is carried out in the process of the step S132 of the flowchart shown in FIG. 29 in accordance with the flowchart shown in FIG. 33.

The flowchart shown in FIG. 33 begins with a step S161 at which the context-information separation section 151 shown in FIG. 32 separates context information from a main content received by the main-content reception section 118 as a main content with the context information attached thereto and supplies the separated context information to the matching process section 152.

Then, at the next step S162, the matching process section 152 acquires correlation information including the same context information as the context information separated in the process carried out at the step S11 from at least one piece of correlation information held (stored) in advance in the correlation-information storage section 117 as information on correlations between main contents and accessory contents.

It is to be noted that the process carried out at the step S162 is a typical process of using pieces of correlation information, which each include only one piece of context information. The pieces of correlation information include context information of 'Happy', 'Strained' and 'Nostalgic' respectively. Examples of this correlation information are the pieces of correlation information CI1a, CI2a and CI3a shown in FIG. 26.

The process of the step S162 can also be carried out for pieces of correlation information, which each include only one or more pieces of context information. As an alternative, the following processing can also be carried out. In the alternative processing, the matching process section 152 computes a degree of similarity between the context information received from the context-information separation section 151 and context information included in each piece of correlation information stored in advance in the correlation-information storage section 117, acquiring a piece of correlation information including context information with a degree of similarity exceeding a threshold value as context information similar to the received context information to a certain degree.

Then, at the next step S163, the similar-main-content select section 153 selects an already used main content such as a previously inspected mail text associated with characteristic information included in the correlation information acquired in the process carried out at the step S162 as a main content similar to a received main content such a mail text received in the process carried out at the step S131 of the flowchart shown in FIG. 29. The similar-main-content select section 153 then supplies the characteristic information to the associated-accessory-content acquisition section 154.

Subsequently, at the next step S164, the associated-accessory-content acquisition section 154 acquires correlation information including the characteristic information received from the similar-main-content select section 153 as characteristic information for the already used main content selected in the process carried out at the step S163 from at least one piece of correlation information held in advance in the correlation-information storage section 117 as information on correlations between main contents and accessory contents. Examples of the correlation information showing correlations between main contents and accessory contents are the pieces of correlation information CI1, CI2 and CI3 shown in FIG. 5.

Then, at the next step S165, the associated-accessory-content acquisition section 154 acquires an accessory content identified by information included in the correlation information acquired in the process carried out at the step S164 as information showing an accessory content from the accessory-content storage section 120, and takes the acquired accessory content as a user-utilization accessory content. In this example, the accessory content is a piece of music.

At this point, the automatic-content determination processing carried out in the process of the step S133 of the flowchart shown in FIG. 29 is ended. A user-utilization accessory content determined in the automatic-content determination processing is output. That is to say, a piece of music acquired in the process carried out at the step S165 is automatically reproduced.

Thus, the mail receiver listening to the automatically reproduced piece of music, that is, the other user seen by the user sending the mail text, is capable of easily imagining the context of the user sending the mail from the piece of music. That is to say, the user receiving the mail is capable of feeling the atmosphere, in which the mail was written and sent, even without reading the received mail.

It is to be noted that, even in the automatic-content determination processing represented by the flowchart shown in FIG. 33, much like the automatic-content determination processing represented by the flowchart shown in FIG. 30, the determined accessory content to be automatically output is not specially limited to a piece of music. That is to say, the automatically output accessory content can also be an image of characters, an image of an icon or a sound. If the automatically output accessory content is an image of characters, the characters themselves can have different colors and/or different designs. As an alternative, the automatically output accessory content can be an audio or video message typically stating: "The message sender was in this context." By merely using an image of characters, an image of an icon, a sound or such a message as an automatically output accessory content, that is, by merely listening to a sound or looking at an image as an automatically output accessory content, the user is capable of inferring the context of the mail sender or the user sending the mail and, hence, feeling the atmosphere of the received mail even if the user does not inspect the text of the mail.

In addition, if the content transmission/reception apparatus 101 has a function to read a mail text, outputting the mail text as a reading voice, the received mail text can also be regarded as an accessory content much like the automatic-content determination processing represented by the flowchart shown in FIG. 30. Then, in an operation to automatically output the mail text by reading the mail text and outputting the mail text as a reading voice, the quality and tone of the voice can be changed in accordance with the inferred context of the user.

In addition, if a received mail text is also regarded as an accessory content, the output destination of the mail text can be changed in accordance with the inferred context much like the automatic-content determination processing represented by the flowchart shown in FIG. 30. In the example shown in FIG. 20, the output destination is an external destination. However, a folder in a memory embedded in the content transmission/reception apparatus 101 can also be used as an output destination. Such a memory is shown in none of the figures though. Folders used for storing mail texts can be classified by inferred context, for example, by feeling. If the content transmission/reception apparatus 101 is implemented by a hand phone or a PDA (Personal Digital Assistant), the output destination can be a desk-top computer or a computer of another type. With the content transmission/reception apparatus 101 implemented by a hand phone or a PDA, a filtering process can be carried out. To put it concretely, the content transmission/reception apparatus 101 carried by the user during leisure time can be used to receive only enjoyable (recommended) mail texts and the content transmission/reception apparatus 101 is capable of transferring mail texts each inferred to be a mood-spoiling text to a desk-top computer or a computer of another type.

So far, as information-processing apparatus according to embodiments of the present invention, the information-processing apparatus shown in FIG. 1 as an apparatus according to an embodiment of the present invention and the content transmission/reception apparatus 101 shown in FIG. 20 as an apparatus according to another embodiment of the present invention have been explained. However, implementations of information-processing apparatus according to embodiments of the present invention are by no means limited to the two explained embodiments. That is to say, information-processing apparatus according to the present invention can be basically implemented by an embodiment described below.

An information-processing apparatus according to embodiments of the present invention is capable of outputting a main content and an accessory content, and includes at least: a history-information generation section for generating history information including at least one piece of information on the user utilizing the information-processing apparatus at a point of time the information-processing apparatus outputs an already used main content and in a time band including the point of time; a history-information storage section for storing at least one piece of history information generated by the history-information generation section; an accessory-content storage section for storing at least one accessory content; and an accessory-content determination section for determining an accessory content regarded as a content whose output operation in course of an operation to output a new main content or before or after the operation to output a new main content is considered to be suitable for the user on the basis of characteristics of one or more accessory contents stored in the accessory-content storage section and at least one piece of history information stored in the history-information storage section.

In other words, the information-processing apparatus shown in FIG. 1 is an information-processing apparatus according to an embodiment of the present invention wherein the history-processing section 1, the correlation-information storage section 2, the accessory-content storage section 3 and the user-utilization accessory-content determination section 6 serve as respectively the history-information generation section, the history-information storage section, the accessory-content storage section and the accessory-content determination section described above.

On the other hand, the content transmission/reception apparatus 101 shown in FIG. 20 is an information-processing apparatus according to an embodiment of the present invention wherein the history-processing section 116, the correlation-information storage section 117, the accessory-content storage section 120 and the user-utilization accessory-content determination section 119 serve as respectively the history-information generation section, the history-information storage section, the accessory-content storage section and the accessory-content determination section described above.

Such information-processing apparatus according to embodiments of the present invention are each capable of exhibiting an effect of an ability to easily output an accessory content suitable for a user situation at a point of time in the course of an operation to output a new main content or before or after the operation to output a new main content.

To put it concretely, for example, the information-processing apparatus shown in FIG. 1 and the content transmission/reception apparatus 101 shown in FIG. 20 are each capable of exhibiting the following effects:

The information-processing apparatus shown in FIG. 1 demonstrates an effect of a capability of determining BGM or BGV accessory contents enjoyable by the user itself, associating the determined accessory contents with main contents such as mails each serving as an operation object and selecting an accessory content suitable for a main content serving as an operation object at the present of time among the accessory contents in an automatic reproduction process.

The content transmission/reception apparatus 101 shown in FIG. 20 demonstrates an effect of a capability of improving a performance effect by being capable of automatically selecting an accessory content determined to be most suitable in accordance with the feeling of an individual user in contrast to the conventional transmitting conventional apparatus capable of transmitting only an accessory content such as a picture or a piece of music selected by the user serving as the sender along with a main content and the conventional receiver apparatus capable of reproducing only an accessory content such as a picture or a piece of music received from the conventional transmitting conventional apparatus besides a received main content with regard to a process to transmit and receive a main content such as a mail text and a process to associate an accessory content such as a picture or a piece of music with the main content.

By the way, each sequence of processes described above can be carried out by hardware and/or execution of software.

In this case, the information-processing apparatus shown in FIG. 1 and the content transmission/reception apparatus 101 shown in FIG. 20 can each be implemented as a personal computer with a configuration like one shown in FIG. 34.

In the configuration shown in FIG. 34, a CPU (Central Processing Unit) 201 carries out various kinds of processing by execution of programs stored in a ROM (Read Only Memory) 202 or loaded into a RAM (Random Access Memory) 203 from a storage unit 208. The RAM 203 is also used for properly storing data required by the CPU 201 in the execution of the processing.

The CPU 201, the ROM 202 and the RAM 203 are connected to each other by a bus 204, which is also connected to an input/output interface 205.

The input/output interface 205 is further connected to an input section 206, an output section 207, the storage section 208 cited above and a communication section 209. The input section 206 includes a mouse whereas the output section 207 comprises a display unit. The storage section 208 is typically a hard disk and the communication section 209 includes a modem and a terminal adaptor. The communication section 209 is a component for carrying out communications by way of a network including the Internet with another information-processing apparatus not shown in the figure.

If necessary, the input/output interface 205 is also connected to a drive 210, on which proper removable media 211 is mounted. Examples of the removable media 211 are a magnetic disk, an optical disk, a magneto-optical disk and a semiconductor memory. If necessary, a computer program is read out from the removable media 211 and installed in the storage section 208.

As explained above, each series of processes described previously can be carried out by hardware and/or execution of software. If the series of processes described above is carried out by execution of software, programs composing the software can be installed into a computer embedded in dedicated hardware, a general-purpose personal computer or the like from typically a network or a program-recording medium. By installing a variety of programs into the general-purpose personal computer, the personal computer is capable of carrying out a variety of functions.

The aforementioned program-recording medium for recording the programs to be installed into a computer or a general-purpose personal computer as programs to be executed by the computer or the general-purpose personal computer respectively is the removable recording medium 511 provided to the user separately from the main unit of the information-processing apparatus as shown in FIG. 34. Examples of the removable recording mediums 511 also each referred to as a package medium include a magnetic disk such as a flexible disk, an optical disk such as a CD-ROM (Compact Disk-Read Only Memory) or a DVD (Digital Versatile Disk), a magneto-optical disk such as an MD (Mini Disk) as well as a semiconductor memory. Instead of installing the programs from the removable recording mediums 511, the programs can also be stored in advance in a recording medium embedded in the main unit of the information-processing apparatus. Examples of the embedded recording medium are hard disks included in the storage unit 208 and the ROM 202 shown in FIG. 34.

It is also worth noting that, in this specification, steps of every program stored in a recording medium can be carried out not only in a pre-prescribed order along the time axis, but also concurrently or individually.

In addition, the technical term 'system' used in this specification implies the configuration of a confluence comprising a plurality of apparatus.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method for individually outputting a content of a first type and a content of a second type, for storing one or more contents of said second type, and for storing other information different from said contents of said second type, the method comprising:
   generating history information, performed by an information-processing apparatus, the history information on a user utilizing said information-processing apparatus, said history information including a first characteristic vector representing a correlation between an already used content of said first type and an already used content of said second type, wherein the history information is generated at a point of time the already used content of said first type was output;
   controlling an operation to store history information each time history information is generated in a process carried out at said step of generating history information;
   acquiring meta information from a user-utilization content of said first type;
   generating a second characteristic vector, based on said acquired meta information, representing at least one characteristic of the user-utilization content of said first type;
   determining a degree of similarity based on: (i) said first characteristic vector included in said history information; and (ii) said second characteristic vector that was generated based on said acquired meta information; and
   determining, performed by the information-processing apparatus, a second-type content regarded as a suitable content whose output operation is considered to be suitable for said user based on said determined degree of similarity based on said first characteristic vector and said second characteristic vector.

2. A removable media storing instructions structured to cause an information-processing apparatus to:
   (a) generate history information including one or more pieces of information on a user utilizing said information-processing apparatus, said history information including a first characteristic vector representing a correlation between an already used content of said first type and an already used content of said second type, the history information being generated at a point of time the already used content of a first type was output;
   (b) control an operation to store history information in a second storage means each time history information is generated in a process carried out at said step of generating history information;
   (c) acquire meta information from a user-utilization content of said first type;
   (e) generate a second characteristic vector, based on said acquired meta information, representing at least one characteristic of the user-utilization content of said first type;
   (f) determine a degree of similarity based on:
      (i) said first characteristic vector included in said history information; and
      (ii) said second characteristic vector that was generated based on said acquired meta information; and
   (g) determine a second-type content regarded as a suitable content whose output operation is considered to be suitable for said user based on said determined degree of similarity based on said first characteristic vector and said second characteristic vector.

3. An information-processing apparatus for outputting a content of a first type and a content of a second type, the information-processing apparatus comprising:
   a display device;
   a processor operatively coupled to the display device;
   a memory device storing a plurality of instructions, which when the plurality of instructions are executed by the processor, cause the processor to:
   (a) generate history information on a user utilizing said information-processing apparatus, said history information including a first characteristic vector representing a correlation between an already used content of said first type and an already used content of said second type, the history information being generated at a point of time the already used content of said first type was output;
   (b) store the one or more pieces of generated history information;
   (c) store one or more contents of said content of the second type;
   (d) acquire meta information from a user-utilization content of said first type;

(e) generate a second characteristic vector, based on said acquired meta information, representing at least one characteristic of the user-utilization content of said first type;
(f) determine a degree of similarity based on:
  (i) said first characteristic vector included in said history information; and
  (ii) said second characteristic vector that was generated based on said acquired meta information; and
(g) determine whether at least one of the second-type-content is regarded as a suitable content whose output operation is considered to be suitable for said user based on said determined degree of similarity based on said first characteristic vector and said second characteristic vector.

4. The information-processing apparatus of claim 3, wherein when executed by the processor, the plurality of instructions cause the processor to:

generate history information including at least first characteristic information showing characteristics of an already used content of said first type and second characteristic information showing characteristics of an already used second-type content, which was output from said information-processing apparatus while said already used content of said first type was being output or before or after said already used content of said first type was output;

select one or more pieces of history information each including first characteristic information identical with or similar to characteristic information showing characteristics of a new content of said first type among one or more pieces of history information; and determine a second-type content identified by second characteristic information included in each of said selected pieces of history information as a second-type content whose output operation in course of an operation to output a new content of said first type or before or after said operation to output a new content of said first type is considered to be suitable for said user.

5. The information-processing apparatus of claim 3, wherein when executed by the processor, the plurality of instructions cause the processor to:

generate first history information including at least first characteristic information showing characteristics of an already used content of said first type and first context information showing a user context at an output time of said already used content of said first type; and generate second history information including at least second characteristic information showing characteristics of an already used content of said second type and second context information showing a user context at an output time of said already used content of said second type;

store said first history information and said second history information;

select one or more pieces of first history information each including first characteristic information identical with or similar to characteristic information showing characteristics of a new content of said first type among one or more pieces of first history information;

acquire first context information included in each of said selected pieces of first history information;

select one or more pieces of second history information each including second context information identical with or similar to said acquired first context information among one or more pieces of second history information; and determine a second-type content identified by second characteristic information included in each of said selected pieces of second history information as a second-type content whose output operation in course of an operation to output a new content of said first type or before or after said operation to output a new content of said first type is considered to be suitable for said user.

6. The information-processing apparatus of claim 3, wherein when executed by the processor, the plurality of instructions cause the processor to:

receive a content of said first type and first context information added to said content of said first type as information showing a context of another user from another apparatus used by said other user;

generate first history information including at least first characteristic information showing characteristics of an already used content of said first type and second context information showing a user context at an output time of said already used content of said first type;

generate second history information including at least first characteristic information showing characteristics of an already used content of said first type and second characteristic information showing characteristics of an already used second-type content, which was output from said information-processing apparatus while said already used content of said first type was being output or before or after said already used content of said first type was output;

store said first history information and said second history information;

select one or more pieces of first history information each including second context information identical with or similar to first context information added to a new first-type content received by said data reception means said among one or more pieces of first history information;

acquire first characteristic information included in each of said selected pieces of first history information;

select one or more pieces of second history information each including second characteristic information identical with or similar to said acquired first characteristic information among one or more pieces of second history information; and determine a second-type content identified by second characteristic information included in each of said selected pieces of second history information as a second-type content whose output operation in course of an operation to output a new content of said first type or before or after said operation to output a new content of said first type is considered to be suitable for said user.

* * * * *